(12) United States Patent
Fukuhara et al.

(10) Patent No.: US 8,369,635 B2
(45) Date of Patent: Feb. 5, 2013

(54) INFORMATION PROCESSING DEVICE AND METHOD

(75) Inventors: Takahiro Fukuhara, Kanagawa (JP); Katsutoshi Ando, Kanagawa (JP); Yuuki Tanaka, Kanagawa (JP); Naoto Nishimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1072 days.

(21) Appl. No.: 12/109,845

(22) Filed: Apr. 25, 2008

(65) Prior Publication Data

US 2008/0285872 A1 Nov. 20, 2008

(30) Foreign Application Priority Data

May 17, 2007 (JP) .................................. 2007-131286

(51) Int. Cl.
*G06K 9/00* (2006.01)
(52) U.S. Cl. ........................................ 382/240; 348/623
(58) Field of Classification Search .................... 382/240
See application file for complete search history.

(56) References Cited

U.S. PATENT DOCUMENTS

| 5,119,195 | A | * | 6/1992 | Christopher ................. 348/623 |
| 6,067,383 | A | * | 5/2000 | Taniguchi et al. ............ 382/240 |
| 6,678,422 | B1 | * | 1/2004 | Sharma et al. ................ 382/240 |
| 2001/0036231 | A1 | * | 11/2001 | Easwar et al. ............ 375/240.19 |
| 2007/0269122 | A1 | * | 11/2007 | Fukuhara et al. ............. 382/240 |
| 2007/0286510 | A1 | | 12/2007 | Fukuhara |
| 2008/0013845 | A1 | | 1/2008 | Fukuhara et al. |
| 2008/0013846 | A1 | | 1/2008 | Fukuhara et al. |

FOREIGN PATENT DOCUMENTS

| JP | 10/283342 | 10/1998 |
| JP | 11-239060 | 8/1999 |
| JP | 2001-326936 | 11/2001 |
| JP | 2002-101310 | 4/2002 |

OTHER PUBLICATIONS

Wim Sweldens, "The Lifting Scheme: A Custom-Design Construction of Biorthogonal Wavelets", Applied and Computational Harmonic Analysis, vol. 3, No. 0015, 1996, pp. 186-200.

Christos Chrysafis, et al., "Line-Based, Reduced Memory, Wavelet Image Compression", IEEE Transactions on Image Processing, vol. 9, No. 3, Mar. 2000, pp. 378-389.

U.S. Appl. No. 11/814,257, filed Jul. 18, 2007, Takahiro Fukuhara, et al.

* cited by examiner

*Primary Examiner* — Hadi Akhavannik
(74) *Attorney, Agent, or Firm* — Oblon, Spivak, McClelland, Maier & Neustadt, L.L.P.

(57) ABSTRACT

An information processing device, configured to divide the frequency components of image data into a plurality of frequency bands, includes an analysis filtering unit configured to perform analysis filtering for dividing the frequency components into highband components and lowband components recursively, and a holding unit configured to supply, in sync with timing for holding data supplied as a computation result of the analysis filtering by the analysis filtering unit, the data already held, which is data necessary for computation of next analysis filtering to the analysis filtering unit.

5 Claims, 45 Drawing Sheets

1-PORT SRAM

2-PORT SRAM

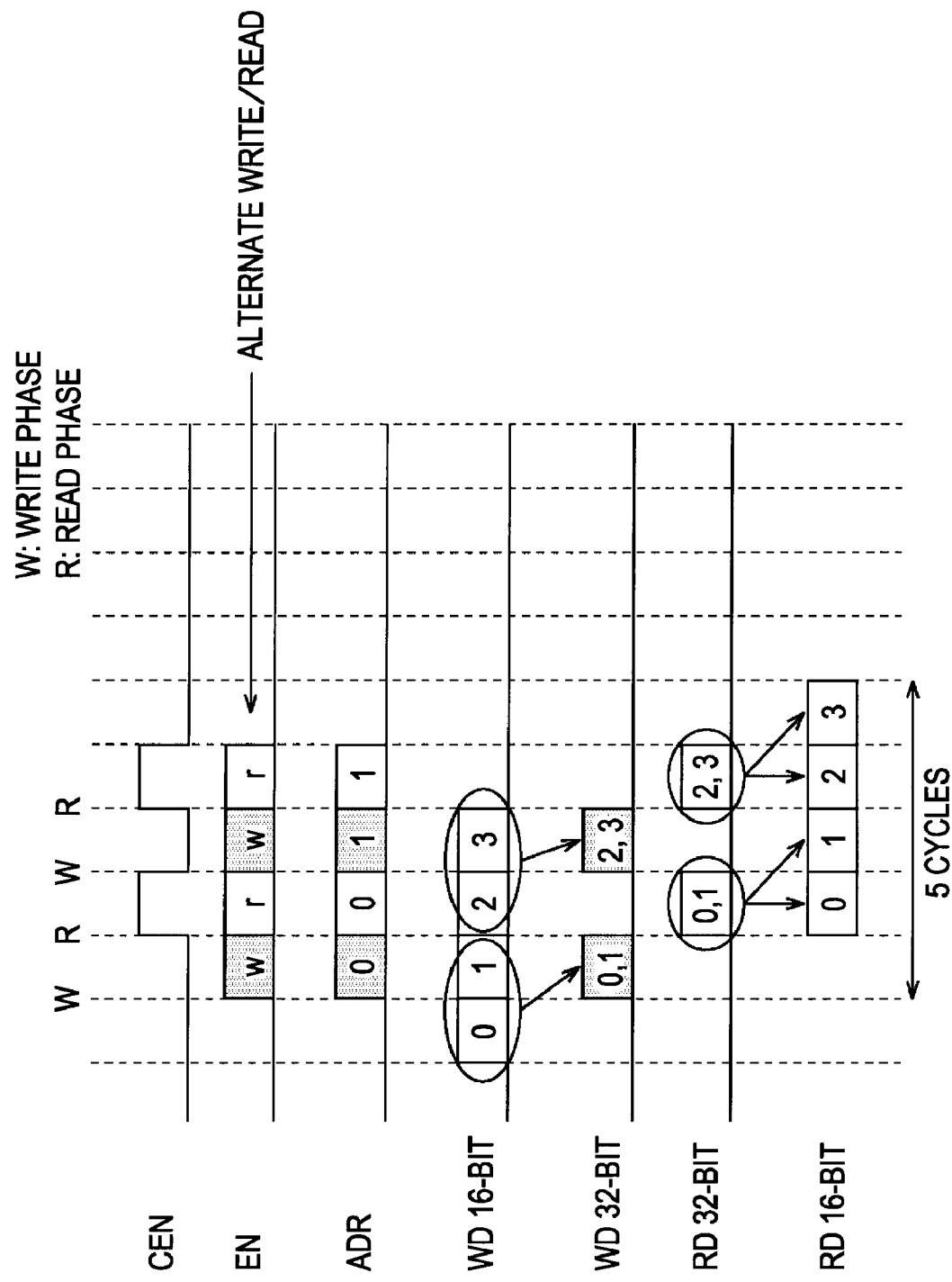

FIG. 20
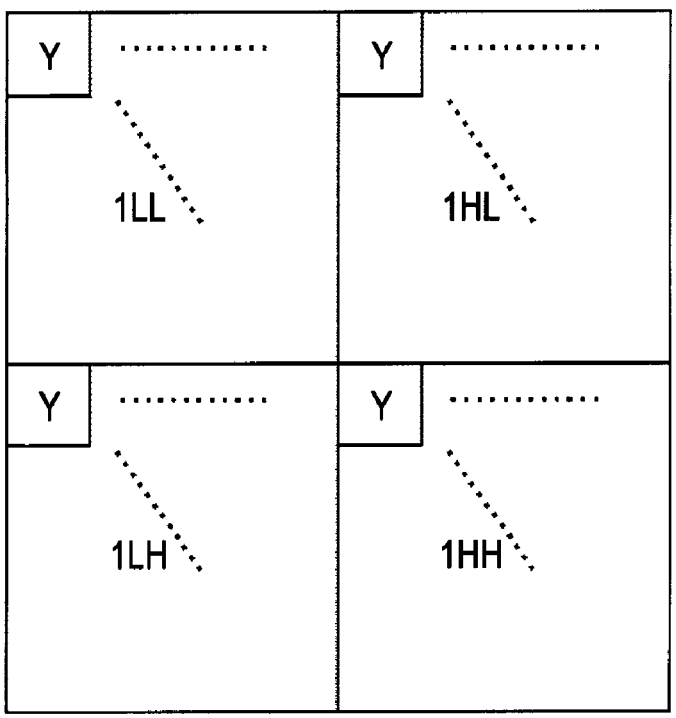
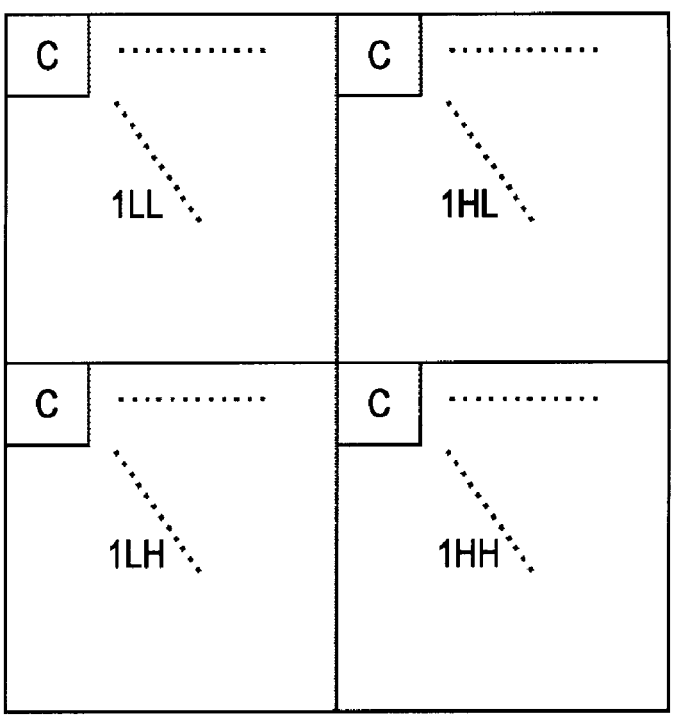

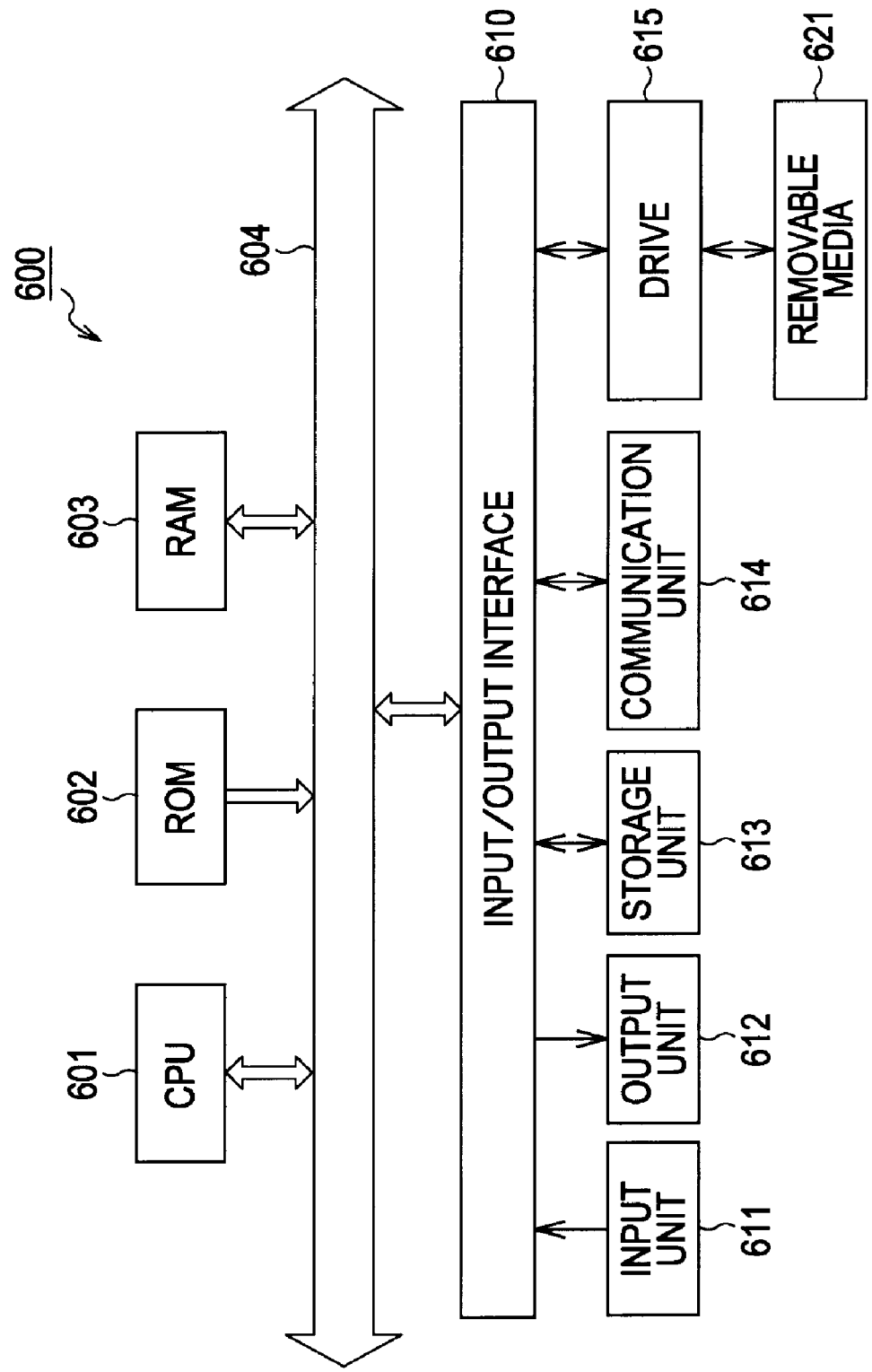

INFORMATION PROCESSING DEVICE AND METHOD

CROSS REFERENCES TO RELATED APPLICATIONS

The present invention contains subject matter related to Japanese Patent Application JP 2007-131286 filed in the Japanese Patent Office on May 17, 2007, the entire contents of which are incorporated herein by reference.

BACKGROUND OF THE INVENTION

1. Field of the Invention

The present invention relates to an information processing device and method, and particularly, an information processing device and method whereby the delay time of wavelet transformation processing and wavelet inverse transformation processing can be reduced, and costs can be reduced.

2. Description of the Related Art

An image compression method representative of known methods is the JPEG (Joint Photographic Experts Group) method that has been standardized by the ISO (International Standards Organization). This is known to provide excellent coded images and decoded images in the event that DCT (Discrete Cosine Transform) is used and a relatively great number of bits are appropriated.

In recent years, there has been much research performed on a method wherein images are divided into multiple bands (sub-bands) with filters called filter banks, wherein high-pass filters and low-pass filters are combined, and coding is performed for each band. Particularly, wavelet transformation coding is viewed as a new technology which is a likely candidate to replace DCT, since it does not have the problem that DCT has, i.e., marked block distortion at high compression rates.

International standardization of JPEG 2000 was completed January 2001. JPEG 2000 combines wavelet transformation and high-efficiency entropy coding (bit-plane based bit modeling and arithmetic encoding), and realizes marked improvements over JPEG with regard to coding efficiency.

Wavelet transformation processing (e.g., see Japanese Unexamined Patent Application Publication No. 10-283342) uses a technique wherein, basically, image data is taken as input which is subjected to horizontal direction filtering and vertical direction filtering, in which lowband components are hierarchically divided.

Wavelet inverse transformation processing for transforming the coefficient data (frequency components) transformed from image data by the wavelet transformation processing into the original image data performs processing for ultimately restoring an image while subjecting highband components and lowband components to synthesis filtering up to the lowermost division level from the uppermost division level.

With the wavelet inverse transformation processing, coefficient data in the middle of processing and ultimately obtained image data are held temporarily, but synthesis filtering is repeated recursively, so there is a need to perform writing and reading in/from buffer memory with high frequency.

SUMMARY OF THE INVENTION

However, when employing external high-capacity memory connected to a processing unit for performing analysis filtering and synthesis filtering via a shared bus for the buffer memory thereof, transfer of data frequently performed as to the buffer memory may decrease in speed due to the external memory of which the operation frequency is low as compared with that of the processing unit thereof, and also the shared bus, and the processing speed of the wavelet transformation processing and wavelet inverse transformation processing deteriorates, and consequently, delay time increases.

For example, with a teleconference system, video game system, or the like, it is desirable to perform transmission of image data with low delay, and such increase in delay time affects operations greatly, so there is demand for as much reduction in time delay as possible.

That is to say, it is desirable to enable data to be input/output to/from the buffer memory at higher speed. Therefore, it can be conceived to employ built-in memory provided within the processing unit as the buffer memory, but in this case as well, it is desirable to perform input/output of data to/from the buffer memory at further high speed. However, increase in a circuit scale is linked to increase in manufacturing costs and operating costs (power consumption), so at the same time, reduction in circuit scale is also necessary.

It has been recognized that there is a need to enable not only the delay time of the wavelet transformation processing and wavelet inverse transformation processing but also costs to be reduced.

According to an embodiment of the present invention, an information processing device configured to divide the frequency components of image data into a plurality of frequency bands, includes: analysis filtering means configured to perform analysis filtering for dividing the frequency components into highband components and lowband components recursively; and holding means configured to supply, in sync with timing for holding data supplied as a computation result of the analysis filtering by the analysis filtering means, the data already held, which is data necessary for computation of next analysis filtering to the analysis filtering means.

The holding means may include: linking means configured to link a plurality of data supplied one at a time for each cycle by the analysis filtering means to generate one piece of data; dividing means configured to divide one piece of data into a plurality of data to supply these one at a time for each cycle to the analysis filtering means; and storing means configured to perform writing and reading of data alternately for each cycle, write and store one piece of data generated by the linking means at a writing cycle for writing the data, read out one piece of data from stored data by one cycle at a readout cycle for reading out the data to supply this to the dividing means for dividing this into a plurality of data.

The linking means may link the data supplied for each first data increment from the analysis filtering means each cycle to generate one piece of data serving as second data increment; with the diving means dividing the one piece of data serving as second data increment for each the first data increment to generate a plurality of data serving as first data increment, and supplying the data serving as first data increment one at a time for each cycle to the analysis filtering means.

Also provided is an information processing method for an information processing device configured to divide the frequency components of image data into a plurality of frequency bands, including the steps of: performing analysis filtering for dividing the frequency components into highband components and lowband components recursively; and supplying, in sync with timing for holding data supplied as a computation result of the analysis filtering, the data already held, which is data necessary for computation of next analysis filtering.

With this configuration, analysis filtering for dividing frequency components into highband components and lowband components is performed recursively, and in sync with timing for holding data to be supplied as a computation result of the analysis filtering, data already held, i.e., data necessary for next analysis filtering is supplied.

According to an embodiment of the present invention, an information processing device configured to divide the frequency components of image data into a plurality of frequency bands, includes: luminance component analysis filtering means configured to divide the frequency components into highband components and lowband components regarding the luminance components of the image data; color difference component analysis filtering means configured to divide the frequency components into highband components and lowband components regarding the color difference components of the image data; luminance component holding means configured to supply, in sync with timing for holding data supplied as a computation result of the analysis filtering by the luminance component analysis filtering means, the data already held, which is data necessary for computation of next analysis filtering to the luminance component analysis filtering means; and color difference component holding means configured to supply, in sync with timing for holding data supplied as a computation result of the analysis filtering by the color difference component analysis filtering means, the data already held, which is data necessary for computation of next analysis filtering to the color difference component analysis filtering means.

The luminance component holding means may include luminance component linking means configured to link a plurality of data supplied one at a time for each cycle by the luminance component analysis filtering means to generate one piece of data, luminance component dividing means configured to divide one piece of data into a plurality of data to supply these one at a time for each cycle to the luminance component analysis filtering means, and luminance component storing means configured to perform writing and reading of data alternately for each cycle, write and store one piece of data generated by the luminance component linking means at a writing cycle for writing the data, read out one piece of data from stored data by one cycle at a readout cycle for reading out the data to supply this to the luminance component dividing means for dividing this into a plurality of data; with the color difference component holding means including color difference component linking means configured to link a plurality of data supplied one at a time for each cycle by the color difference component analysis filtering means to generate one piece of data, color difference component dividing means configured to divide one piece of data into a plurality of data to supply these one at a time for each cycle to the color difference component analysis filtering means, and color difference component storing means configured to perform writing and reading of data alternately for each cycle, write and store one piece of data generated by the color difference component linking means at a writing cycle for writing the data, read out one piece of data from stored data by one cycle at a readout cycle for reading out the data to supply this to the color difference component dividing means for dividing this into a plurality of data.

The luminance component linking means may link the data supplied for each first data increment from the luminance component analysis filtering means each cycle to generate one piece of data serving as second data increment; with the luminance component diving means dividing the one piece of data serving as second data increment for each first data increment to generate a plurality of data serving as first data increment, and supplying the data serving as first data increment one at a time for each cycle to the luminance component analysis filtering means; with the color difference component linking means linking the data supplied for each first data increment from the color difference component analysis filtering means to generate one piece of data serving as second data increment; with the color difference component diving means dividing the one piece of data serving as second data increment for each first data increment to generate a plurality of data serving as first data increment, and supplying the data serving as first data increment one at a time for each cycle to the color difference component analysis filtering means.

Also provided is an information processing method for an information processing device configured to divide the frequency components of image data into a plurality of frequency bands, including the steps of: performing analysis filtering for dividing the frequency components into highband components and lowband components recursively regarding the luminance components of the image data; performing analysis filtering for dividing the frequency components into highband components and lowband components recursively regarding the color difference components of the image data; supplying, in sync with timing for holding data supplied as a computation result of the analysis filtering regarding the luminance components, the data already held, which is data necessary for computation of analysis filtering regarding next luminance components; and supplying, in sync with timing for holding data supplied as a computation result of the analysis filtering regarding the color difference components, the data already held, which is data necessary for computation of analysis filtering regarding next color difference components.

With this configuration, analysis filtering for dividing frequency components into highband components and lowband components is performed recursively regarding the luminance components of image data, analysis filtering for dividing frequency components into highband components and lowband components is performed recursively regarding the color difference components of image data, and in sync with timing for holding data to be supplied as a computation result of the luminance component analysis filtering, data already held, i.e., data necessary for next luminance component analysis filtering is supplied, and in sync with timing for holding data to be supplied as a computation result of the color difference component analysis filtering, data already held, i.e., data necessary for next color difference component analysis filtering is supplied.

According to an embodiment of the present invention, an information processing device includes: synthesis filtering means configured to subject image data to analysis filtering for dividing the frequency components of the image data into highband components and lowband components hierarchically, and subject the frequency components of the image data divided into a plurality of frequency components to synthesis filtering for mutually synthesizing the frequency components of the frequency band of the same division level recursively; and holding means configured to supply, in sync with timing for holding data supplied as a computation result of the synthesis filtering by the synthesis filtering means, the data already held, which is data necessary for computation of next synthesis filtering to the synthesis filtering means.

The holding means may include: linking means configured to link a plurality of data supplied one at a time for each cycle by the synthesis filtering means to generate one piece of data; dividing means configured to divide one piece of data into a plurality of data to supply these one at a time for each cycle to the synthesis filtering means; and storing means configured to perform writing and reading of data alternately for each cycle, write and store one piece of data generated by the linking means at a writing cycle for writing the data, read out one piece of data from stored data by one cycle at a readout cycle for reading out the data to supply this to the dividing means for dividing this into a plurality of data.

The linking means may link the data supplied for each first data increment from the synthesis filtering means each cycle to generate one piece of data serving as second data increment; with the diving means dividing the one piece of data serving as second data increment for each first data increment to generate a plurality of data serving as first data increment, and supplying the data serving as first data increment one at a time for each cycle to the synthesis filtering means.

Also provided is an information processing method for an information processing device, including the steps of: subjecting image data to analysis filtering for dividing the frequency components of the image data into highband components and lowband components hierarchically to subject the frequency components of the image data divided into a plurality of frequency components to synthesis filtering for mutually synthesizing the frequency components of the frequency band of the same division level recursively; and supplying, in sync with timing for holding data supplied as a computation result of the synthesis filtering, the data already held, which is data necessary for computation of next synthesis filtering.

With this configuration, image data is subjected to analysis filtering for dividing the frequency components of the image data into highband components and lowband components hierarchically, the frequency components of the image data divided into multiple frequency components are subjected to synthesis filtering for mutually synthesizing the frequency components of the frequency band of the same division level recursively; and in sync with timing for holding data supplied as a computation result of the synthesis filtering, the data already held, which is data necessary for computation of next synthesis filtering is supplied.

According to an embodiment of the present invention, an information processing device includes: synthesis filtering means configured to subject image data to analysis filtering for dividing the frequency components of the image data into highband components and lowband components hierarchically, and subject the frequency components of the image data divided into a plurality of frequency components to synthesis filtering for mutually synthesizing the frequency components of the frequency band of the same division level recursively; and holding means configured to hold frequency components generated by the frequency components of the frequency band of the same division level being mutually synthesized by the synthesis filtering means, and read out and output already held frequency components of one lower division level generated by the synthesis filtering means, which can be subjected to further the synthesis filtering, in sync with timing for holding the stored image data to be ultimately generated by the synthesis filtering means.

The holding means may include: linking means configured to link a plurality of data supplied one at a time for each cycle to generate one piece of data; dividing means configured to divide one piece of data into a plurality of data to supply these one at a time for each cycle; and storing means configured to perform writing and reading of data alternately for each cycle, write and store one piece of data generated by the linking means at a writing cycle for writing the data, read out one piece of data from stored data by one cycle at a readout cycle for reading out the data to supply this to the dividing means for dividing this into a plurality of data.

The linking means may link the data supplied for each first data increment for each cycle to generate one piece of data serving as second data increment; with the diving means dividing the one piece of data serving as second data increment for each first data increment to generate a plurality of data serving as the first data increment, and outputting the data serving as the first data increment one at a time for each cycle.

Also provided is an information processing method for an information processing device, including the steps of: subjecting image data to analysis filtering for dividing the frequency components of the image data into highband components and lowband components hierarchically to subject the frequency components of the image data divided into a plurality of frequency components to synthesis filtering for mutually synthesizing the frequency components of the frequency band of the same division level recursively; and holding frequency components generated by the frequency components of the frequency band of the same division level being mutually synthesized to read out and output already held frequency components of one lower division level generated by the synthesis filtering, which can be subjected to further the synthesis filtering, in sync with timing for holding the restored image data to be ultimately generated by the synthesis filtering.

With this configuration, image data is subjected to analysis filtering for dividing the frequency components of the image data into highband components and lowband components hierarchically, the frequency components of the image data divided into multiple frequency components are subjected to synthesis filtering for mutually synthesizing the frequency components of the frequency band of the same division level recursively, frequency components generated by the frequency components of the frequency band of the same division level being mutually synthesized are held, and already held frequency components of one lower division level are read out and output, which can be subjected to further the synthesis filtering, in sync with timing for holding the restored image data to be ultimately generated.

According to embodiments of the present invention, wavelet transformation processing or wavelet inverse transformation processing can be performed. Particularly, delay time of the wavelet transformation processing and wavelet inverse transformation processing can be reduced, and also costs can be reduced.

BRIEF DESCRIPTION OF THE DRAWINGS

FIG. 12 is a diagram illustrating an example of the timing of data input/output with the 1-port SRAM shown in FIG. 9;

FIG. 20 is a diagram illustrating the results of performing analysis filtering to division level 1, for Y and C separately;

FIG. 46 is a diagram illustrating a configuration example of an embodiment a computer to which an embodiment of the present invention has been applied.

DESCRIPTION OF THE PREFERRED EMBODIMENTS

Figure 1:
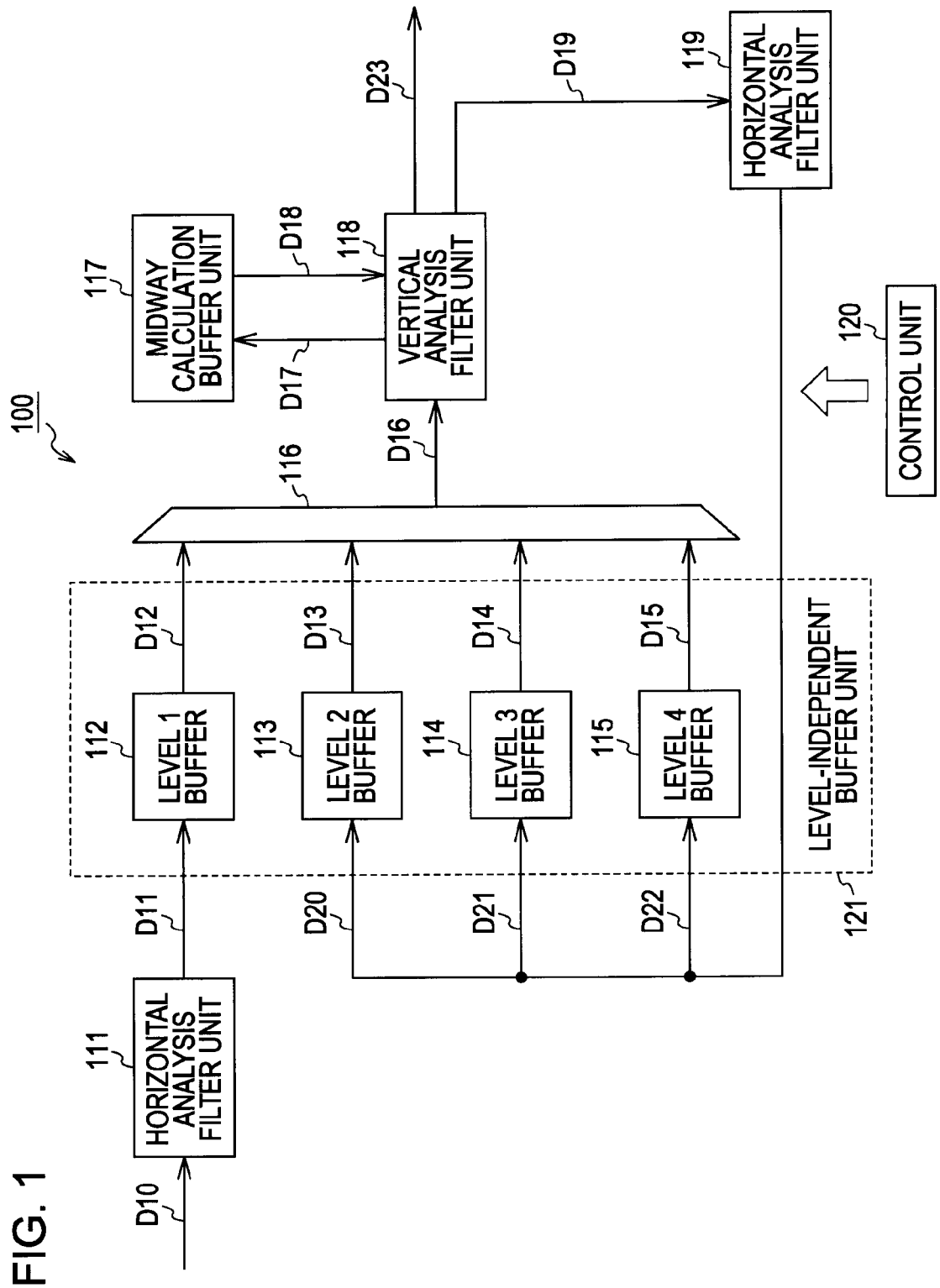
FIG. 1 is a diagram illustrating a configuration example of an embodiment of a wavelet transformation device to which an embodiment of the present invention has been applied.

FIG. 1 is a diagram illustrating a configuration example of an embodiment of a wavelet transformation device to which an embodiment of the present invention has been applied. The wavelet transformation device 100 is a band analysis device which takes image data as input, and performs horizontal direction filtering and vertical direction filtering, in which lowband components are hierarchically divided to a predetermined division level (in the example shown in FIG. 1, to division level 4).

The wavelet transformation device 100 shown in FIG. 1 is configured of a horizontal analysis filter unit 111, level 1 buffer 112, level 2 buffer 113, level 3 buffer 114, level 4 buffer 115, selector 116, midway calculation buffer unit 117, vertical analysis filter unit 118, horizontal analysis filter unit 119, and control unit 120.

An image signal is input to the horizontal analysis filter unit 111 (D10). The horizontal analysis filter unit 111 subjects the image signal thereof to lowband analysis filtering and highband analysis filtering in the horizontal direction of the division level 1, and generates frequency components coefficients made up of lowband component coefficients and highband component coefficients obtained as the result of the horizontal analysis filtering (hereafter also referred to as lowband component, highband component and frequency components, as appropriate) (D11).

At this time, the horizontal analysis filter unit 111 performs lowband analysis filtering and highband analysis filtering in the horizontal direction, while reading out the data of pixels at adjacent positions on a baseband rendered at an unshown internal memory (or register).

The level 1 buffer 112 stores and holds the results of the division level 1 horizontal analysis filtering. That is to say, the level 1 buffer 112 stores and holds the coefficients of the frequency components (lowband components and highband components) as results of the division level 1 horizontal analysis filtering obtained by the horizontal analysis filter unit 111 (D11). Once data (coefficients) for a predetermined number of vertical lines enabling vertical direction analysis filtering has been accumulated in the level 1 buffer 112, the predetermined number of vertical lines worth of coefficients are read out via the selector 116 (D12).

The level 2 buffer 113 stores and holds the results of the division level 2 horizontal analysis filtering. That is to say, the level 2 buffer 113 stores and holds the coefficients of the frequency components (lowband components and highband components) as results of the division level 2 horizontal analysis filtering obtained by the horizontal analysis filter unit 119 (D20). Once data (coefficients) for a predetermined number of vertical lines enabling vertical direction analysis filtering has been accumulated in the level 2 buffer 113, the predetermined number of vertical lines worth of coefficients are read out via the selector 116 (D13).

The level 3 buffer 114 stores and holds the results of the division level 3 horizontal analysis filtering. That is to say, the level 3 buffer 114 stores and holds the coefficients of the frequency components (lowband components and highband components) as results of the division level 3 horizontal analysis filtering obtained by the horizontal analysis filter unit 119 (D21). Once data (coefficients) for a predetermined number of vertical lines enabling vertical direction analysis filtering has been accumulated in the level 3 buffer 114, the predetermined number of vertical lines worth of coefficients are read out via the selector 116 (D14).

The level 4 buffer 115 stores and holds the results of the division level 4 horizontal analysis filtering. That is to say, the level 4 buffer 115 stores and holds the coefficients of the frequency components (lowband components and highband components) as results of the division level 4 horizontal analysis filtering obtained by the horizontal analysis filter unit 119 (D22). Once data (coefficients) for a predetermined number of vertical lines enabling vertical direction analysis filtering has been accumulated in the level 4 buffer 115, the predetermined number of vertical lines worth of coefficients are read out via the selector 116 (D15).

Note that the level 1 buffer 112 through level 4 buffer 115 will also be referred to as level-independent buffers 121 collectively.

Under control of the vertical analysis filter unit 118, the selector 116 selects, from the level 1 buffer 112 through level 4 buffer 115 of the level-independent buffers 121, the output of the corresponding division level buffer, and outputs the selected output to the vertical analysis filter unit 118 as coefficients (D16).

The midway calculation buffer unit 117 stores and holds part of the coefficients generated intermediately during the vertical analysis filtering. That is to say, of the coefficients generated intermediately during the vertical analysis filtering performed by the vertical analysis filter unit 118, the midway calculation buffer unit 117 stores and holds coefficients necessary for the next vertical analysis filtering processing, as coefficients for intermediate computation. These are read out by the vertical analysis filter unit 118 at the time of the next vertical analysis filtering.

Upon the predetermined number of vertical lines worth of coefficients being input from the selector 116 (D16), the vertical analysis filter unit 118 reads out the coefficients for intermediate computation from the midway calculation buffer unit 117 (i.e., the coefficients necessary for the current vertical analysis filtering) (D18), and performs the vertical analysis filtering using these coefficients. The vertical analysis filter unit 118 then outputs, of the frequency components of the vertical analysis filtering results, a frequency band which is lowband components in both the horizontal direction and vertical direction, i.e., only the lowband sub-band coefficients to the horizontal analysis filter unit 119 (D19), and outputs other frequency bands, i.e., highband sub-band coefficients to the unshown outside (hereafter, referred to simply as "external") of the wavelet transformation device 100 (D23).

The horizontal analysis filter unit 119 has basically the same configuration as that of the horizontal analysis filter unit 111, except that the division level of the frequency components to be processed differs. That is to say, with the horizontal analysis filter unit 119, the coefficients at an adjacent position on the baseband rendered at unshown internal memory (or register) are read out (D19), with horizontal direction lowband analysis filtering and highband analysis filtering being performed on the coefficients thereof.

The horizontal analysis filter unit 119 then stores and holds any one of the frequency components (lowband components and highband components) which are results of the horizontal analysis filtering, in the corresponding level buffer (one of the level 2 buffer 113 through level 4 buffer 115) (D20 through D22).

The control unit 120 is configured of a microcomputer or the like including, for example, a CPU (Central Processing Unit), ROM (Read Only Memory), and RAM (Random Access Memory), and controls the processing of the units of the wavelet transformation device 100 by executing various types of programs.

Next, description will be made regarding the operation flow of each unit.

Image signals are input to the horizontal analysis filter unit 111 externally (D10). That is to say, the horizontal analysis filter unit 111 has unshown internal memory (or a register), and the pixels of the input image signals are rendered in the internal memory in the order of numbers shown in FIG. 2. Note that with the example in FIG. 2, a baseband image obtained as the result of pixels, indicated by squares, being rendered in order.

Figure 2:
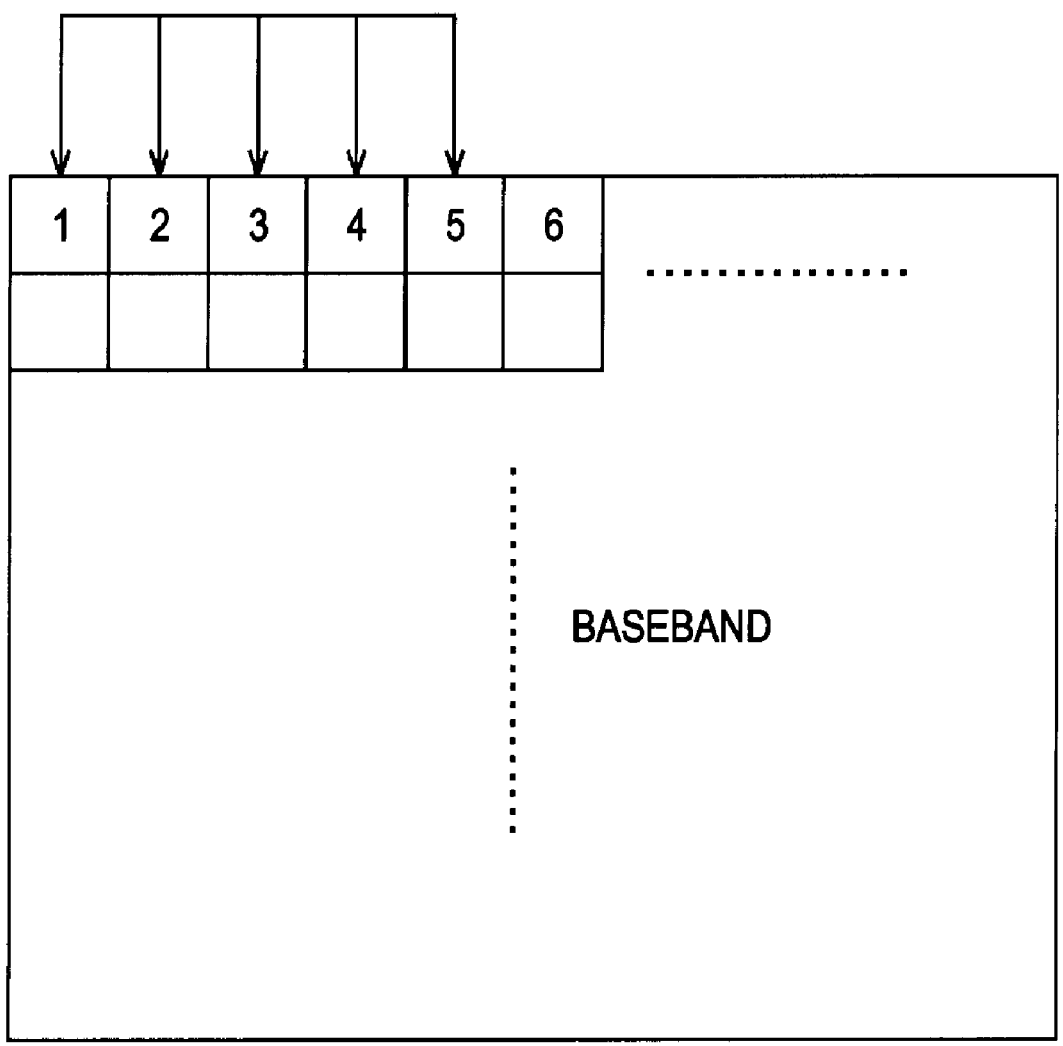
FIG. 2 is a diagram for describing an example of horizontal analysis filtering of image signals.

The horizontal analysis filter unit 111 reads out data of a predetermined number of pixels at adjacent positions on the baseband rendered in the internal memory (in the case in FIG. 2, this number is five columns (samples)), while shifting the position, with horizontal direction lowband analysis filtering and highband analysis filtering being performed in order.

The horizontal direction data is readily rendered to memory addresses. Accordingly, horizontal analysis filtering is executed in order at the horizontal analysis filter unit 111 while reading out data from the memory. Note that details of the horizontal direction lowband analysis filtering and highband analysis filtering will be described later with reference to FIG. 6.

The horizontal analysis filter unit 111 stores the coefficients of the frequency components obtained as a result of the division level 1 horizontal analysis filtering in the level 1 buffer 112 (D11). At this time, the horizontal analysis filter unit 111 interleaves the highband components (H) and lowband components (L) which are the results of the horizontal analysis filtering, and stores in the level 1 buffer 112, as shown in FIG. 3.

Note that there is a method in the related art wherein the results of the horizontal analysis filtering are divided into the highband components and lowband components, and thus stored in the buffer, but in this case, control becomes complicated such that there is a need to provide a separate controller for mapping the highband components and lowband components to different addresses in the buffer.

Figure 3:
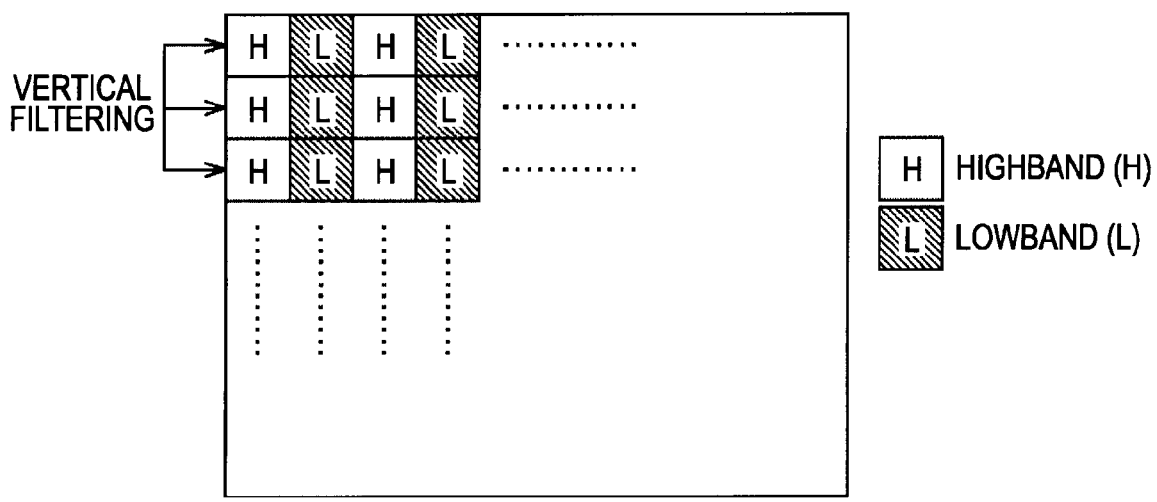
FIG. 3 is a diagram for describing an example of vertical analysis filtering.

Conversely, with the example shown in FIG. 3 according to the present embodiment, the highband components (H) and lowband components (L) are alternately stored in the level 1 buffer 112. That is to say, the highband components and lowband components which are the results of the horizontal analysis filtering are stored in the level 1 buffer 112 in an interleaved manner by the horizontal analysis filter unit 111, so at the time of reading out the coefficients stored in the level 1 buffer 112, all that is to necessary is to read out from the front of the level 1 buffer 112, thereby simplifying control.

Now, returning to FIG. 1, upon coefficients of the frequency components obtained as a result of the horizontal analysis filtering being accumulated in the level 1 buffer 112 for a predetermined number of vertical lines (three lines in the case shown in FIG. 3) whereby vertical analysis filtering can be performed, the vertical analysis filter unit 118 reads out the coefficients of the frequency components of the necessary number of vertical lines from the level 1 buffer 112, by controlling the selector 116 so as to select the output of the level 1 buffer 112 (D12). The frequency component coefficients read out are input to the vertical analysis filter unit 118 via the selector 116 (D16).

The vertical analysis filter unit 118 reads out the coefficients for intermediate calculation that have been stored in the midway calculation buffer unit 117 in the process for obtaining the frequency components one step back (D18). The vertical analysis filter unit 118 uses the three lines worth of frequency component coefficients and intermediate calculation coefficients to perform vertical analysis filtering of the corresponding division level (in the current case, the division level 1). Note that details of the vertical direction lowband analysis filtering and highband analysis filtering will be described later with reference to FIG. 8.

The vertical analysis filter unit 118 stores a part of the coefficients (i.e., coefficients necessary for the next vertical analysis filtering) generated intermediately during division level 1 vertical analysis filtering (in the computation process of vertical analysis filtering), in the midway calculation buffer unit 117 as coefficients for intermediate calculation (D17).

Figure 4:
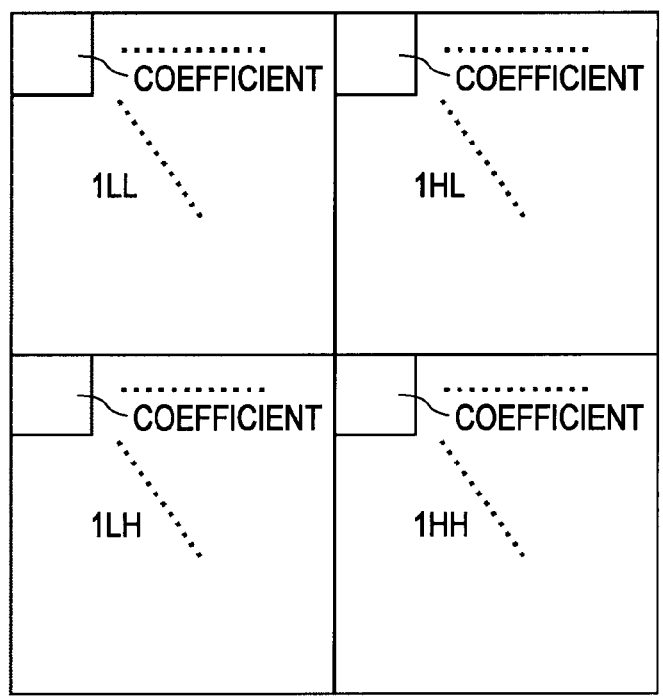
FIG. 4 is a diagram illustrating the results of performing analysis filtering to division level 1.

As a result of the division level 1 vertical analysis filtering (i.e., the results of division level 1 analysis filtering), as shown in FIG. 4, there are generated four sub-band coefficients made up of the lowband sub-band coefficient (1LL) indicating the lowband frequency band (sub-band) in the vertical direction and horizontal direction, and highband sub-band coefficients (1HH, 1LH, 1HL) made up of other sub-bands. Note that in the example shown in FIG. 4, the squares each represent one coefficient, and with the order of "L" and "H", the left side indicates the bandwidth (lowband or highband) as the result of performing horizontal analysis filtering, and the right side indicates the bandwidth (lowband or highband) as the result of performing vertical analysis filtering. Further, the numeral in front of the "L" or "H" indicates the division level.

This is the division level 1 analysis filtering, whereby lowband sub-band coefficient (1LL) and highband sub-band coefficients (1HH, 1LH, 1HL) are generated at the vertical analysis filter unit 118 as a result (D19 and D23). Note that, of these, only the lowband sub-band components are subjected to further analysis filtering. Thus, analysis filtering is repeated recursively regarding the lowband sub-band coefficient of each division level until the set division level (highest order level). On the other hand, the highband sub-band coefficients are not analyzed any further. That is to say, the vertical analysis filter unit 118 outputs the frequency components of the highband sub-bands (1HL, 1LH, 1HH) generated this time externally (D23).

On the other hand, the frequency components of the lowband sub-band (1LL) are output to the horizontal analysis filter unit 119 (D19). The horizontal analysis filter unit 119 performs horizontal analysis filtering (horizontal direction lowband analysis filtering and highband analysis filtering) of the corresponding division level (in this case, division level 2) on the lowband sub-band frequency components rendered to the internal memory, and generates lowband components and highband components which are the results of the horizontal analysis filtering. Subsequently, the processing thereafter is repeated.

That is to say, the horizontal analysis filter unit 119 stores and holds the coefficients of the frequency components (lowband and highband components) obtained as the result of horizontal analysis filtering, in the buffer of the corresponding level (in this case, level 2 buffer 113), as described above with reference to FIG. 3 (D20).

Upon coefficients of the frequency components obtained as a result of the horizontal analysis filtering being accumulated in the level 2 buffer 113 for a predetermined number of vertical lines whereby vertical analysis filtering can be performed, the coefficients of the frequency components of the necessary number of vertical lines are read out from the level 2 buffer 113 (D13), and are input to the vertical analysis filter unit 118, via the selector 116 (D16). Subsequently, intermediate calculation coefficients are read out from the midway calculation buffer unit 117 (D18), and division level 2 vertical analysis filtering is performed using the intermediate calculation coefficients thereof.

A part of the coefficients in the middle of the division level 2 vertical analysis filtering are stored in the midway calculation buffer unit 117, as a result of the division level 2 vertical analysis filtering, the frequency components of four frequency bands made up of the lowband sub-band (2LL) and highband sub-bands (2HH, 2LH, 2HL) are generated. Of these, the coefficients of the highband sub-bands (2HH, 2LH, 2HL) are externally output (D23). The coefficients of the lowband sub-band (2LL) are supplied to the horizontal analysis filter unit 119 (D19).

The horizontal analysis filter unit 119 subjects the coefficient of the division level 2 lowband sub-band (2LL) to the division level 2 horizontal analysis filtering to generate lowband components and highband components that are the horizontal analysis filtering results. The horizontal analysis filter unit 119 supplies these coefficients to the level 3 buffer 114 to store and hold these (D21). These coefficients are supplied to the vertical analysis filter unit 118 again, and the vertical analysis filtering is performed.

Thus, the vertical analysis filtering and horizontal analysis filtering are executed regarding the coefficient of the lowband sub-band of each division level recursively until the division level reaches the highest order level. The coefficients of the highband sub-bands generated at each division level are sequentially output externally (D23).

When reaching the highest order level (division level 4) of the division levels, which has been set beforehand, the vertical analysis filter unit 118 outputs the frequency components (4LL, 4HL, 4LH, 4HH) of the highest order level thereof externally (D23). Thus, the wavelet transformation of the division level 4 image signal is completed.

As described above, the wavelet transformation device 100 shown in FIG. 1 has buffers for each division level from level 1 to a predetermined number of levels, and stores the horizontal analysis filtering results in buffers of each division level while performing the horizontal analysis filtering. Accordingly, vertical direction filtering can be performed while reading out the results of the horizontal analysis filtering from the buffer of each division level. That is to say, horizontal direction and vertical direction analysis filtering can be performed simultaneously in parallel. Thus, the wavelet transformation device 100 can execute wavelet transformation at high speed for moving images and images with high resolution, as well.

Also, with the wavelet transformation device 100 shown in FIG. 1, the midway calculation buffer unit 117 is provided along with the buffers for each division level from level 1 to a predetermined number of levels, and coefficients necessary for the next processing are held when performing vertical direction analysis filtering, and the coefficients are read out at the time of the next vertical analysis filtering, so there is no need to configure external memory.

Accordingly, there is no need to exchange data with external memory, and wavelet transformation can be performed at high speeds. Consequently, there is no need to raise the clock frequency in order to increase speed of data between the external memory and the wavelet transformation device, thereby conserving electric power.

Next, the computation method in the above-described analysis filtering will be described in detail. The most common computation method in analysis filtering computation methods is a method called convolution computation. This convolution computation is the most basic way to realize digital filters, with convolution multiplication being performed on actual input data on filter tap coefficients. However, with convolution computation, if the tap length is great, there cases wherein the calculation load increases accordingly.

Wavelet transformation lifting, introduced in the paper "W. Swelden, 'The lifting scheme: A custom-design construction of biorthogonal wavelets', Appl. Comput. Harmon. Anal., Vol 3, No. 2, pp. 186-200, 1996", is a known technique for handling this.

Figure 5:
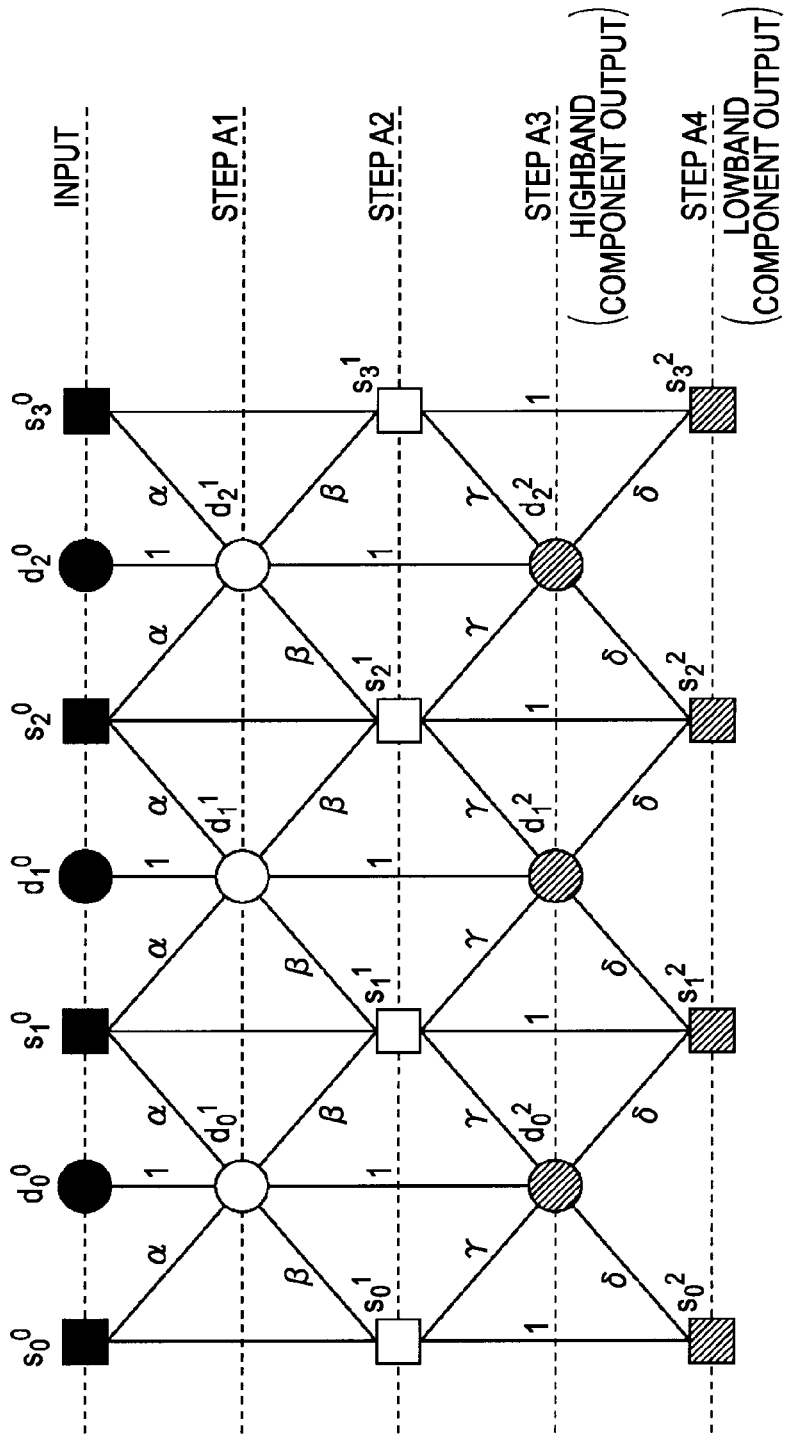
FIG. 5 is a diagram of r describing an example of a lifting scheme with a 9×7 analysis filter.

FIG. 5 illustrates a lifting scheme of a 9×7 analysis filter used with the JPEG (Joint Photographic Experts Group) 2000 standard as well. Analysis filtering in a case of applying the lifting technique to this 9×7 analysis filter will be described.

In the example shown in FIG. 5, the first tier (highest tier) illustrates a sample group of an input image (pixel row), and the second and third tiers indicate components (coefficients) generated at a step A1 and step A2, respectively. Also, the fourth tier indicates highband component output generated at the processing in step A3, and the fifth tier indicates lowband component output generated at the processing in step A4. The top tier is not restricted to a sample group of an input image, and may be coefficients obtained from previous analysis filtering. Note that here, top tier is a sample group of an input image, with the solid squares representing even samples or lines, and the solid circles representing odd samples or lines.

With the analysis filtering applying the lifting technique to the 9×7 analysis filter, highband components are obtained by the processing in step A3, and lowband components are obtained by the processing in step A4. The processing of step A1 through step A4 can be represented by the following Expressions (1) through (4).

$$\text{Step A1: } d_i^1 = d_i^0 + \alpha(s_i^0 + s_{i+1}^0) \quad (1)$$

$$\text{Step A2: } s_i^1 = s_i^0 + \beta(d_{i+1}^1 + d_i^1) \quad (2)$$

$$\text{Step A3: } d_i^2 = d_i^1 + \gamma(s_i^1 + s_{i+1}^1) \quad (3)$$

$$\text{Step A4: } s_i^{s=s}{}_i + \delta(d_{i-1}^2 + s_i^2) \quad (4)$$

wherein $\alpha = -1.586134342$, $\beta = -0.05298011857$, $\gamma = 0.8829110755$, and $\delta = 0.4435068520$ Thus, with the analysis filtering applying the lifting technique, the processing of step A1 and step A2 is performed, highband component coefficients are generated at step A3, following which lowband component coefficients are generated at step A4. The filter bank used at this time can be realized with addition and shift computations alone, as can be seen from Expressions (1) through (4). Accordingly, the amount of calculations can be markedly reduced. Thus, this lifting technique will be applied to the horizontal analysis filtering and the vertical analysis filtering with the wavelet transformation device 100 as well, as described next.

Figure 6:
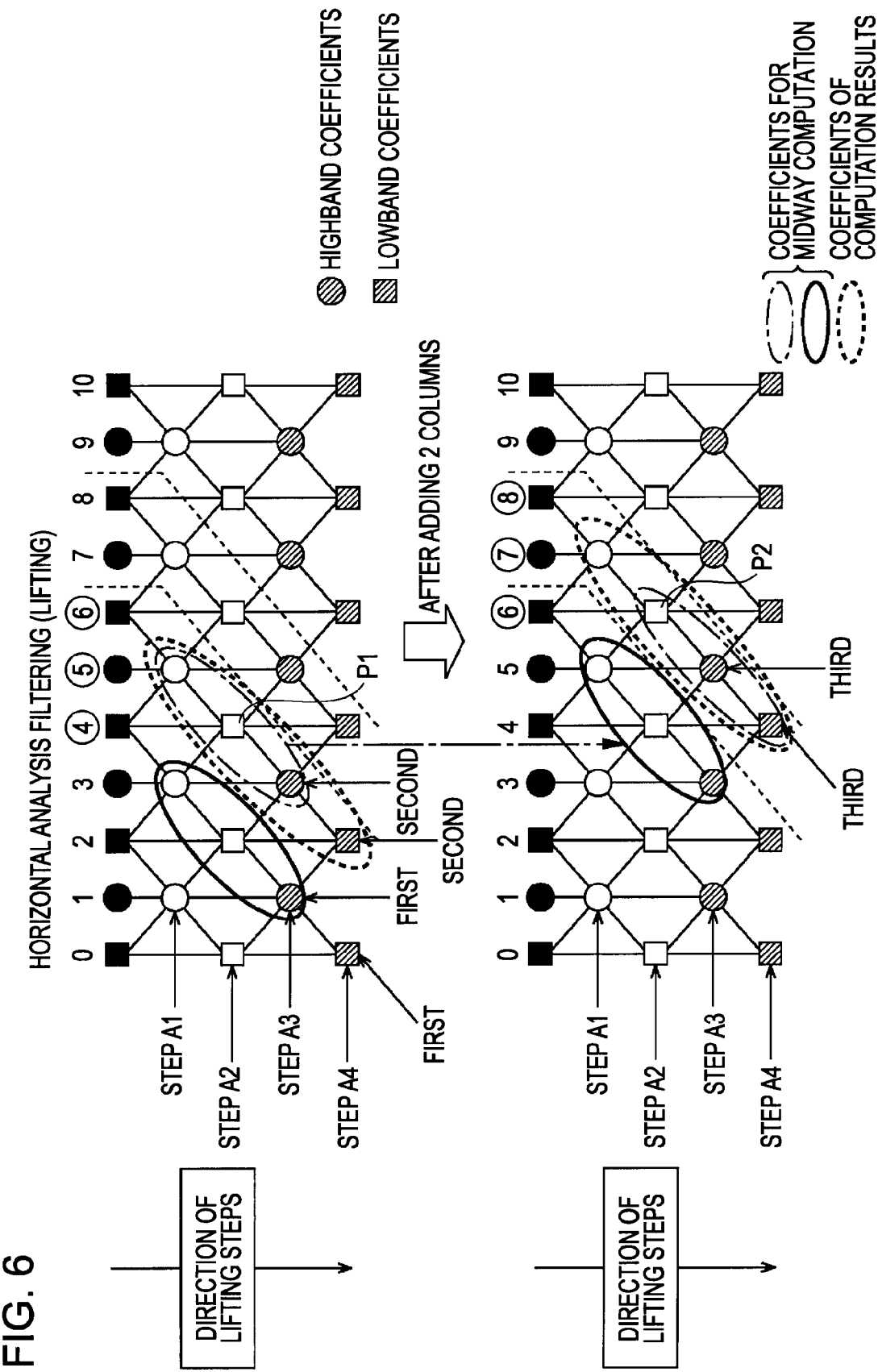
FIG. 6 is a diagram for describing a case of executing horizontal analysis filtering as to a coefficient group in the horizontal direction, with the lifting scheme shown in FIG. 5.

First, the horizontal analysis filtering performed by the horizontal analysis filter units 111 and 119 will be described in detail. FIG. 6 illustrates an example of performing horizontal analysis filtering as to a coefficients group in the horizontal direction, with the lifting scheme shown in FIG. 5.

The example shown in FIG. 6 shows an example of the horizontal direction coefficients that are input being subjected to the processing of the four steps (Steps A1 through A4) described above with FIG. 5 whereby the highband component coefficients (hereafter also referred to as "highband coefficients") and the lowband component coefficients (hereafter also referred to as "lowband coefficients") are generated, with the direction of lifting steps proceeding downwards from the top in the drawing. Also, the numbers shown above the coefficients in the horizontal direction are column Nos.

Further, the circles and squares at the first tier at the top represent the input highband coefficients and lowband coefficients, respectively, and the circles and squares at the subsequent tiers represent the highband coefficients and lowband coefficients generated in the process of lifting computation, respectively. Particularly, the hatched circles and squares represent the highband coefficients and lowband coefficients which are the results of the lifting computation, respectively.

The following is a description of operations in order from the top. The top tier in FIG. 6 illustrates a case wherein three columns of coefficients, column Nos. 4 through 6 in the horizontal direction, are input, and computation with a lifting scheme in the horizontal direction (hereafter referred to as "horizontal lifting computation") is performed.

In order to obtain the first highband coefficient in step A3 of the horizontal lifting computation and obtain the first lowband coefficient in step A4, there is the need to input the coefficients of the four columns of Nos. 0 through 3.

Subsequently, in order to obtain the second highband coefficients and lowband coefficients, there is the need for the three coefficients indicated by the heavy solid lines and the coefficients of the two columns of Nos. 5 and 6 indicated by circled numbers, and further, in order to calculate the coefficient indicated by P1 at step A2, the coefficient of the column No. 4 indicated by a circled number is also necessary.

The three coefficients indicated by the heavy solid lines are a part of the coefficients generated in the process of the horizontal lifting computation for obtaining the first highband coefficient and lowband coefficient (hereafter also referred to as "first horizontal lifting computation").

That is to say, in order to obtain the second highband coefficient and lowband coefficient, there is ultimately the need to input the coefficients of the three columns of Nos. 4 through 6, and further, latch the three coefficients indicated by the heavy solid lines that are generated in the process of the first horizontal lifting computation as intermediate calculation coefficients. Actually, with this being no more than three coefficients, a flip-flop which is often used as a latch can be built into the horizontal analysis filter unit 111 and the horizontal analysis filter unit 119.

Accordingly, performing horizontal lifting computation using the three coefficients indicated by the heavy solid line that have been latched at the first horizontal lifting computation, and the coefficients of the three columns of Nos. 4 through 6 that have been input, generates four coefficients (indicated by the heavy dotted line) including the second highband coefficient and lowband coefficient at the point that the computation process thereof ends. Of these, the three coefficients indicated by the single-dot broken line are coefficients necessary for obtaining the third highband coefficient and lowband coefficient, and accordingly are latched at a built-in flip-flop as intermediate calculation coefficients.

An example of a case wherein, following input of the coefficient of column No. 6, the coefficients of the two columns in the horizontal direction are to be additionally input, i.e., the coefficients of the three columns of Nos. 6 through 8 in the horizontal direction are input and horizontal lifting computation is performed, is shown at the lower half of FIG. 6.

In the same way as with the second case, in order to obtain the third highband coefficient and lowband coefficient, it is found that there is the need for the three coefficients indicated by the heavy solid lines and the coefficients of the two columns of Nos. 7 and 8 indicated by circled numbers, and further, in order to calculate the coefficient indicated by P2 at step A2, the coefficient of the column No. 6 indicated by a circled number is also necessary.

Note that the three coefficients indicated by the heavy solid line at the lower half have been latched at a flip-flop in the second horizontal lifting computation, as indicated by the single-dot broken line at the upper half of the diagram.

Accordingly, performing horizontal lifting computation using the three coefficients indicated by the heavy solid line that have been latched at the second horizontal lifting computation, and the coefficients of the three columns of Nos. 6 through 8 that have been input, generates four coefficients (indicated by the heavy dotted line) including the third highband coefficient and lowband coefficient. Of these, the three coefficients indicated by the single-dot broken line are coefficients necessary for obtaining the fourth highband coefficient and lowband coefficient, and accordingly are latched at a built-in flip-flop.

Thus, the horizontal lifting computation is performed to the far right column of the screen while sequentially inputting three columns worth of coefficients and holding the three intermediate computation coefficients, thereby completing horizontal direction analysis filtering.

Note that while the above has been description of an example of one line worth of horizontal analysis filtering using a lifting scheme, operations of using the above operations to perform horizontal analysis filtering by the lifting scheme while sequentially inputting lines of coefficients from the top toward the bottom, will be described with reference to FIG. 7. Coefficients corresponding to those in FIGS. 5 and 6 are indicated in the same way in FIG. 7, and description thereof would be redundant and accordingly will be omitted.

Figure 7:
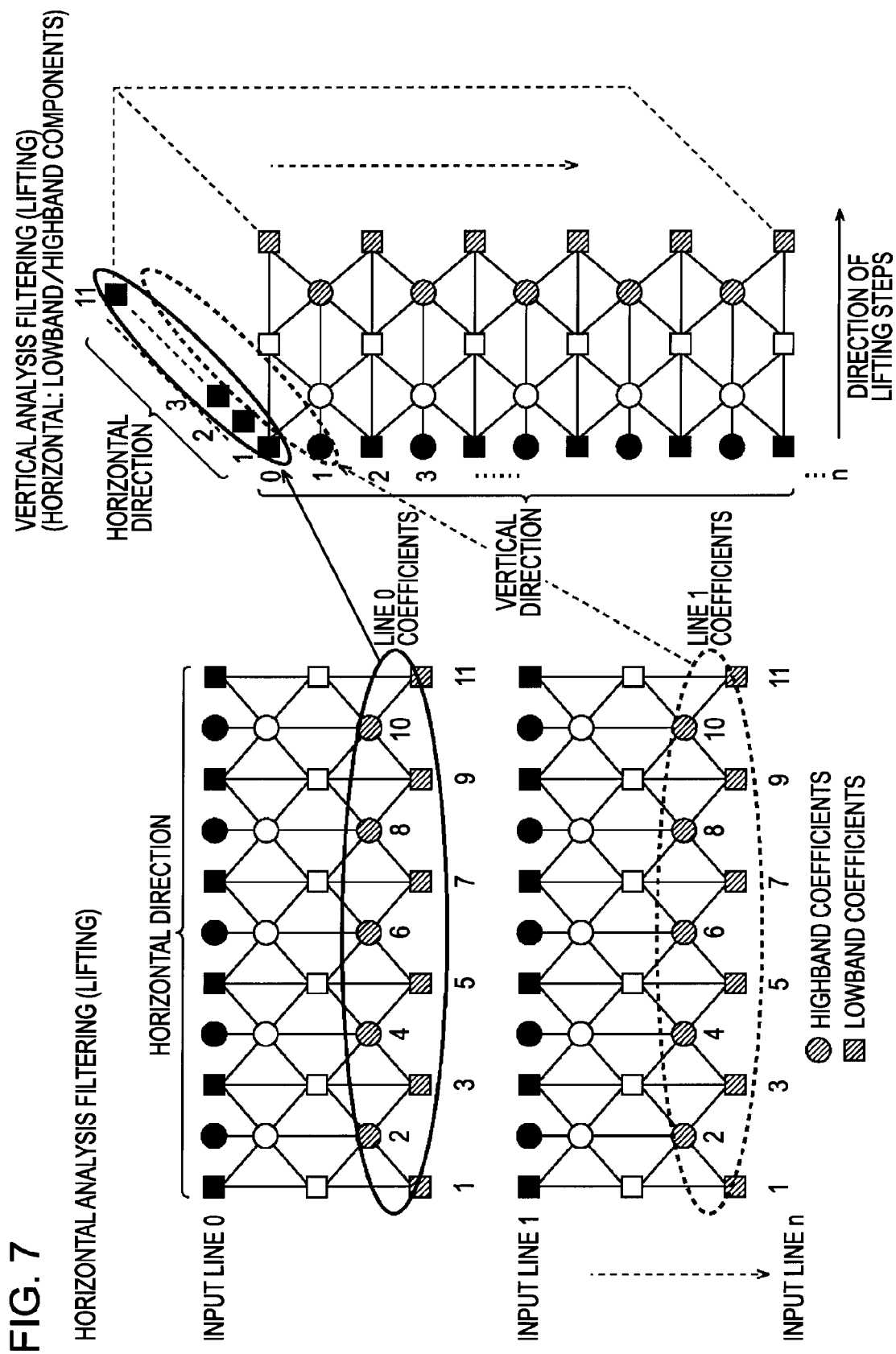
FIG. 7 is a diagram for describing the operation of performing horizontal analysis filtering with the lifting scheme, sequentially inputting lines of coefficients from the top downwards.

FIG. 7 schematically shows at the left side thereof, an example of horizontal lifting computation being performed on each input line, and at the right side thereof, an example of vertical lifting computation being performed as to the coefficients obtained as the results of the horizontal lifting computation of each input line, sequentially rendered in the vertical direction from top to bottom.

Describing the diagram in order from the left, the coefficients at the first input line 0 are subjects to horizontal lifting computation of four steps, whereby lowband coefficients and highband coefficients, indicated by Nos. 1 through 11, are generated. Of these, the coefficients to which the odd numbers (1, 3, 5. 7, 9, 11) are assigned are lowband coefficients, and the coefficients to which the even numbers (2, 4, 6, 8, 10) are assigned are highband coefficients.

Though only the input line 1 is illustrated, this holds true for input line 1 through input line n. That is to say, the coefficients at the first input line 1 are subjected to horizontal lifting computation of four steps, whereby lowband coefficients and highband coefficients, indicated by Nos. 1 through 11, are generated, and of these, the coefficients to which the odd numbers (1, 3, 5. 7, 9, 11) are assigned are lowband coefficients, and the coefficients to which the even numbers (2, 4, 6, 8, 10) are assigned are highband coefficients.

As shown to the right in FIG. 7, the coefficients to which 1 through 11, as the results of the horizontal filtering of the input line 0 are assigned, are rendered in the first tier from the top, from the near side to the far side in the horizontal direction. The coefficients to which 1 through 11, as the results of the horizontal filtering of the input line 1 are assigned, are rendered in the second tier from the top, from the near side to the far side in the horizontal direction. The coefficients obtained as the results of the horizontal filtering of the input line 2 are rendered in the third tier from the top, from the near side to the far side in the horizontal direction.

As described above, the coefficients obtained as the results of the horizontal filtering of the input line 0 through input line n are rendered sequentially in the vertical direction from top to bottom, as shown to the right side of FIG. 7. Note that in reality, the coefficients to which 1 through 11, as the results of the horizontal filtering of the input lines are assigned, have the lowband and highband alternately arrayed from the near side to the far side.

As soon as a predetermined number of vertical direction coefficients have been accumulated, i.e., as soon as a predetermined number of lines are accumulated, computation with a lifting scheme in the vertical direction (i.e., vertical lifting computation) is performed from the left to the right, as in indicated by the direction of lifting steps at the right side of FIG. 7.

Figure 8:
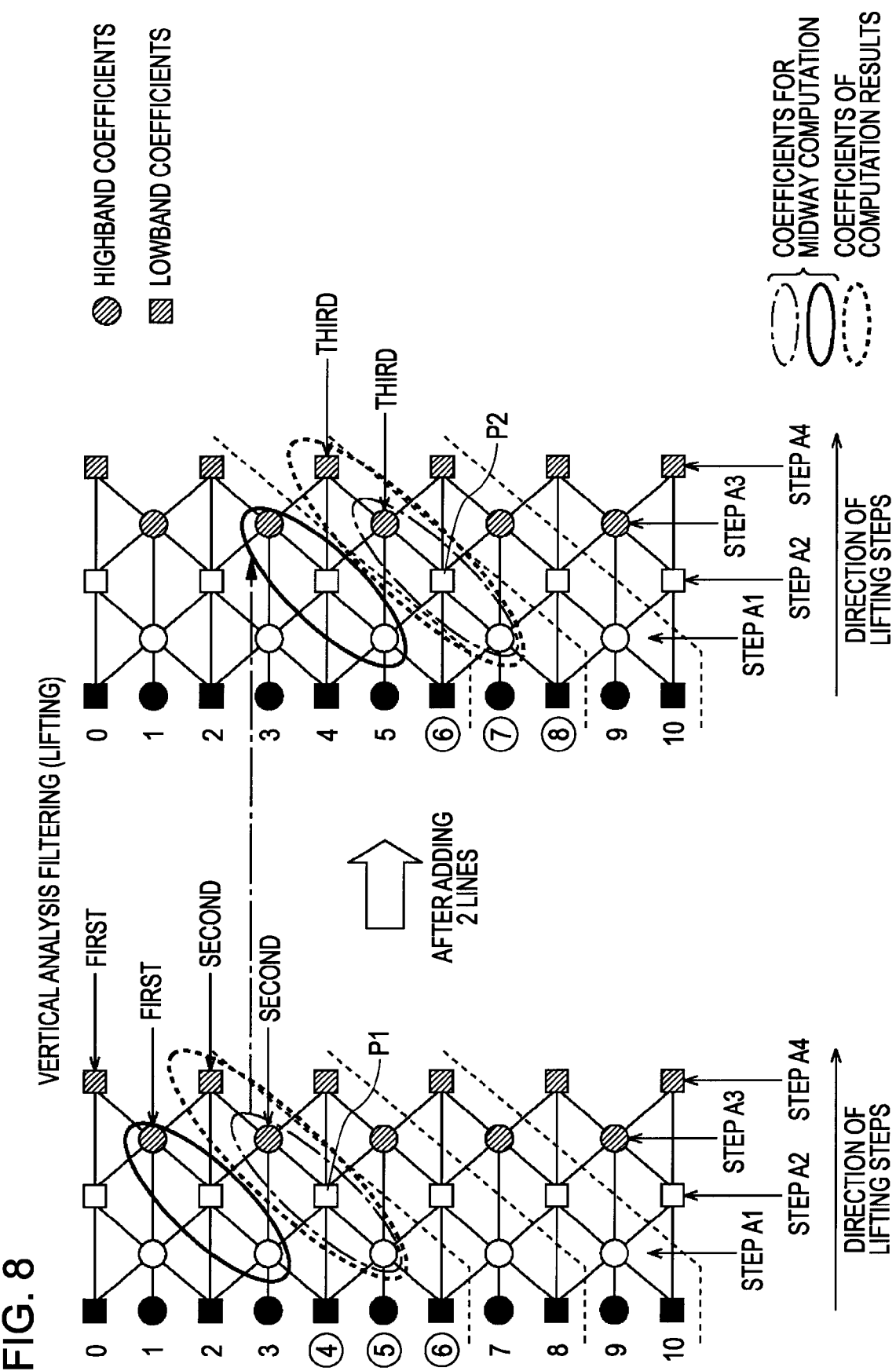
FIG. 8 is a diagram for describing a case of executing the lifting scheme shown in FIG. 5 with vertical analysis filtering as to a coefficient group in the vertical direction.

Next, the vertical analysis filtering executed by the vertical analysis filter unit 118 will be described specifically. FIG. 8 illustrates a case of arraying coefficients obtained by horizontal analysis filtering in the vertical direction as described with reference in FIG. 2, and executing vertical analysis filtering with the lifting scheme shown in FIG. 5.

Note that this diagram only takes note of one of the coefficients rendered and arrayed in the horizontal direction as conceptually shown to the right side of FIG. 7, and it is clearly evident that in actual two-dimensional wavelet transformation the vertical direction analysis filtering calculation needs to be performed as many times as the number of frequency component horizontal direction coefficients, generated in the processes of wavelet transformation.

The example shown in FIG. 8 illustrates an example wherein the coefficients in the vertical direction are subjected to the four steps (step A1 through step A4) described above with FIG. 5, whereby lowband coefficients and highband coefficients are generated, with the direction of lifting steps proceeding from the left to the right in the drawing. Also, the numbers shown to the left of the coefficients in the vertical direction indicate the line Nos.

Further, the circles and squares at the first column from the left indicate the input highband coefficients and lowband coefficients respectively, the circles and squares at the second column and subsequent columns indicate the highband coefficients and lowband coefficients respectively generated in the process of lifting computation, and particularly, the hatched circles and squares indicate the highband coefficients and lowband coefficients generated as the results of lifting computation, respectively.

The operations will now be described in order from the left. The left side of FIG. 8 illustrates an example wherein the coefficients of the three lines of line Nos. 4 through 6 are input in the vertical direction, and vertical lifting computation is performed.

In order to obtain the first highband coefficient in step A3 of the vertical lifting computation, and obtain the first lowband coefficient in step A4, the coefficients of the four lines, line Nos. 0 through 3, are necessary.

Subsequently, in order to obtain the second highband coefficients and lowband coefficients, there is the need for the three coefficients indicated by the heavy solid lines and the coefficients of the two lines of Nos. 5 and 6 indicated by circled numbers, and further, in order to calculate the coefficient indicated by P1 at step A2, the coefficient of the line No. 4 indicated by a circled number is also necessary.

The three coefficients indicated by the heavy solid lines are a part of the coefficients generated in the process of the vertical lifting computation for obtaining the first highband coefficient and lowband coefficient (hereafter also referred to as "first vertical lifting computation").

That is to say, in order to obtain the second highband coefficient and lowband coefficient, there is ultimately the need to input the coefficients of the three lines of Nos. 4 through 6, and further, store the three coefficients indicated by the heavy solid lines that are generated in the process of the first vertical lifting computation as intermediate calculation coefficients, in the midway calculation buffer unit 117 shown in FIG. 1. At this time, the coefficients of the three lines in the vertical direction are read out for each level, from a buffer of the corresponding level. That is to say, in the event that the current wavelet transformation division level is 2, the coefficients are read out from the level 2 buffer 113.

Accordingly, performing vertical lifting computation using the three coefficients indicated by the heavy solid line that have been stored in the midway calculation buffer unit 117 at the first vertical lifting computation, and the coefficients of the three lines of Nos. 4 through 6 that have been input, obtains four coefficients (indicated by the heavy dotted line) including the second highband coefficient and lowband coefficient. Of these, the three coefficients indicated by the single-dot broken line are coefficients necessary for obtaining the third highband coefficient and lowband coefficient, and accordingly are stored in the midway calculation buffer unit 117.

An example of a case wherein, following readout of the coefficient of line No. 6, two lines are to be additionally read out, i.e., the coefficients of the three lines of Nos. 6 through 8 in the vertical direction are input and vertical lifting computation is performed, is shown at the right in FIG. 8.

In the same way as with the second case, in order to obtain the third highband coefficient and lowband coefficient, it is found that there is the need for the three coefficients indicated by the heavy solid lines and the coefficients of the two lines of Nos. 7 and 8 indicated by circled numbers, and further, in order to calculate the coefficient indicated by P2 at step A2, the coefficient of the line No. 6 indicated by a circled number is also necessary.

Note that the three coefficients indicated by the heavy solid line at the right side have been stored in the midway calculation buffer unit 117 in the second vertical lifting computation, as indicated by the single-dot broken line at the left of the diagram.

Accordingly, performing vertical lifting computation using the three coefficients indicated by the heavy solid line that have been stored at the second vertical lifting computation, and the coefficients of the three lines of Nos. 6 through 8 that have been read out from corresponding level buffers and input, obtains four coefficients (indicated by the heavy dotted line) including the third highband coefficient and lowband coefficient. Of these, the three coefficients indicated by the single-dot broken line are coefficients necessary for obtaining the fourth highband coefficient and lowband coefficient, and accordingly are stored in the midway calculation buffer unit 117.

Thus, the vertical lifting computation is performed to the bottom line of the screen while sequentially inputting three lines worth of coefficients and holding the three intermediate computation coefficients, thereby completing vertical direction analysis filtering.

As described above, access to the midway calculation buffer unit 117 (reading out and writing of data) is performed whenever the vertical analysis filtering is performed, i.e., performed frequently. It can be conceived as a method for realizing the midway calculation buffer unit 117 to employ a method using large-capacity memory (external memory) provided outside an LSI (Large Scale Integration) for realizing the vertical analysis filter unit 118, but in general, the operation speed of external memory is low as compared with a computation processing unit within an LSI chip, so the operation thereof is slow. Also, in order to access to external memory, it is necessary to pass through the shared bus of which the operation speed is low, which is employed for another processing unit, and accordingly, reading out and writing of data may be even slower. Accordingly, when realizing the midway calculation buffer unit 117 having a high access frequency using such external memory, the processing speed of the vertical analysis filtering may decrease drastically, and delay time increase.

Figure 9:
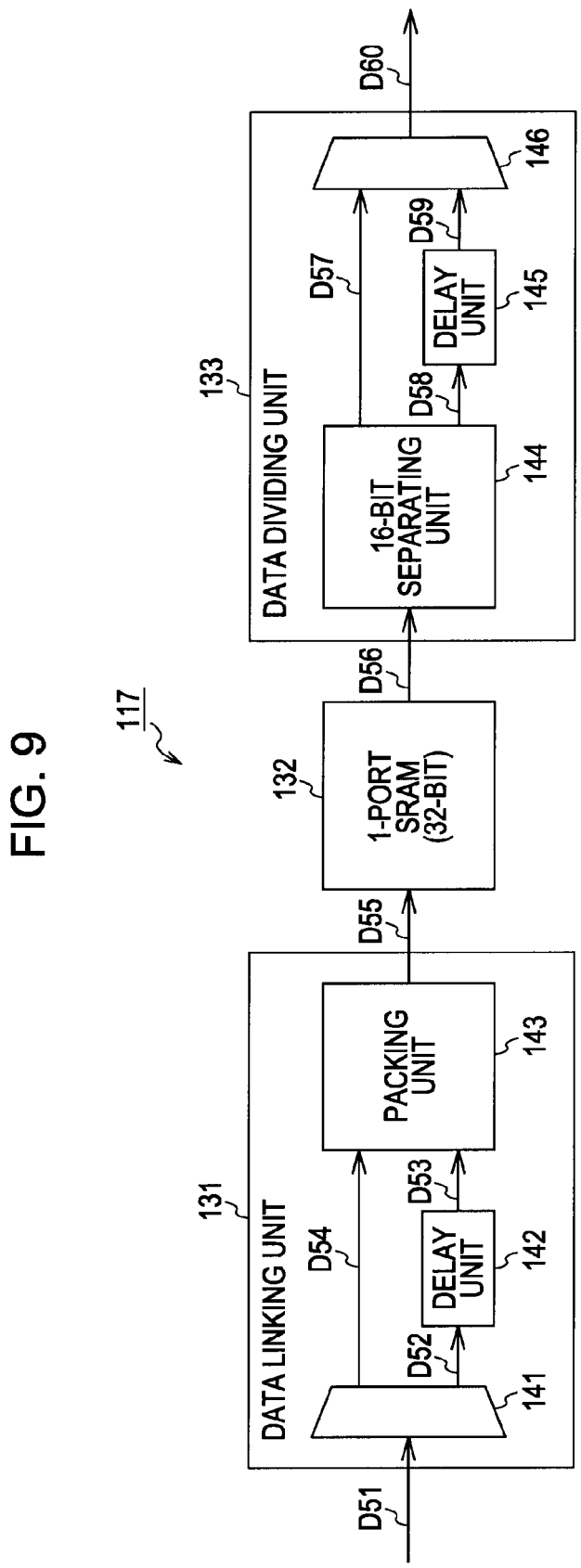
FIG. 9 is a block diagram illustrating a detailed configuration example of the midway calculation buffer unit shown in FIG. 1.

Therefore, it is desirable to realize the midway calculation buffer unit 117 using memory capable of high speed operation provided within an LSI chip for realizing the vertical analysis filter unit 118. In this case as well, it is desirable to realize further high-speed access. FIG. 9 is a block diagram illustrating a configuration example of the midway calculation buffer unit 117.

As shown in FIG. 9, the midway calculation buffer unit 117 includes a data linking unit 131, 1-port SRAM (Static Random Access Memory) 132, and a data dividing unit 133.

The data linking unit 131 links two pieces of 16-bit data supplied consecutively from the vertical analysis filter unit 118 (D51) to generate 32-bit data and supply this to the 1-port SRAM 132 (D55). The data linking unit 131 includes a selector 141, delay unit 142, and packing unit 143.

The selector 141 takes two pieces of 16-bit data supplied consecutively as a pair, and distributes these so as to supply one supplied previously to the delay unit 142 (D52), and supply the other supplied lately to the packing unit 143 (D54). The delay unit 142 delays the timing of the supplied 16-bit data by one cycle worth (up to the next data supply timing), and then supplies this to the packing unit 143 (D53). That is to say, two pieces of data are supplied to the packing unit 143 simultaneously. The packing unit 143 links the two pieces of 16-bit data to generate 32-bit data, and supplies the 32-bit data thereof to the 1-port SRAM 132 to hold this (D55).

The data dividing unit 133 reads out the 32-bit data from the 1-port SRAM 132 (D56), divides the one piece of 32-bit data into two pieces of 16-bit data, and outputs these consecutively (D60). The data dividing unit 133 includes a 16-bit separating unit 144, delay unit 145, and selector 146.

The 16-bit separating unit 144 separates the 32-bit data read out from the 1-port SRAM 132 into upper 16 bits and lower 16 bits to generate two pieces of 16-bit data, and supplies the 16-bit data which is the upper 16 bits to the selector 146 (D57), and supplies the 16-bit data which is the lower 16 bits to the delay unit 145 (D58). The delay unit 145 delays the timing of the 16-bit data which is the lower 16 bits by one cycle worth, and supplies this to the selector 146 (D59). The selector 146 switches input to the 16-bit separating unit 144 or delay unit 145 alternately for every cycle. Thus, the two pieces of 16-bit data are consecutively output in order (D60).

The 1-port SRAM 132 is a recording medium for performing writing and reading of data using one system, and is controlled by the control unit 120 to store the 32-bit data supplied from the packing unit 143 of the data linking unit 131, and output the stored 32-bit data to the 16-bit separating unit 144 of the data dividing unit 133.

Of memory embedded in an LSI chip which is employed for data storage, RAM (Random Access Memory) performs writing and reading of data electrically, so operation thereof is high speed, but the price per increment area is expensive, leading to a fault wherein it is difficult to use this in large quantities. As a kind of RAM, there is SRAM which employs a flip-flop circuit as a storage element. SRAM has an advantage of high-speed operation whereby there is no need to perform operation for storing and holding data, but has a complicated circuit, and accordingly, integration may suffer. That is to say, in order to promote integration, how much capacity of SRAM can be reduced is crucial.

Figure 10B:
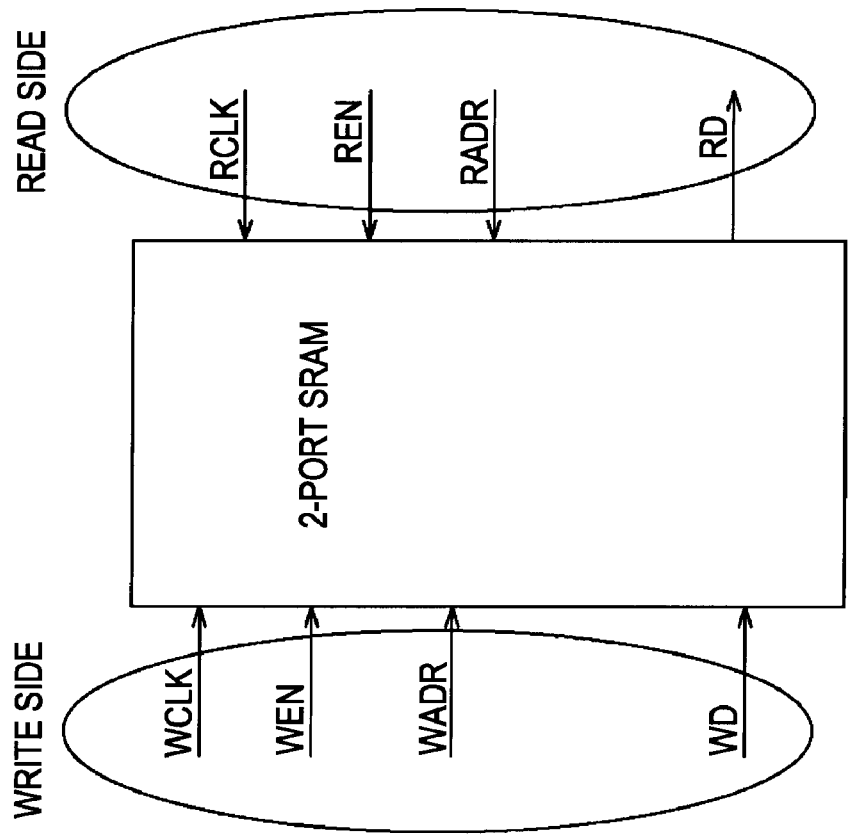
FIGS. 10A and 10B are diagrams illustrating configuration examples of input/output terminals of common 1-port SRAM and 2-port SRAM.
Figure 10A:
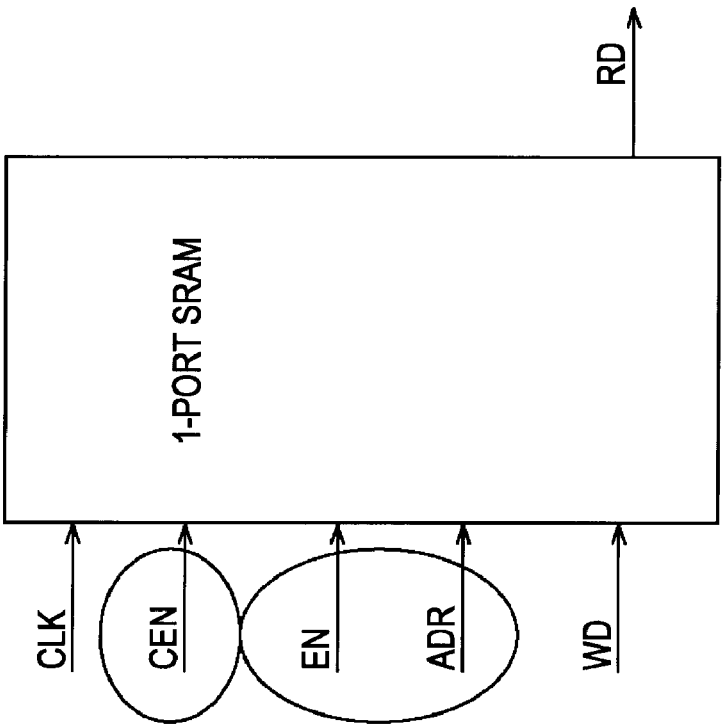

In general, for SRAM, there are 1-port SRAM wherein input and output of data cannot be performed simultaneously, and 2-port SRAM wherein input and output of data can be performed simultaneously, and each has input and output terminals such as shown in FIG. 10A or 10B.

That is to say, 1-port SRAM generally has, as shown in FIG. 10A, a terminal to which a clock signal "CLK" is input, a terminal to which a chip enable signal "CEN" is input, a terminal to which an enable signal "EN" is input, which controls input/output of data is input, a terminal to which address information "ADR" is input, which specifies an address for writing 32-bit data or an address for reading out 32-bit data, a terminal to which 32-bit write data "WD" is input, and a terminal from which 32-bit readout data "RD" is output.

On the other hand, 2-port SRAM generally has, as shown in FIG. 10B, a terminal to which a write clock signal "WCLK" is input, a terminal to which a write control enable signal "WEN" is input, a terminal to which write address information "WADR" is input, which specifies an address for writing 32-bit data, a terminal to which 32-bit write data "WD" is input, a terminal to which a readout clock signal "RCLK" is input, a terminal to which a readout control enable signal "REN" is input, a terminal to which readout address information "RADR" is input, which specifies an address for reading out 32-bit data, and a terminal from which the 32-bit readout data "RD" is output.

In the case of 1-port SRAM shown in FIG. 10A, the chip enable signal "CEN" is a signal for switching a readout operation and writing operation, the two signals of the enable signal "EN" and address information "ADR" are shared with a readout operation and writing operation. For example, in a case wherein the chip enable signal "CEN" specifies a readout operation, the enable signal "EN" becomes a signal for controlling readout operation timing, and the address information "ADR" becomes a signal for specifying the address of data to be read out. Conversely, in a case wherein the chip enable signal "CEN" specifies a writing operation, the enable signal "EN" becomes a signal for controlling writing operation timing, and the address information "ADR" becomes a signal for specifying the address of data to be written in. That is to say, 1-port SRAM cannot perform a readout operation and writing operation simultaneously.

On the other hand, in the case of 2-port SPAM shown in FIG. 10B, the signal for controlling a writing operation and the signal for controlling a readout operation are mutually completely independent. That is to say, 2-port SRAM can perform a readout operation and writing operation at arbitrary timing, and accordingly, can perform a readout operation and writing operation in parallel.

Figure 11A:
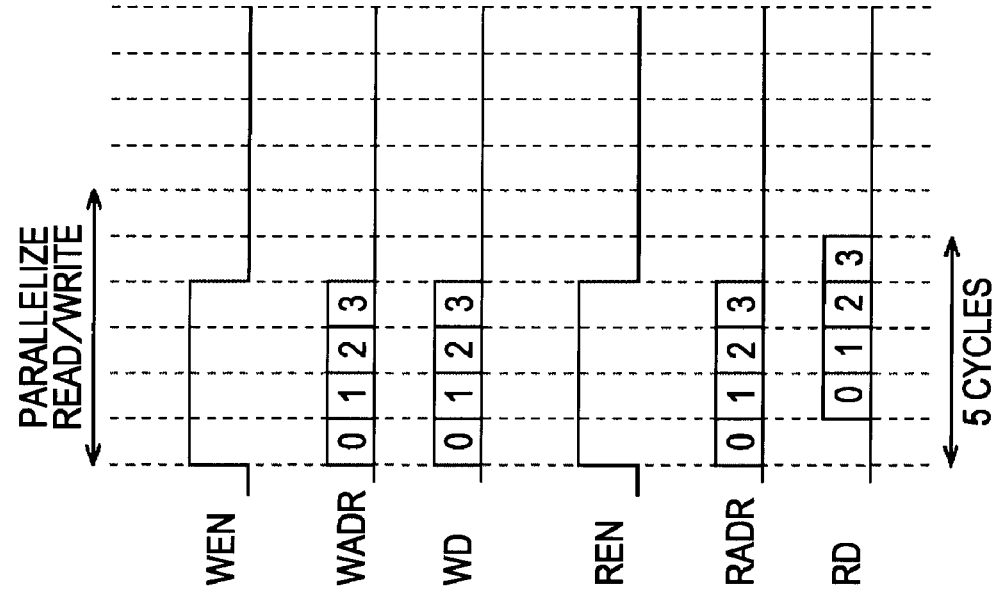
FIGS. 11A and 11B are diagrams illustrating examples of the timing of data input/output with common 1-port SRAM and 2-port SRAM.
Figure 11B:
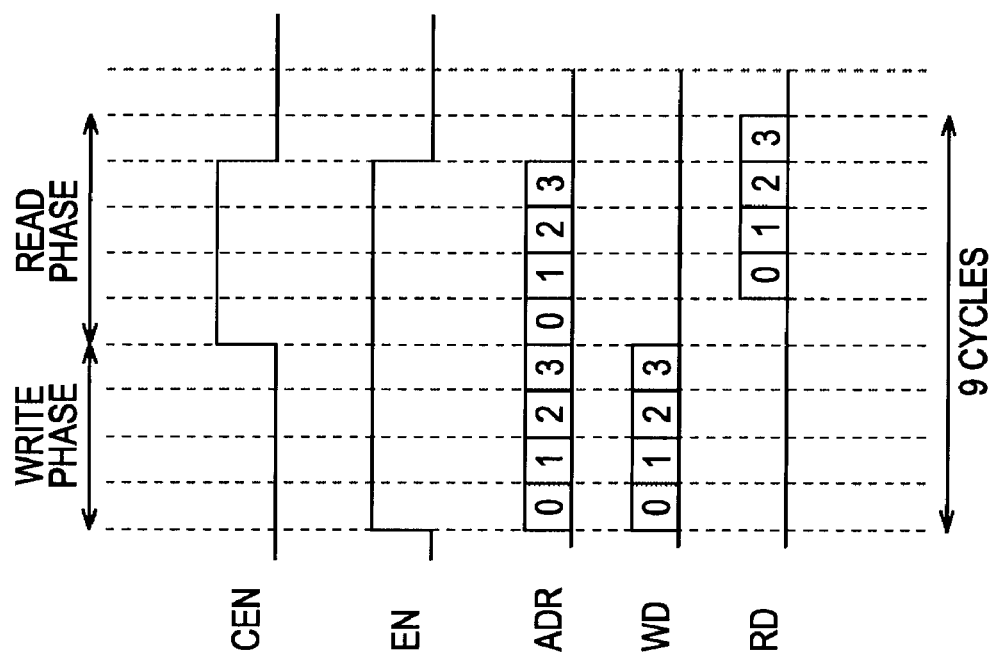

FIGS. 11A and 11B are schematic views illustrating a timing chart in a case wherein four pieces of data is written in such 1-port SRAM and 2-port SRAM, and further these pieces of data are read out therefrom immediately.

FIG. 11A illustrates a timing chart example in the case of 1-port SRAM, and FIG. 11B illustrates a timing chart example in the case of 2-port SRAM.

Such as shown in FIG. 11A, in the case of 1-port SRAM, the four pieces of data are consecutively written (four cycles) in accordance with the enable signal "EN", following one cycle passage according to the latency of SRAM, the written four pieces of data are read out consecutively (four cycles). Accordingly, 1-port SRAM needs the time of a total of nine cycles for writing and readout processing of the four pieces of data. Note that "cycle" indicates the synchronous timing of the processing, i.e., time serving as the increments of timing sharing. For example, here, the writing or readout timing (or the cycle thereof) of data is indicated.

On the other hand, as shown in FIG. 11B, in the case of 2-port SRAM, both of the write control enable signal "WEN" and readout control enable signal "REN" exist, whereby the readout operation and writing operation of the four pieces of data can be parallelized. Accordingly, as shown in FIG. 11B, with 2-port SRAM, a readout operation and writing operation can be executed with four cycles, and the processing can be completed with a total of five cycles including the latency of one cycle.

In the case of an HDTV (High Definition TeleVision), the horizontal size of one line is 1920 pixels, so when the coefficients of one line worth thereof are written in 1-port SRAM, and further, are read out, 1920×2=3840 cycles are needed. That is to say, with the analysis filtering, when 1-port SRAM is applied as the midway calculation buffer unit 117, delay time may increase.

In order to reduce this number of cycles, there is the need to employ 2-port SRAM instead of 1-port SRAM, but 2-port SRAM is generally equivalent to having two configurations of 1-port SRAM internally, manufacturing costs are expensive, and also the circuit area reaches generally double that of 1-port SRAM. In an ordinary case, with the circuit scale of memory, the occupancy rate is high among LSI chips, and increase in a memory area may lead to increase in chip area.

Therefore, an arrangement is made here wherein 1-port SRAM 132 is applied as the midway calculation buffer unit 117, as shown in FIG. 9 data to be written in the 1-port SRAM 132 is linked using the data linking unit 131 to generate 32-bit data, the data is read out in increments of 32 bits using the 1-port SRAM 132, the 32-bit data thereof is separated into two pieces of 16-bit data using the data dividing unit 133, whereby readout and writing of data as to the 1-port SRAM 132 can be operated in parallel.

Description will be made regarding the operation flow of each unit of the midway calculation buffer unit 117 shown in FIG. 9 with reference to the timing chart shown in FIG. 12.

AS shown in the fourth tier from the top of FIG. 12, when 16-bit write data (WD16 bit) "0" is supplied at the first cycle, the selector 141 of the data linking unit 131 delays the data "0" by one cycle through the delay unit 142, and supplies this to the packing unit 143. Subsequently, when 16-bit write data "1" is supplied at the second cycle, the selector 141 of the data linking unit 131 supplies the data "1" to the packing unit 143. At the second cycle, the packing unit 143 links the data "0" and "1", thereof to generate 32-bit write data (WD32 bit) "0, 1", and writes the data "0, 1" in an address "0" in accordance with the writing instructions indicated with the first tier through third tier from the top of FIG. 12.

Also, as shown in the fourth tier from the top of FIG. 12, when 16-bit write data (WD16 bit) "2" is supplied at the third cycle, the selector 141 of the data linking unit 131 delays the data "2" by one cycle through the delay unit 142, and supplies this to the packing unit 143. That is to say, at this third cycle, writing to the 1-port SRAM 132 is not performed.

Accordingly, the third cycle thereof, the 16-bit separating unit 144 of the data dividing unit 133 reads out the 32-bit data written in the address "0" in accordance with the readout instructions indicated with the first tier through third tier from the top of FIG. 12, and separates the readout data (RD32 bit) "0, 1" into two pieces of 16-bit data (data "0" and data "1"). The 16-bit separating unit 144 supplies the separated one of the data "0" to the selector 146, and delays the other data "1" by one cycle through the delay unit 145 to supply this to the selector 146. The selector 146 outputs the data "0" and data "1" sequentially (RD16 bit).

As described above, at the fourth cycle, the data "2" delayed and supplied to the packing unit 143 at the third cycle is linked to 16-bit write data "3" supplied to the packing unit 143 from the selector 141 of the data linking unit 131 without passing through the delay unit 142 at the fourth cycle to generate 32-bit write data (WD32 bit) "2, 3". At the fourth cycle, the packing unit 143 writes the data "2, 3" in an address "1" in accordance with the writing instructions indicated with the first tire through third tier from the top of FIG. 12.

As with the third cycle, at the fifth cycle, the 16-bit separating unit 144 of the data dividing unit 133 reads out the 32-bit data written in the address "1" in accordance with the readout instructions indicated with the first tier through third tier from the top of FIG. 12, and separates the readout data (RD32 bit) "2, 3" into two pieces of 16-bit data (data "2" and data "3"). The 16-bit separating unit 144 supplies the separated one of the data "2" to the selector 146, and delays the other data "3" by one cycle through the delay unit 145 to supply this to the selector 146. The selector 146 outputs the data "2" and data "3" sequentially (RD16 bit).

As described above, two-pieces of 16-bit data are read out and written as to the 1-port SRAM as 32-bit data, whereby the midway calculation buffer unit 117 can perform, according to time sharing, writing according to the data linking unit 131 and readout according to the data dividing unit 133 simultaneously in parallel, and accordingly, four pieces of data in a total of five cycles can be written in and further read out from the 1-port SRAM 132. Note that the term "simultaneously in parallel" means that time from writing start to writing end is overlapped on time from readout start to readout end, and strictly, these readout and writing works are not performed "simultaneously", and are not performed "in parallel" (alternately performed according to time sharing).

Thus, the wavelet transformation device 100 can suppress increase in the circuit scale of the midway calculation buffer unit 117, operate the midway calculation buffer unit 117 at high speed, whereby increase in time delay according to wavelet transformation can be suppressed. That is to say, the wavelet transformation device 100 can further reduce the delay time of the wavelet transformation processing, and also reduce costs.

Note that description has been made so far wherein the 1-port SRAM 132 performs input/output of data in increments of 32 bits, but the data increments of input/output of data as to the 1-port SRAM 132 is arbitrary. Also, description has been made wherein input/output of data as to the midway calculation buffer unit 117 is preformed in increments of 16 bits, but the data increments of input/output of data as to the midway calculation buffer unit 117 is also arbitrary. That is to say, the configuration of the data linking unit 131 and data dividing unit 133 shown in FIG. 10 is an example, and in reality, is determined by the data increments of input/output of data as to the 1-port SRAM 132 and the data increments of input/output of data as to the midway calculation buffer unit 117.

However, the basic configuration is similar to the example shown in FIG. 10. That is to say, the data liking unit 131 links multiple pieces of data in predetermined data increments input to the midway calculation buffer unit 117 by spending multiple cycles, generates one piece or multiple pieces of data in data input increments of the 1-port SRAM 132 such that the number of data to be generated is smaller than the supplied number of data, and supplies the data thereof to the 1-port SRAM 132 by spending cycles equivalent to the number of data to hold this. Also, the data dividing unit 133 reads out piece or multiple pieces of data in data output increments of the 1-port SRAM 132 from the 1-port SRAM 132 by spending cycles equivalent to the number of data thereof, separates the readout data into multiple pieces of data in the data output increments of the midway calculation buffer unit 117 to output these from the midway calculation buffer unit 117. The 1-port SRAM 132 performs readout and writing of data in data input/output increments alternately.

Figure 13:
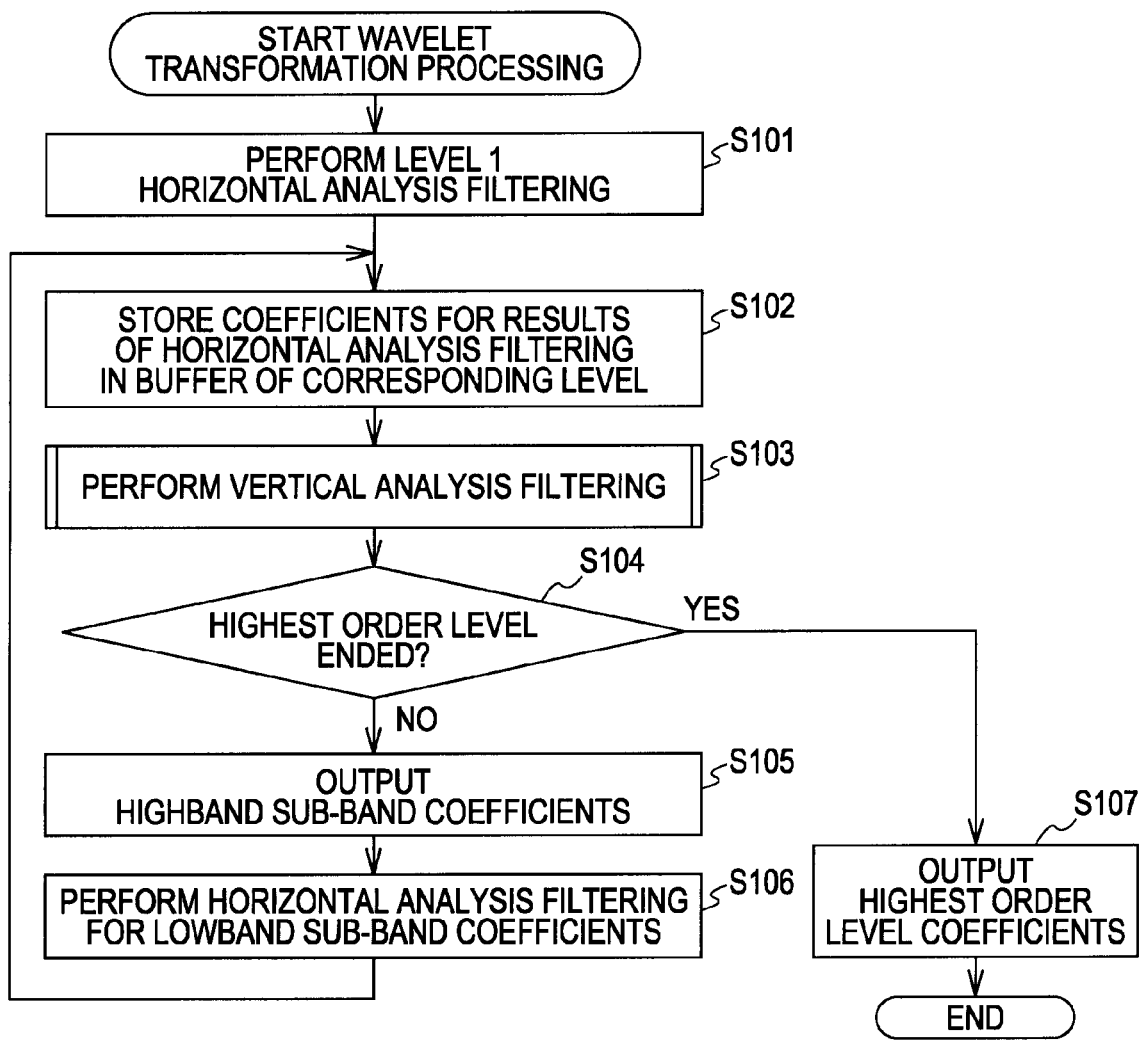
FIG. 13 is a flowchart for describing an example of the flow of wavelet transformation processing.

Description will be made regarding a flow example of the wavelet transformation processing executed by the wavelet transformation device 100 thus configured with reference to the flowchart shown in FIG. 13. Note that this wavelet transformation processing is executed in predetermined processing increments.

When the wavelet transformation processing is started, in step S101 the horizontal analysis filter unit 111 of the wavelet transformation device 100 performs level 1 horizontal analysis filtering, and in step S102 stores the coefficient obtained as a result of the horizontal analysis filtering in the buffer having the level corresponding to the division level of the coefficient thereof, of the level-independent buffer units 121.

In step S103, the vertical analysis filter unit 118 executes vertical analysis filtering, reads out the coefficient stored in step S102, and performs the vertical analysis filtering corresponding to the coefficient thereof. The details of the vertical analysis filtering will be described later.

When the vertical analysis filtering is completed, the control unit 120 determines whether or not the vertical analysis filtering has been performed up to the highest order level. In a case wherein determination is made that the vertical analysis filtering of the highest order level has not been completed, the processing proceeds to step S105. In step S105, the vertical analysis filter unit 118 outputs the generated highband sub-band coefficient externally. In step S106, the horizontal analysis filter unit 119 subjects the lowband sub-band coefficient generated by the vertical analysis filter unit 118 to horizontal analysis filtering. When the processing in step S106 is completed, the processing returns to step S102, where the subsequent processing is repeated. That is to say, the processing in steps S102 through S106 is repeated, whereby the analysis filtering is performed with each division level.

Subsequently, in a case wherein determination is made in step S104 that the analysis filtering of the highest order level has been completed, the processing proceeds to step S107. In step S107, the vertical analysis filter unit 118 outputs all of the coefficients of the highest order level externally. When the processing in step S107 ends, the wavelet transformation processing ends.

Figure 14:
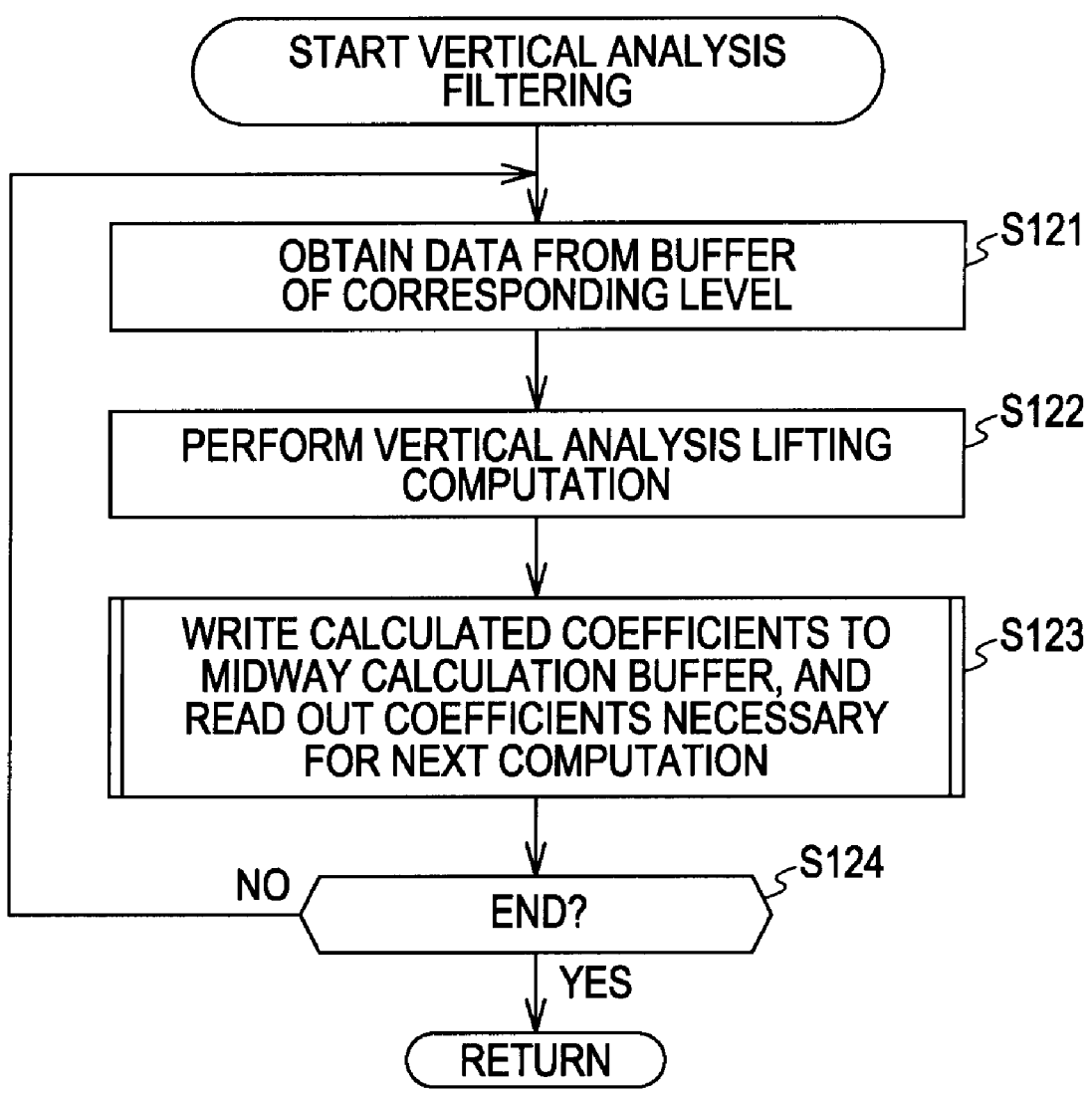
FIG. 14 is a flowchart for describing an example of the flow of vertical analysis filtering processing.

Next, description will be made regarding a detailed flow example of the vertical analysis filtering executed in step S103 shown in FIG. 13 with reference to the flowchart shown in FIG. 14.

When the vertical analysis filtering is started, in step S121 the vertical analysis filter unit 118 obtains data from the buffer having the level corresponding to the current division level to be processed, of the level-independent buffer units 121. In step S122, the vertical analysis filter unit 118 performs vertical analysis lifting calculation to generate a one-level upper coefficient. In step S123, the vertical analysis filter unit 118 executes buffer input/output processing, thereby writing the calculated coefficient in the midway calculation buffer unit 117, and reading out the coefficient necessary for the next calculation. The details of this buffer input/output processing will be described later.

When the buffer input/output processing ends, in step S124 the control unit 120 determines whether or not the vertical analysis filtering ends, and in a case wherein determination is made that an unprocessed coefficient exists, and the vertical analysis filtering is continued, the processing returns to step S121, where the subsequent processing is repeated. Also, in a case wherein determination is made in step S124 that the vertical analysis filtering ends, the vertical analysis filtering ends.

Figure 15:
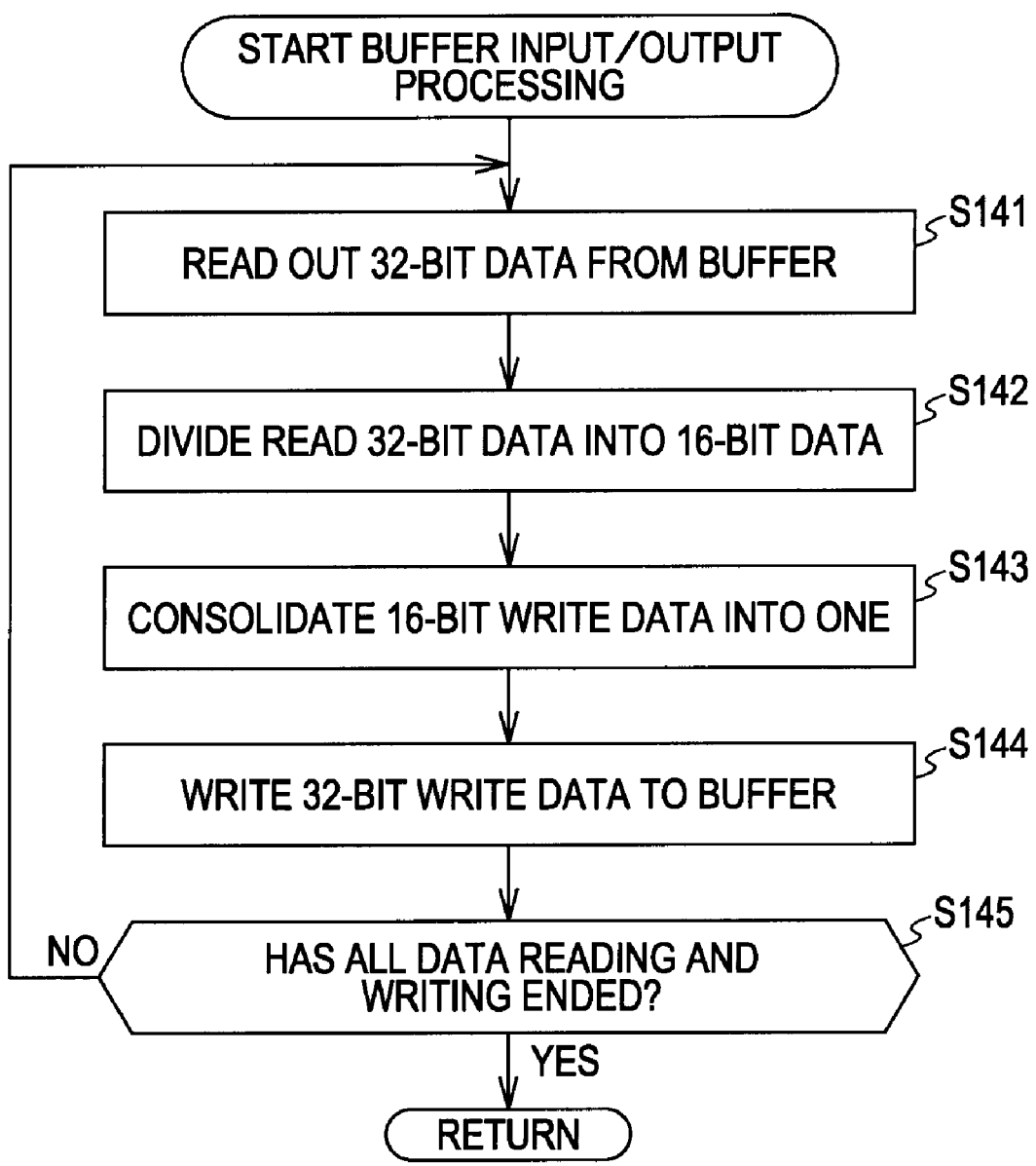
FIG. 15 is a flowchart for describing an example of buffer input/output processing.

Next, description will be made regarding a detailed flow example of the buffer input/output processing executed in step S123 shown in FIG. 14 with reference to the flowchart shown in FIG. 15.

When the buffer input/output processing is started, in step S141 the data dividing unit 133 reads out 32-bit data from the buffer, i.e., the 1-port SRAM 132, and in step S142 divides the readout 32-bit data into 16-bit data to output this.

In step S143, the data linking unit 131 links the two-pieces of 16-bit write data supplied consecutively to generate one piece of 32-bit data, and in step S144 writes the 32-bit data thereof in the buffer, i.e., 1-port SRAM 132.

In step S145, the control unit 120 determines whether or not readout and writing of necessary data has all been completed, and in a case wherein determination is made that readout and writing of necessary data has not been completed, the processing returns to step S141, where the subsequent processing is repeated. Also, in a case wherein determination is made that readout and writing of necessary data has all been completed, the control unit 120 ends the buffer input/output processing.

As described above, with the wavelet transformation device 100, the 1-port SRAM having a configuration such as shown in FIG. 9 is employed as the midway calculation buffer unit 117, whereby the delay time of the wavelet transformation processing can be reduced, and also costs can be reduced.

Note that as long as the wavelet transformation device includes a midway calculation buffer unit for performing input/output of data simultaneously in parallel, the other configurations may be other than the above-mentioned configurations. Hereafter, description will be made regarding other configuration examples of the wavelet transformation device.

Figure 16:
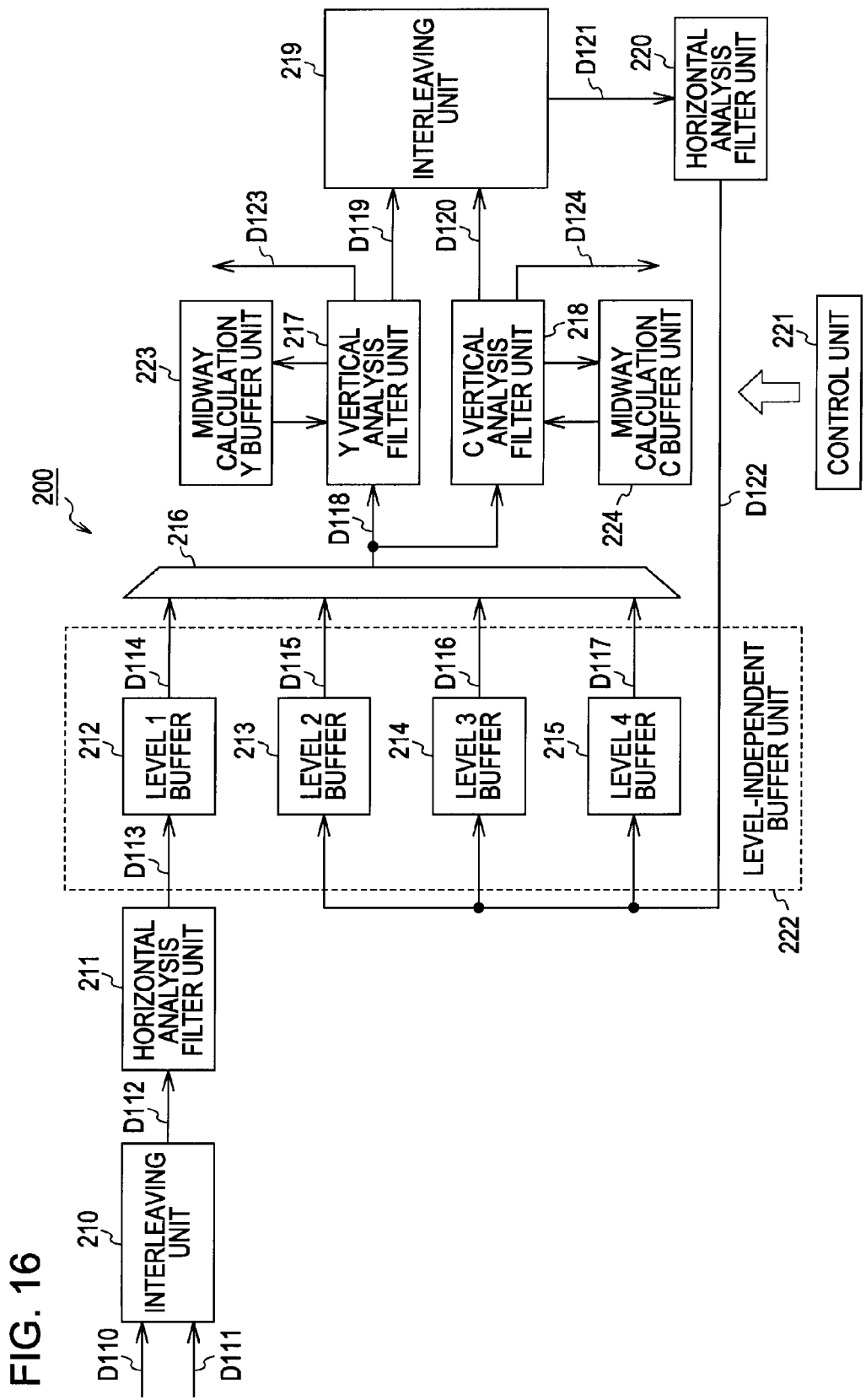
FIG. 16 is a diagram illustrating another configuration example of a wavelet transformation device to which an embodiment of the present invention has been applied.

FIG. 16 is a diagram illustrating another configuration example of a wavelet transformation device to which an embodiment of the present invention is applied. This wavelet transformation device 200 is a band analysis device wherein while subjecting an input image signal to horizontal filtering and vertical filtering, lowband components are divided hierarchically up to a predetermined division level (division level 4 in the case of the example shown in FIG. 16).

The wavelet transformation device 200 shown in FIG. 16 includes an interleaving unit 210, horizontal analysis filter unit 211, level 1 buffer 212, level 2 buffer 213, level 3 buffer 214, level 4 buffer 215, selector 216, Y (luminance) vertical analysis filter unit 217, C (color difference) vertical analysis filter unit 218, interleaving unit 219, horizontal analysis filter unit 220, control unit 221, midway calculation Y buffer unit 223, and midway calculation C buffer unit 224.

A luminance signal (luminance component signal) and color difference signal (color difference component signal) which are image signal components are input to the interleaving unit 210 (D10 and D11). Note that, hereafter, luminance (components) will also be referred to as Y, and color difference (components) will also be referred to as C, as appropriate. The interleaving unit 210 interleaves a luminance signal and color difference signal. Note that, in a case wherein an image signal of which the Y and C are interleaved is input, it goes without saying that the processing of the interleaving unit 210 is not required. The interleaved image signal is input to the horizontal analysis filter unit 211 (D112).

The horizontal analysis filter unit 211 subjects the image signal of which the Y and C are interleaved to lowband analysis filtering and highband analysis filtering in the horizontal direction of the division level 1, and generates frequency component coefficients (hereafter, also referred to as lowband components, highband components, and frequency components as appropriate) made up of a lowband component coefficient and high band component coefficient which are the horizontal analysis filtering results.

At this time, with the horizontal analysis filter unit 211, while Y or C data disposed at discontinuous positions on the baseband are read out from unshown internal memory (register) alternately, the lowband analysis filtering and highband analysis filtering in the horizontal direction as to the Y and C are performed alternately.

The level 1 buffer 212 stores and holds the results of the division level 1 horizontal analysis filtering. That is to say, the Y frequency components (lowband components and highband components) and C frequency components (lowband components and highband components) which are the results of the division level 1 horizontal analysis filtering by the horizontal analysis filter unit 211 are each supplied (D113), so the level 1 buffer 212 stores and holds these separately. Subsequently, as soon as a predetermined number of vertical lines worth of data (frequency components) are accumulated whereby the analysis filtering in the vertical direction can be executed, the level 1 buffer 212 reads out the accumulated vertical lines worth of frequency components thereof to supply these to the selector 216 (D114).

The level 2 buffer 213 stores and holds the results of the division level 2 horizontal analysis filtering. That is to say, the Y frequency components (lowband components and highband components) and C frequency components (lowband components and highband components) which are the results of the division level 2 horizontal analysis filtering by the horizontal analysis filter unit 220 are each supplied (D122), so the level 2 buffer 213 stores and holds these separately. Subsequently, as soon as a predetermined number of vertical lines worth of data (frequency components) are accumulated whereby the analysis filtering in the vertical direction can be executed, the level 2 buffer 213 reads out the accumulated vertical lines worth of frequency components thereof to supply these to the selector 216 (D115).

The level 3 buffer 214 stores and holds the results of the division level 3 horizontal analysis filtering. That is to say, the Y frequency components (lowband components and highband components) and C frequency components (lowband components and highband components) which are the results of the division level 3 horizontal analysis filtering by the horizontal analysis filter unit 220 are each supplied (D122), so the level 3 buffer 214 stores and holds these separately. Subsequently, as soon as a predetermined number of vertical lines worth of data (frequency components) are accumulated whereby the analysis filtering in the vertical direction can be executed, the level 3 buffer 214 reads out the accumulated vertical lines worth of frequency components thereof to supply these to the selector 216 (D116).

The level 4 buffer 215 stores and holds the results of the division level 4 horizontal analysis filtering. That is to say, the Y frequency components (lowband components and highband components) and C frequency components (lowband components and highband components) which are the results of the division level 4 horizontal analysis filtering by the horizontal analysis filter unit 220 are each supplied (D122), so the level 4 buffer 215 stores and holds these separately. Subsequently, as soon as a predetermined number of vertical lines worth of data (frequency components) are accumulated whereby the analysis filtering in the vertical direction can be executed, the level 4 buffer 215 reads out the accumulated vertical lines worth of frequency components thereof to supply these to the selector 216 (D117).

Note that the level 1 buffer 212 through level 4 buffer 215 will also be referred to as level-independent buffer units 222 collectively.

Under the control of the Y vertical analysis filter unit 217 and C vertical analysis filter unit 218, the selector 216 selects, of the level 1 buffer 212 through level 4 buffer 215 of the level-independent buffer units 222, the output (D114 through D117) of the corresponding division level, and outputs the selected output to the Y vertical analysis filter unit 217 and C vertical analysis filter unit 218 as frequency components (D118).

The Y vertical analysis filter unit 217 and C vertical analysis filter unit 218 obtain the predetermined number of vertical lines worth of frequency components supplied from the selector 216 (D118), and subject the frequency components thereof to the Y and C vertical analysis filtering.

That is to say, the Y vertical analysis filter unit 217 uses the selector 216 to read out the predetermined number of vertical lines worth of Y frequency components from the buffer having the division level corresponding to the current division level to be processed (D118), and further obtains a part of the coefficients obtained by the previous analysis filtering from the midway calculation Y buffer unit 223, uses these to perform Y vertical direction lowband analysis filtering and highband analysis filtering, and output only the lowband components which are the Y lowband sub-band coefficients to the interleaving unit 219 (D119), and outputs the Y highband sub-band coefficients to the unshown outside (hereafter, simply referred to as outside) of the wavelet transformation device 200 (D123).

The C vertical analysis filter unit 218 uses the selector 216 to read out the predetermined number of vertical lines worth of C frequency components from the buffer having the division level corresponding to the current division level to be processed (D118), and further obtains a part of the coefficients obtained by the previous analysis filtering from the midway calculation C buffer unit 224, uses these to perform C vertical direction lowband analysis filtering and highband analysis filtering, and output only the lowband components which are the C lowband sub-band coefficients to the interleaving unit 219 (D120), and outputs the C highband sub-band coefficients outside from the wavelet transformation device 200 (D124) (hereafter, interaction with the outside of the device, such as input/output to/from the device, will be implied simply by "externally").

The interleaving unit 219 interleaves the Y lowband components supplied from the Y vertical analysis filter unit 217, and the C lowband components supplied from the C vertical analysis filter unit 218. The interleaved lowband components are input to the horizontal analysis filter unit 220 (D121).

The horizontal analysis filter unit 220 is configured basically in the same way as the horizontal analysis filter unit 211 except that the division level of the frequency components to be processed differs. That is to say, with the horizontal analysis filter unit 220, while Y or C data disposed at discontinuous positions on the baseband are read out from unshown internal memory alternately, the lowband analysis filtering and highband analysis filtering in the horizontal direction as to the Y and C lowband components are performed alternately.

Subsequently, the horizontal analysis filter unit 220 supplies the frequency components (lowband components and highband components) which are the results of the horizontal analysis filtering to the buffer (one of the level 2 buffer 213 through level 4 buffer 215) having the division level corresponding to the division level of the frequency components, of the level-independent buffer units 222 (D122) to store and hold these.

The control unit 221 is configured of, for example, a microcomputer including a CPU (Central Processing Unit), ROM (Read Only Memory), and RAM (Random Access Memory), or the like, and controls the processing of each unit of the wavelet transformation device 200 by executing various types of programs.

Next, description will be made regarding the operation flow of this wavelet transformation device.

Image signals are input to the interleaving unit 210 externally (D110 and D111). For example, in the event that luminance signals and color difference signals which are elements of the image signals are input, the interleaving unit 210 interleaves the luminance signals and color difference signals in internal memory. The interleaved image signals are input to the horizontal analysis filter unit 211 (D12).

Figure 17:
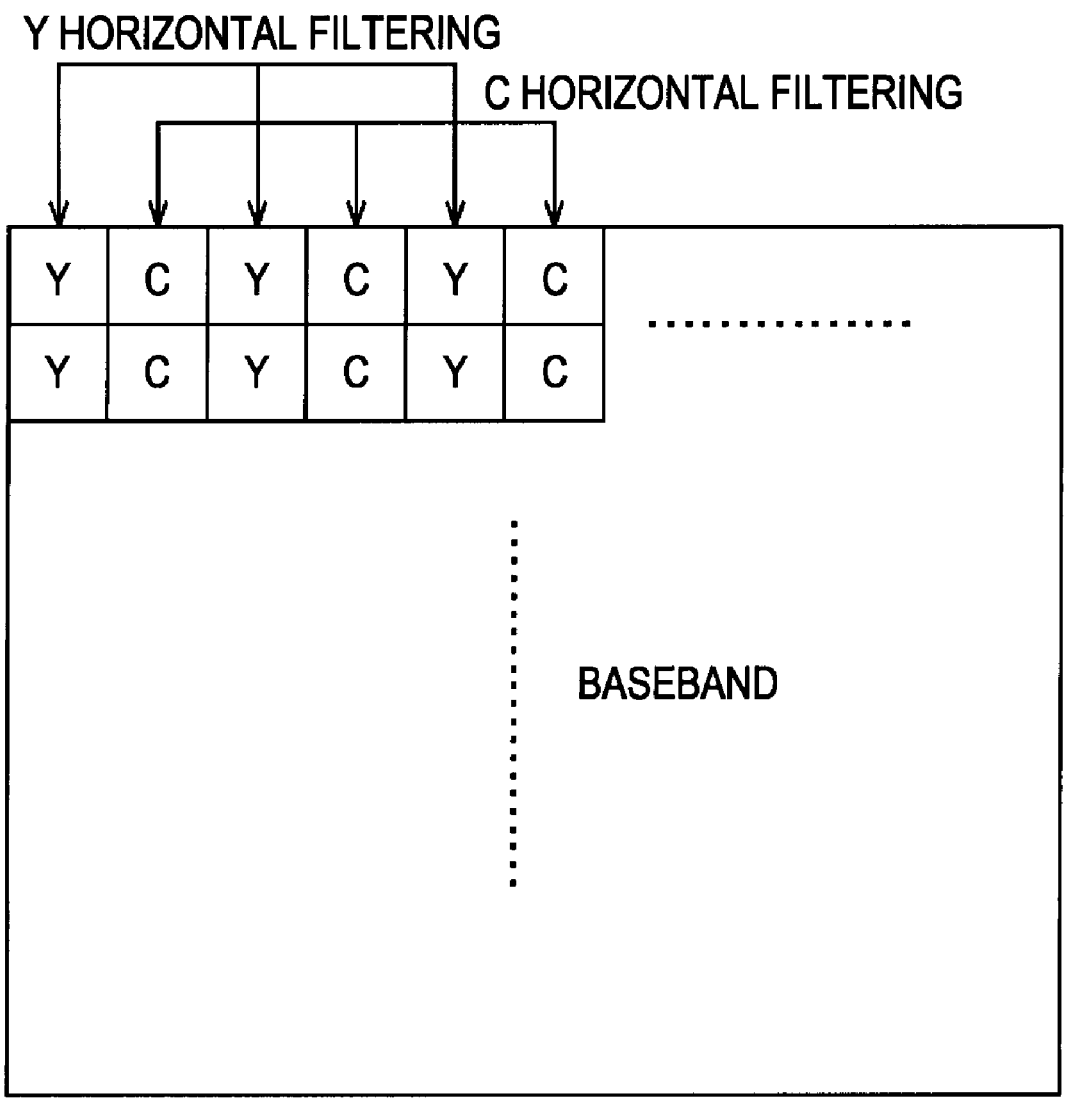
FIG. 17 is a diagram for describing an example of horizontal analysis filtering of image signals wherein Y and C have been interleaved.

The horizontal analysis filter unit 211 performs division level 1 horizontal analysis filtering on the image signals wherein Y and C are interleaved. That is to say, the horizontal analysis filter unit 211 has unshown internal memory (or a register), and the image signals wherein Y and C have been interleaved are rendered alternately in the internal memory as shown in FIG. 17. With the example in FIG. 17, a baseband image of image signals wherein Y and C, represented by squares, are alternately rendered in the memory, is illustrated.

The horizontal analysis filter unit 211 reads out Y data of a predetermined number (3 samples in the case of FIG. 2) or C data of a predetermined number situated in steppingstone fashion on the baseband rendered in the internal memory, while shifting the position, and alternately performs Y horizontal direction lowband analysis filtering and highband analysis filtering, and C horizontal direction lowband analysis filtering and highband analysis filtering.

The horizontal direction data is readily rendered to memory addresses. Accordingly, horizontal analysis filtering is readily executed in order at the horizontal analysis filter unit 211 while alternately reading out Y data and C data from the memory.

The horizontal analysis filter unit 211 stores the frequency components obtained as a result of the division level 1 horizontal analysis filtering to the level 1 buffer 212.

Figure 18:
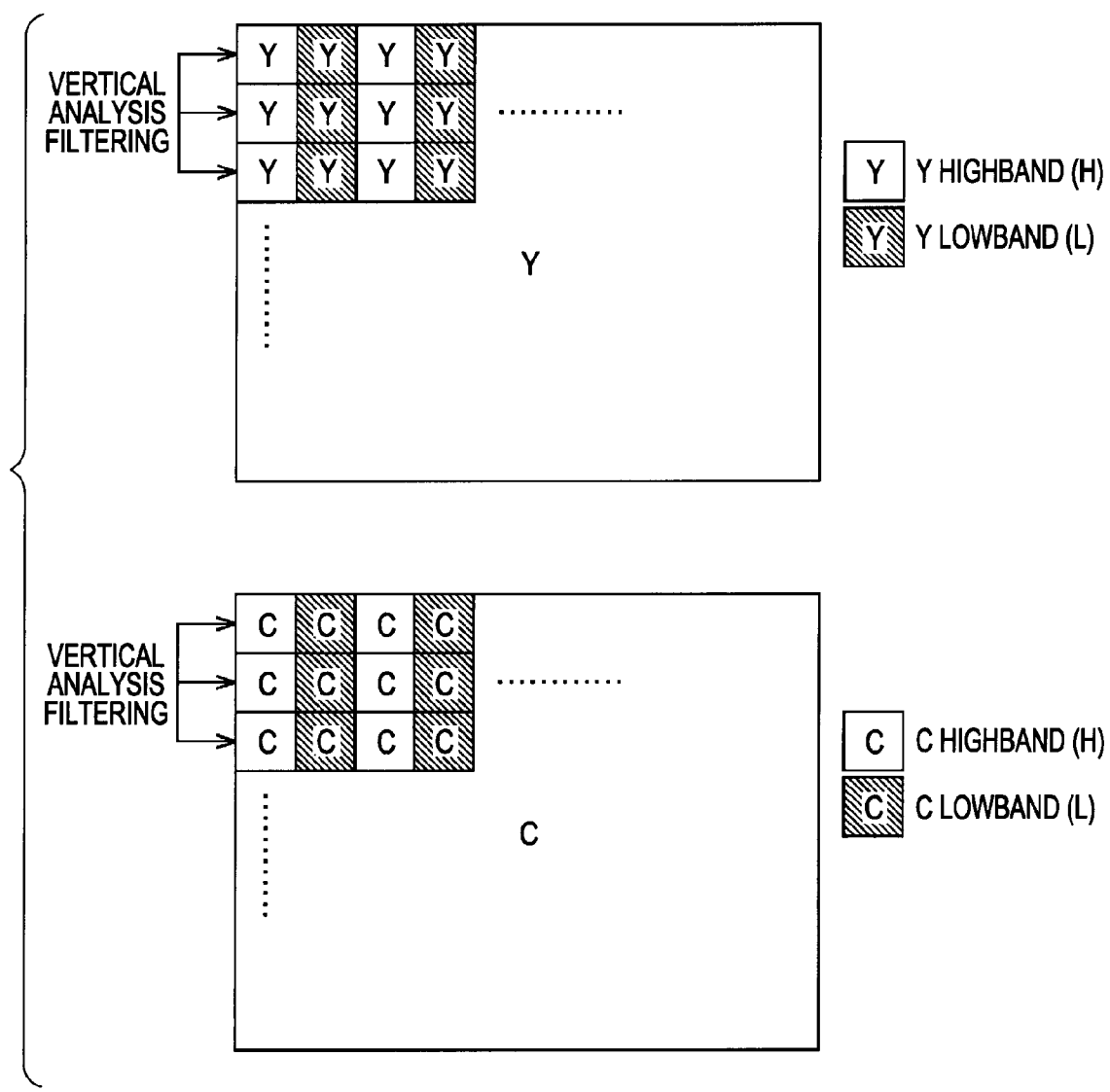
FIG. 18 is a diagram for describing an example of performing vertical analysis filtering separately for Y and C.

At this time, the horizontal analysis filter unit 211 interleaves the Y highband components (H) and lowband components (L) which are the results of the Y horizontal analysis filtering, and stores in the level 1 buffer 212 separately from C, and then interleaves the C highband components and lowband components which are the results of the C horizontal analysis filtering, and stores in the level 1 buffer 212 separately from Y, as shown in FIG. 18.

Figure 19:
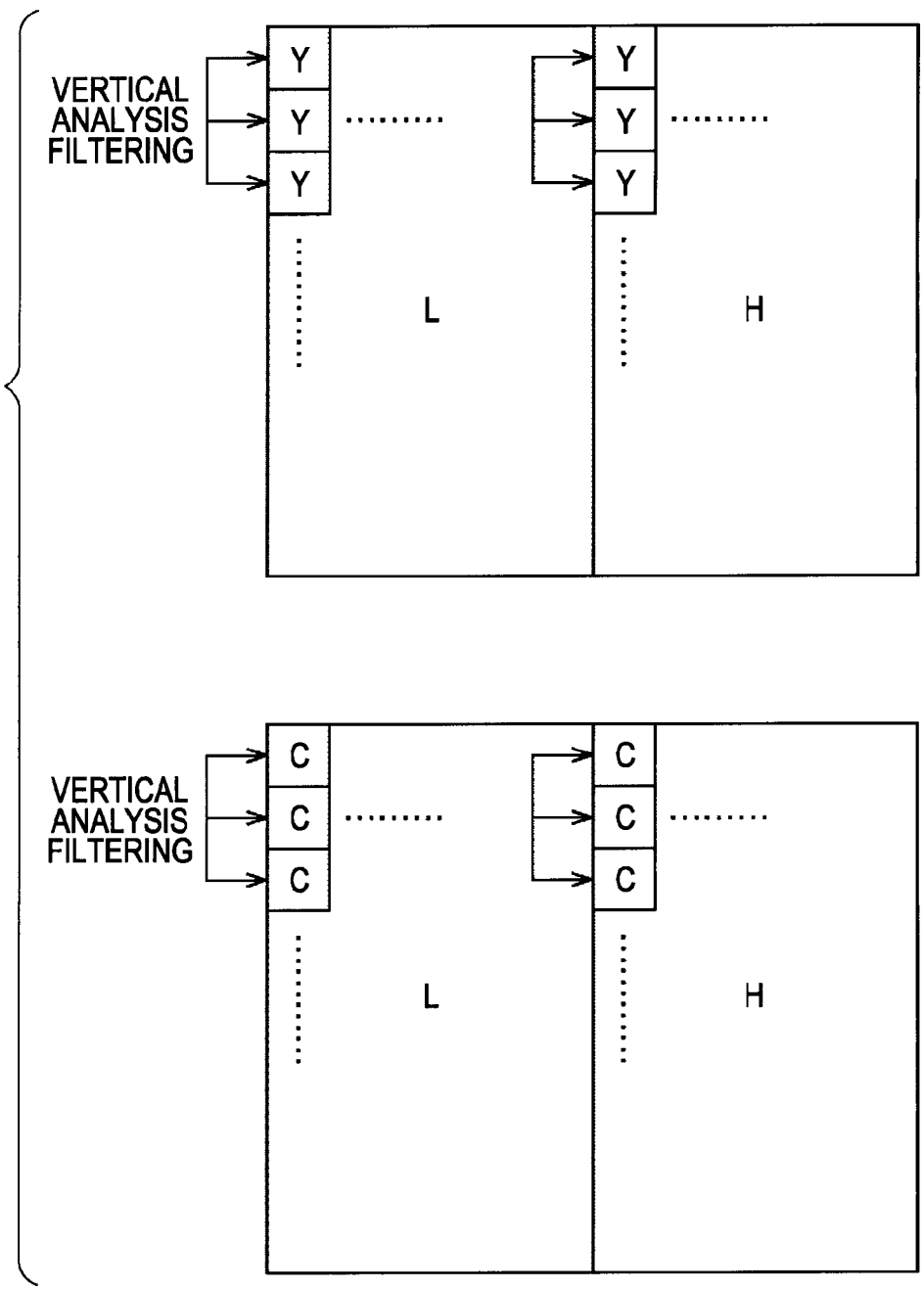
FIG. 19 is a diagram for describing an example of performing vertical analysis filtering of Y and C, divided into lowband and highband according to the related art, for the sake of comparison with FIG. 18.

A method can be conceived wherein the results of the horizontal analysis filtering are divided into the highband components and lowband components, and thus stored in the buffer, for both Y and for C, as shown in FIG. 19. However, in this case, control may become complicated such that there is the need to perform mapping the highband components and lowband components to different addresses in the buffer, which requires a separate controller for the sake thereof.

Conversely, with the example shown in FIG. 18 illustrating an example according to the present embodiment, the Y highband components (H) and lowband components (L) are alternately stored in the level 1 buffer 212, and the C highband components (H) and lowband components (L) are alternately stored at addresses different from Y. That is to say, the highband components and lowband components which are the results of the horizontal analysis filtering are interleaved are stored in the level 1 buffer 212 by the horizontal analysis filter unit 211 for Y and C each, so at the time of reading out the frequency components stored in the level 1 buffer 212, all that is to necessary is to read out from the front of the level 1 buffer 212, thereby simplifying control.

For example, upon the frequency components obtained as a result of the horizontal analysis filtering being accumulated in the level 1 buffer 212 shown in FIG. 18 for a predetermined number of vertical lines (three lines in the case shown in FIG. 18) whereby vertical analysis filtering can be performed, the Y vertical analysis filter unit 217 and C vertical analysis filter unit 218 read out the coefficients of the necessary number of vertical lines from the level 1 buffer 212, by controlling the selector 216 so as to select the output of the level 1 buffer 212.

Also, the Y vertical analysis filter unit 217 obtains the coefficients obtained by the previous vertical analysis filtering from the midway calculation Y buffer unit 223. The Y vertical analysis filter unit 217 employs these coefficients to perform Y vertical analysis filtering. Similarly, the C vertical analysis filter unit 218 obtains the coefficients obtained by the previous vertical analysis filtering from the midway calculation C buffer unit 224, employs these coefficients and the coefficients obtained from the level 1 buffer unit 212 to perform C vertical analysis filtering. The Y vertical analysis filtering and C vertical analysis filtering are mutually executed in parallel.

As a result of the division level 1 Y and C vertical analysis filtering (i.e., the results of division level 1 Y and C analysis filtering), four sub-band frequency components are generated for Y and C, made up of the lowband sub-band (1LL) and highband sub-bands (1HH, 1LH, 1HL), as shown in FIG. 20. Note that in the example shown in FIG. 20, with the order of "L" and "H", the left side indicate the bandwidth (lowband or highband) as the result of performing horizontal analysis filtering previously, and the right side indicates the bandwidth (lowband or highband) as the result of performing vertical analysis filtering, in that order. Further, the numeral in front of the "L" or "H" indicates the division level.

This is the division level 1 analysis filtering, whereby Y lowband sub-band (1LL) coefficients and highband sub-bands (1HH, 1LH, 1HL) coefficients are generated at the Y vertical analysis filter unit 217, and C lowband sub-band (1LL) coefficients and highband sub-bands (1HH, 1LH, 1HL) coefficients are generated at the C vertical analysis filter unit 218, as a result. Of these coefficients, only the lowband sub-band (1LL) coefficients are further subjected to the analysis filtering. Thus, the analysis filtering is repeated recursively regarding the lowband sub-band coefficients of each division level until the set division level (highest order level). On the other hand, the highband sub-bands coefficients are not analyzed any further. That is to say, the Y vertical analysis filter unit 217 outputs externally the highband sub-bands (1HL, 1LH, 1HH) frequency components generated this time (D123). Similarly, the C vertical analysis filter unit 218 also outputs externally the highband sub-bands (1HL, 1LH, 1HH) frequency components generated this time (D124).

On the other hand, the Y lowband sub-band (1LL) frequency components and C lowband sub-band (1LL) frequency components are output to the interleaving unit 219 (D119 and D120). The interleaving unit 219 interleaves the Y lowband sub-band (1LL) frequency components and C lowband sub-band (1LL) frequency components, and inputs the interleaved frequency components to the horizontal analysis filter unit 220 (D121).

Figure 21:
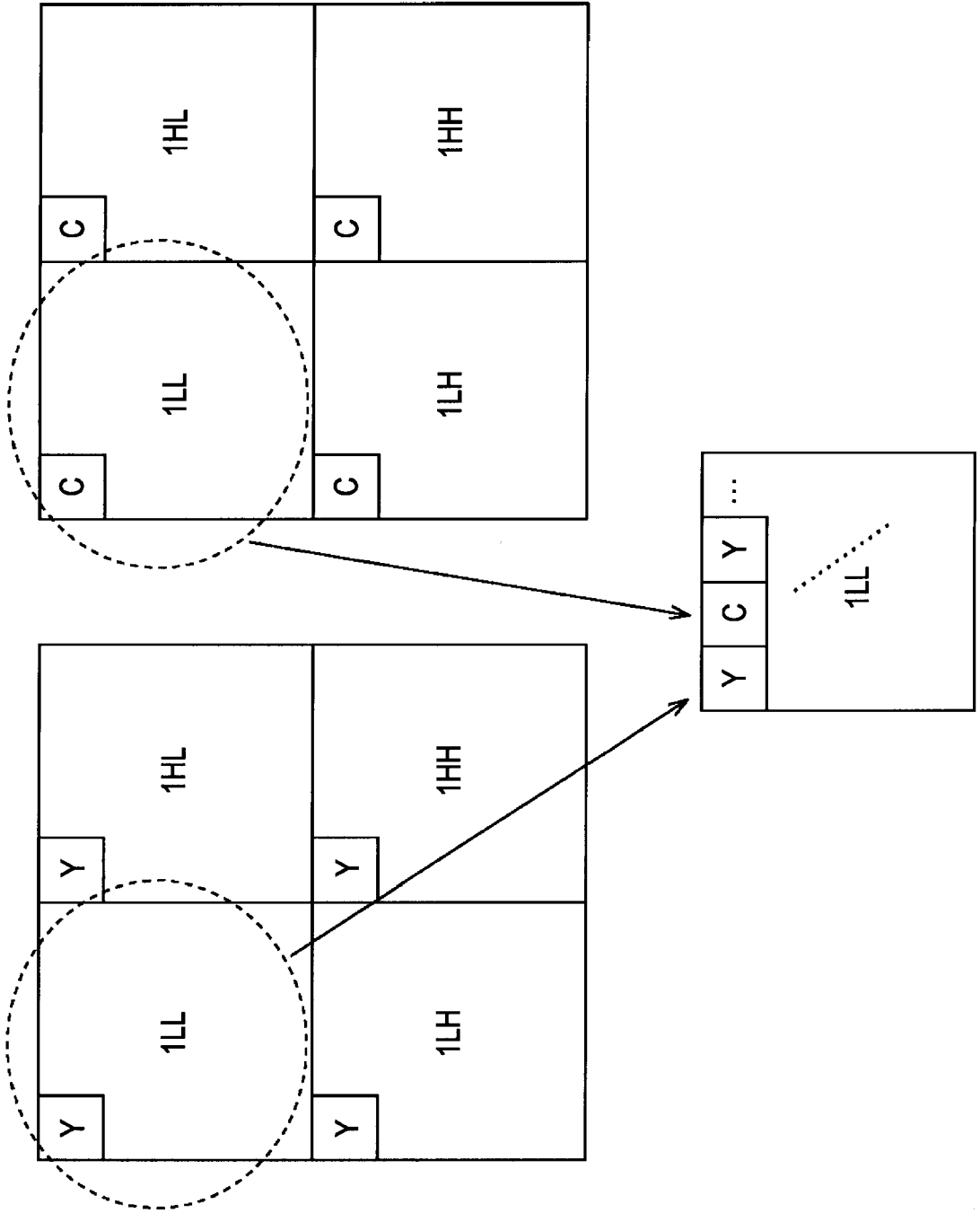
FIG. 21 is a diagram for describing an example of interleaving Y and C for division level 1 lowband components.

That is to say, as shown in FIG. 21, with the frequency components at the time of being input to the horizontal analysis filter unit 220, the Y lowband sub-band (1LL) frequency components and the C lowband sub-band (1LL) frequency components are alternately interleaved and synthesized. Note that in the example shown in FIG. 21, the size of the lowband sub-band (1LL) following interleaving of Y and C shown toward the bottom is illustrated as being the same size as the lowband sub-band (1LL) of Y or C alone before interleaving, indicated by the dotted line, but in reality, the size is twice that of the lowband components of Y or C alone.

The horizontal analysis filter unit 220 performs horizontal analysis filtering (horizontal direction lowband analysis filtering and highband analysis filtering) as to the frequency components wherein Y and C have been interleaved, and generates lowband components and highband components which are the results of the horizontal analysis filtering.

The horizontal analysis filter unit 220 supplies the frequency components obtained as the result of horizontal analysis filtering to the buffer of the level corresponding to the division level of the frequency components (in this case, level 2 buffer 213) to store and hold these.

Subsequently, upon the frequency components obtained as a result of the horizontal analysis filtering being accumulated in the level 2 buffer 213 for a predetermined number of vertical lines whereby vertical analysis filtering can be performed, the level 2 buffer 213 reads out the frequency components of the predetermined number of vertical lines, and supplies these to the Y vertical analysis filter unit 217 and C vertical analysis filter unit 218 via the selector 216. The Y vertical analysis filter unit 217 subjects the predetermined number of vertical lines worth of the Y frequency components to division level 2 Y vertical analysis filtering, and the C vertical analysis filter unit 218 subjects the predetermined number of vertical lines worth of the C frequency components to division level 2 C vertical analysis filtering.

As a result of the division level 2 Y and C vertical analysis filtering, four sub-bands frequency components are generated, made up of the lowband sub-band (2LL) and highband sub-bands (2HH, 2LH, 2HL), for Y and C each. Of these, the highband sub-bands components are each externally output (D123 and D124).

Also, the lowband sub-band (2LL) frequency components are supplied to the interleaving unit 219 (D119 and D120). The interleaving unit 219 interleaves the Y and C of the lowband sub-band (2LL) frequency components to supply these to the horizontal analysis filter unit 220 (D121). The horizontal analysis filter unit 220 subjects the interleaved lowband sub-band (2LL) frequency components to the horizontal analysis filtering. This processing result is supplied to the level 3 buffer 214 of the level-independent buffer units 222 to hold this (D122). These coefficients are subjected to the vertical analysis filtering at the Y vertical analysis filter unit 217 and C vertical analysis filter unit 218 again.

As described above, the vertical analysis filtering and horizontal analysis filtering regarding the lowband sub-band coefficients of each division level are executed recursively until the division level reaches the highest order level. The highband sub-bands coefficients generated at each division level are output externally in order (D123 and D124).

When reaching the highest order level (division level 4) of the predetermined set division levels, the Y vertical analysis filter unit 217 and C vertical filter unit 218 output all of the frequency components (4LL, 4HL, 4LH, 4HH) of the highest order level thereof externally (D123 and D124). Thus, the division level 4 image signal wavelet transformation ends.

As described above, the wavelet transformation device 200 shown in FIG. 16 has buffers for each division level from level 1 to a predetermined number of levels, and stores the horizontal analysis filtering results in buffers of each division level while performing the horizontal analysis filtering. Accordingly, vertical direction filtering can be performed while reading out the results of the horizontal analysis filtering from the buffer of each division level. That is to say, horizontal direction and vertical direction filtering can be performed simultaneously in parallel.

Thus, the wavelet transformation device 200 can perform wavelet transformation at high speed for moving images and images with high resolution, as well.

Also, the wavelet transformation device 200 shown in FIG. 16 includes not only buffers for each division level from level 1 to a predetermined number of levels (level-independent buffer units 222) but also the midway calculation Y buffer unit 223 and midway calculation C buffer unit 224, and at the time of vertical direction analysis filtering, holds the coefficients necessary for the next processing at the midway calculation Y buffer unit 223 and midway calculation C buffer unit 224, and at the time of the next vertical analysis filtering, reads out and uses the coefficients thereof, so there is no need to configure memory externally.

Accordingly, there is no need to exchange data with external memory, and wavelet transformation can be performed at high speed. Consequently, there is no need to raise the clock frequency in order to increase speed of data between the external memory and the wavelet transformation device, thereby conserving electric power.

Also, horizontal direction analysis filtering is performed as to frequency components wherein Y and C are interleaved, so the horizontal analysis filter unit can be a single configuration, markedly contributing to reduction in the size of the hardware. This data interleaved in the horizontal direction can be readily rendered to registers or memory, and further, can be read and written at high speed, thereby contributing to higher speed of wavelet transformation.

Further, as described above with reference to FIGS. 18 and 19, the highband components and lowband components which are the results of the horizontal analysis filtering are interleaved for each of Y and C, and stored in buffers of corresponding levels, Y and C being stored separately, so at the time of reading out, all that is necessary is to read out from the front of the buffer of that level, thereby simplifying control.

Figure 22:
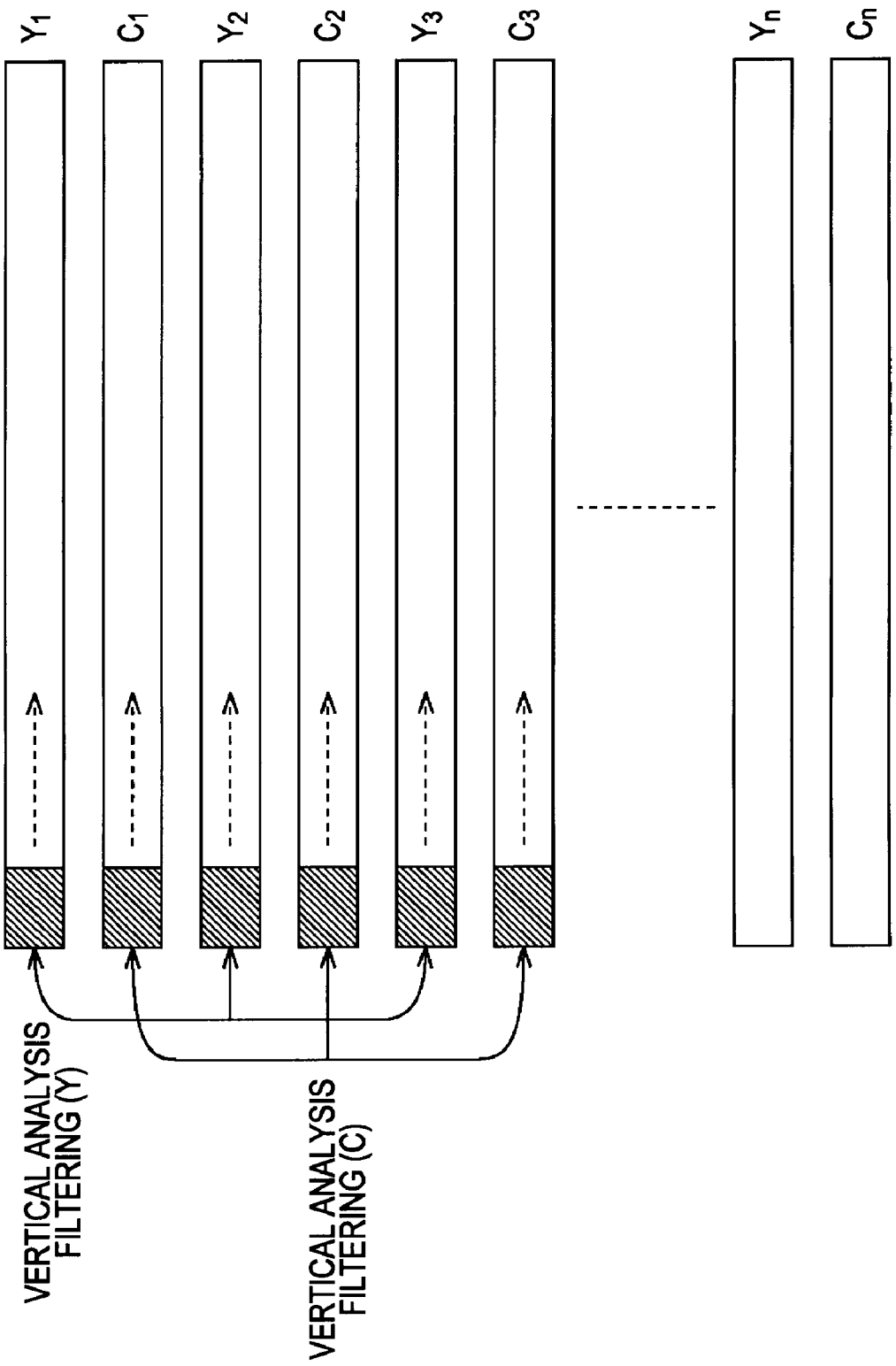
FIG. 22 is a diagram for describing an example of executing vertical analysis filtering with Y and C interleaved, for the sake of comparison with FIG. 18.

Also, vertical direction analysis filtering is performed separately for Y and C, so there is no need for the massive memory capacity which is necessary in the event of not performing the vertical direction analysis filtering shown in FIG. 22 separately for Y and C, and drastic increases in cost can be prevented. Further, the need for extra processing time can be prevented, as well.

Now, FIG. 22 will be used to specifically describe a case wherein the vertical direction analysis filtering is not performed separately for Y and C, i.e., wherein Y and C are interleaved as with the horizontal analysis filter units 211 and 220, and then Y and C vertical analysis filtering is alternately performed while shifting, in order to compare such an arrangement with that of an embodiment of the present invention.

In the example in FIG. 22 is shown an example of a line buffer where interleaved Y and C are rendered. In the event that the image is configured of n lines for example, first, the luminance component Y1 of the first line is rendered at the line buffer, next, the color difference component C1 of the first line is rendered, the luminance component Y2 of the second line is rendered, next, the color difference component C2 of the second line is rendered, the luminance component Y3 of the third line is rendered, next, the color difference component C3 of the third line is rendered, and so on, until the luminance component Yn of the n'th line is rendered, and next, the color difference component Cn of the n'th line is rendered, and so the interleaved Y and C are rendered to the line buffer.

That is to say, in the case of processing Y and C separately as with the Y vertical analysis filter unit 217 and C vertical analysis filter unit 218 shown in FIG. 16, all that is necessary is to read out Y and C separately, but in order to process Y and C together, there is the need to interleave and render Y and C, requiring an extra line buffer for C (or for Y).

Also, for example, the vertical analysis filtering is performed at the point that the number of lines necessary for vertical analysis filtering to be performed (e.g., 3 lines) is accumulated, so in the example in FIG. 22, in actual operations, Y vertical analysis filtering is performed at the point that the luminance component Y3 at the fifth line from the top is accumulated, C vertical analysis filtering is performed at the point that the color difference component C3 at the sixth line from the top is accumulated, and so on, with Y and C vertical analysis filtering being alternately performed.

Conversely, with the case of the Y vertical analysis filter unit 217 and C vertical analysis filter unit 218 shown in FIG. 1, Y and C vertical analysis filtering are performed in parallel, so the processing speed per time unit is faster than that of the example in FIG. 22.

AS described above, an arrangement wherein Y and C vertical analysis filtering is performed after interleaving Y and C is advantageous in that only one vertical analysis filter unit is needed, but this requires an extra line buffer for C (or for Y) as compared with an embodiment of the invention. In the even of configuring this line buffer with built-in memory, an extremely great amount of memory is necessary for images with high horizontal resolution (e.g., 1920 pixels in the case of HDTV (High Definition TeleVision), markedly increasing costs. Also, in the example shown in FIG. 22, Y and C must be alternately processed with a single vertical analysis filter unit, so more processing time is required as compared to the case of performing processing with two vertical analysis filter units, one for Y and one for C as with an embodiment of the invention.

Thus, an arrangement wherein Y and C vertical analysis filtering is performed after interleaving Y and C is more disadvantageous than advantageous. Conversely, the case of performing processing with two vertical analysis filter units, one for Y and one for C, as with an embodiment of the invention, an extra line buffer is not necessary, so marked increases in cost can be suppressed, and further, the processing can be performed in parallel with the two vertical analysis filter units, so processing time can be sped up.

Note that with the wavelet transformation device 200 shown in FIG. 16 as well, similar to the wavelet transformation device 100, the analysis filtering is performed by employing the lifting technique described with reference to FIGS. 5 through 8. That is to say, the horizontal analysis filter units 211 and 220 perform the horizontal analysis filtering such as shown in FIG. 6, and the Y vertical analysis filter unit 217 and C vertical analysis filter unit 218 perform the vertical analysis filtering such as shown in FIG. 8.

Also, the midway calculation Y buffer unit 223 and midway calculation C buffer unit 224 described with reference to FIG. 16 are configured so as to perform input/output of data simultaneously in parallel while using the 1-port SRAM, similar to the midway calculation buffer unit 117 of the wavelet transformation device 100. That is to say, each of the midway calculation Y buffer unit 223 and midway calculation C buffer unit 224 has the same configuration as that of the midway calculation buffer unit 117 shown in FIG. 9, and executes the same processing. Accordingly, the midway calculation Y buffer unit 223 and midway calculation C buffer unit 224 differ from the midway calculation buffer unit 224 only in that the midway calculation Y buffer unit 223 holds only the coefficients for Y, and the midway calculation C buffer unit 224 holds only the coefficients for C, but basically, the description performed with reference to FIGS. 9 and 15 can be applied to the midway calculation Y buffer unit 223 and midway calculation C buffer unit 224 as well.

That is to say, in the same way as with the wavelet transformation device 100, the wavelet transformation device 200 can further reduce the delay time of the wavelet transformation processing, and also reduce costs as well.

Figure 23:
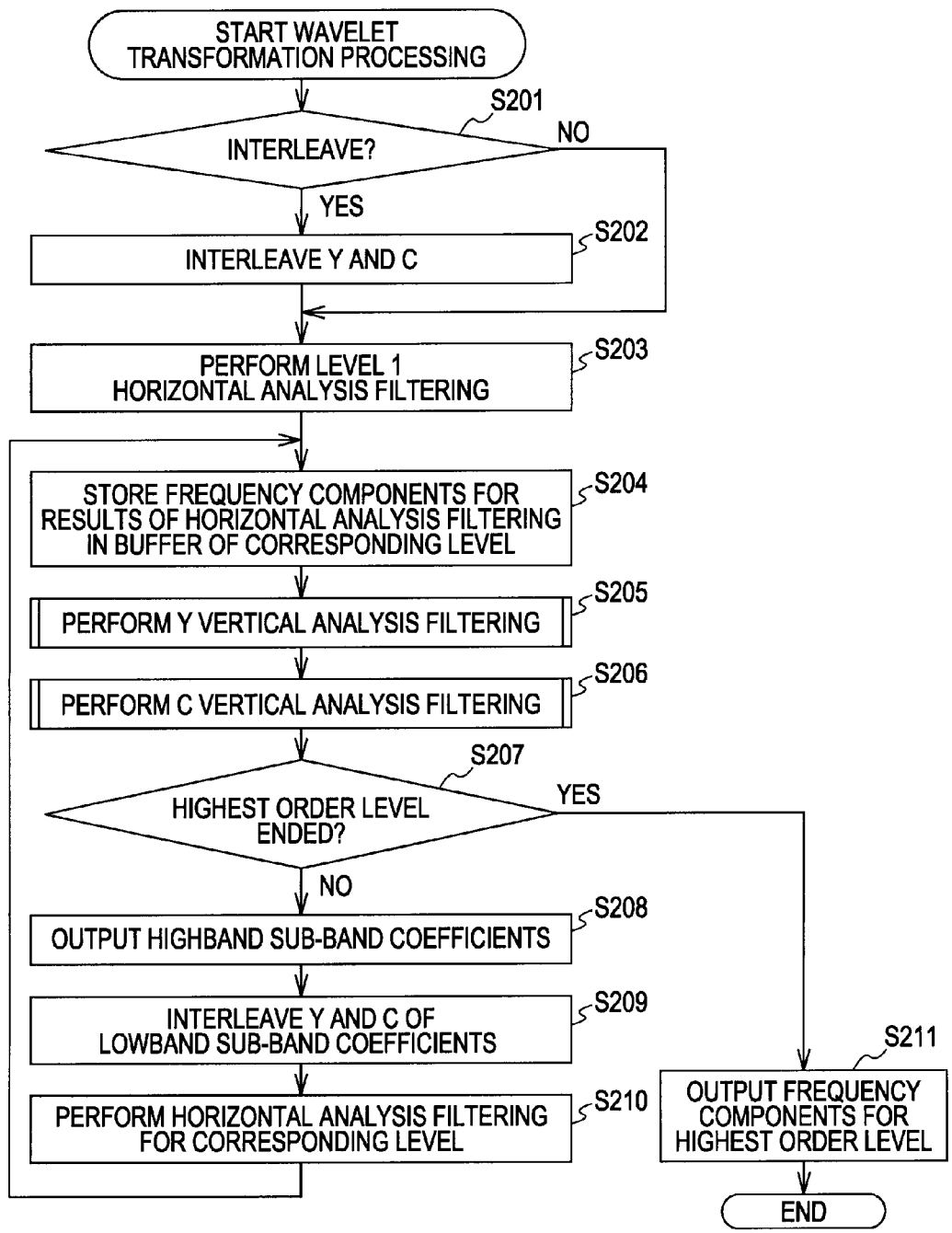
FIG. 23 is a flowchart for describing another example of the flow of wavelet transformation processing.

Description will be made regarding a flow example of the wavelet transformation processing executed by the wavelet transformation device 200 shown in FIG. 16 with reference to the flowchart shown in FIG. 23. Note that this wavelet transformation processing is executed in increments of predetermined processing.

When the wavelet transformation processing is started, in step S210 the interleaving unit 210 of the wavelet transformation processing device 200 determines whether to interleave input image data, and only in a case wherein determination is made that with input image data, Y and C are not interleaved, and are to be interleaved, in step S202 the Y and C of the image data is interleaved. In a case wherein determination is made that interleaving is not performed by the Y and C having been already interleaved with the input image data, or the like, the interleaving unit 210 omits the processing in step S202, and advances the processing to step S203.

In step S203, the horizontal analysis filter unit 211 performs the level 1 horizontal analysis filtering, and in step S204 stores the coefficient obtained as the result of the horizontal analysis filtering to the buffer having the level corresponding to the division level of the coefficient thereof, of the level-independent buffer units 222.

In step S205, the Y vertical analysis filter unit 217 subjects Y to the vertical analysis filtering such as described with reference to the flowchart shown in FIG. 14. Simultaneously in parallel with this processing, in step S206 the C vertical analysis filter unit 218 subjects C to the vertical analysis filtering such as described with reference to the flowchart shown in FIG. 14.

When the vertical analysis filtering as to Y and C ends, in step S207 the control unit 221 determines whether or not the vertical analysis filtering has been performed up to the highest order level. In a case wherein determination is made that the vertical analysis filtering has not been performed up to the highest order level, the processing proceeds to step S208. In step S208, the Y vertical analysis filter unit 217 and C vertical analysis filter unit 218 output the generated highband sub-bands coefficients externally. In step S209, the interleaving unit 219 interleaves the Y and C of the lowband sub-bund. In step S210, the horizontal analysis filter unit 220 subjects the interleaved lowband sub-band coefficients to the horizontal analysis filtering. When the processing in step S210 is completed, the processing returns to step S204, where the subsequent processing is repeated. That is to say, the processing in steps S204 through S210 is repeated, whereby the analysis filtering is performed at each division level.

Subsequently, in a case wherein determination is made in step S207 that the analysis filtering of the highest order level has been completed, the processing proceeds to step S211. In step S211, the Y vertical analysis filter unit 217 and C vertical analysis filter unit 218 outputs all of the coefficients of the highest order level externally. When the processing in step S211 is completed, the wavelet transformation processing is completed.

Thus, the Y vertical analysis filter unit 217 and C vertical analysis filter unit 218 can execute the vertical analysis filtering in the same way as with the vertical analysis filter unit 118 shown in FIG. 1. That is to say, each of the midway calculation Y buffer unit 223 and midway calculation C buffer unit 224 can perform the buffer input/output processing such as described with reference to FIG. 15.

That is to say, in the same way as with the wavelet transformation device 100, the wavelet transformation device 200 can further reduce the delay time of the wavelet transformation processing, and also reduce costs as well.

According to the analysis filtering by the wavelet transformation device such as described above, the frequency components of image data are divided into multiple components for each bandwidth, thereby forming hierarchical sub-bands.

Figure 24:
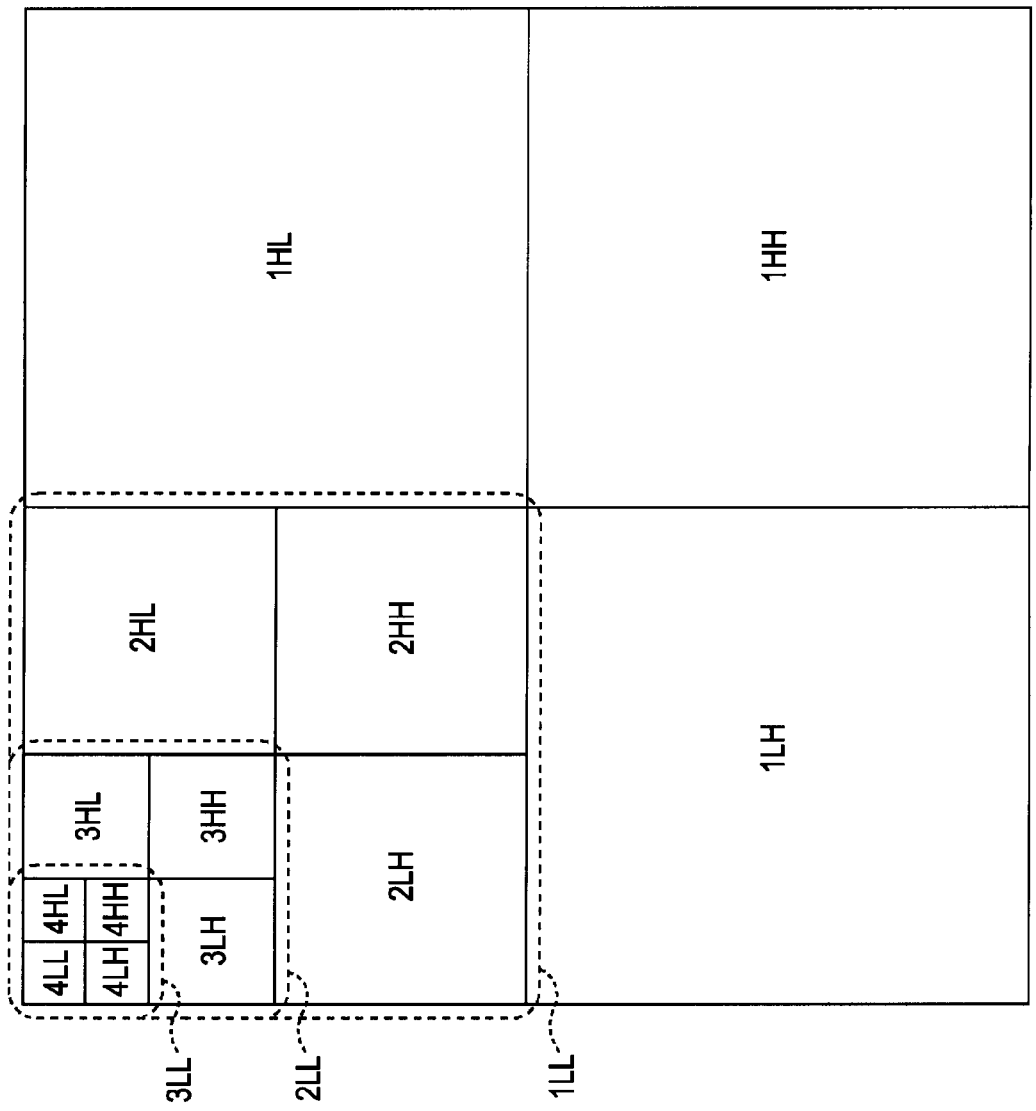
FIG. 24 is a schematic diagram for describing wavelet transformation.

FIG. 24 is a diagram schematically illustrating an example in a case wherein the analysis filtering is repeated four times. With the example shown in FIG. 24, the horizontal direction and vertical direction analysis filtering are repeated four times recursively, whereby the frequency components of the image data of one picture are divided into 13 hierarchical sub-bands.

In FIG. 24, each of solid-line squares and dotted-line squares with rounded corners represents a sub-band generated by the analysis filtering, and the numeral described in each sub-band indicates the hierarchical level of the sub-band thereof, i.e., indicates whether to obtain the sub-band thereof by how many times the image data of the baseband being subjected to the analysis filtering. Also, "L" and "H" described in each sub-band represent lowband components and highband components respectively, the left side indicates the horizontal direction analysis filtering result, and right side indicates the vertical direction analysis filtering.

With the example shown in FIG. 1, the baseband image data is subjected to first analysis filtering to generate four sub-bands (1LL, 1LH, 1HL, and 1HH) of the division level 1. Of these sub-bands, the sub-band "1LL" which is lowband components as to both the horizontal and vertical directions is subjected to second analysis filtering to generate four sub-bands (2LL, 2LH, 2HL, and 2HH) of the division level 2. The sub-band "2LL" which is lowband components as to both the horizontal and vertical directions is subjected to third analysis filtering to generate four sub-bands (3LL, 3LH, 3HL, and 3HH) of the division level 3. The sub-band "3LL" which is lowband components as to both the horizontal and vertical directions is subjected to fourth analysis filtering to generate four sub-bands (4LL, 4LH, 4HL, and 4HH) of the division level 4.

Thus, the reason why lowband components are subjected to repeat transform and repeat division is because the higher order the sub-band (of lowband components) is, the more image energy focuses on the lowband components. The analysis filtering is thus performed recursively according to wavelet transformation to generate hierarchical sub-bands, and band data having a low spatial frequency is driven into a smaller region, thereby enabling effective compression encoding at the time of performing entropy encoding.

Such a method exists wherein the entire picture is subjected to the wavelet transformation processing collectively, and also a method exists wherein the image data of one picture is divided in increments of several lines to perform the wavelet transformation processing regarding each thereof mutually in an independent manner. With the latter method, the data amount of image data to be processed at one-time wavelet transformation processing is small as compared with the former method, so the output start timing of the processing results of the wavelet transformation processing can be performed earlier. In other words, the delay time caused by the wavelet transformation processing can be shortened.

Note that, in this case, the number of lines serving as the processing increment of the wavelet transformation processing is based on the number of lines necessary for obtaining one line worth of the highest order level sub-band coefficients at the predetermined division level, of the wavelet transformation processing.

Figure 25:
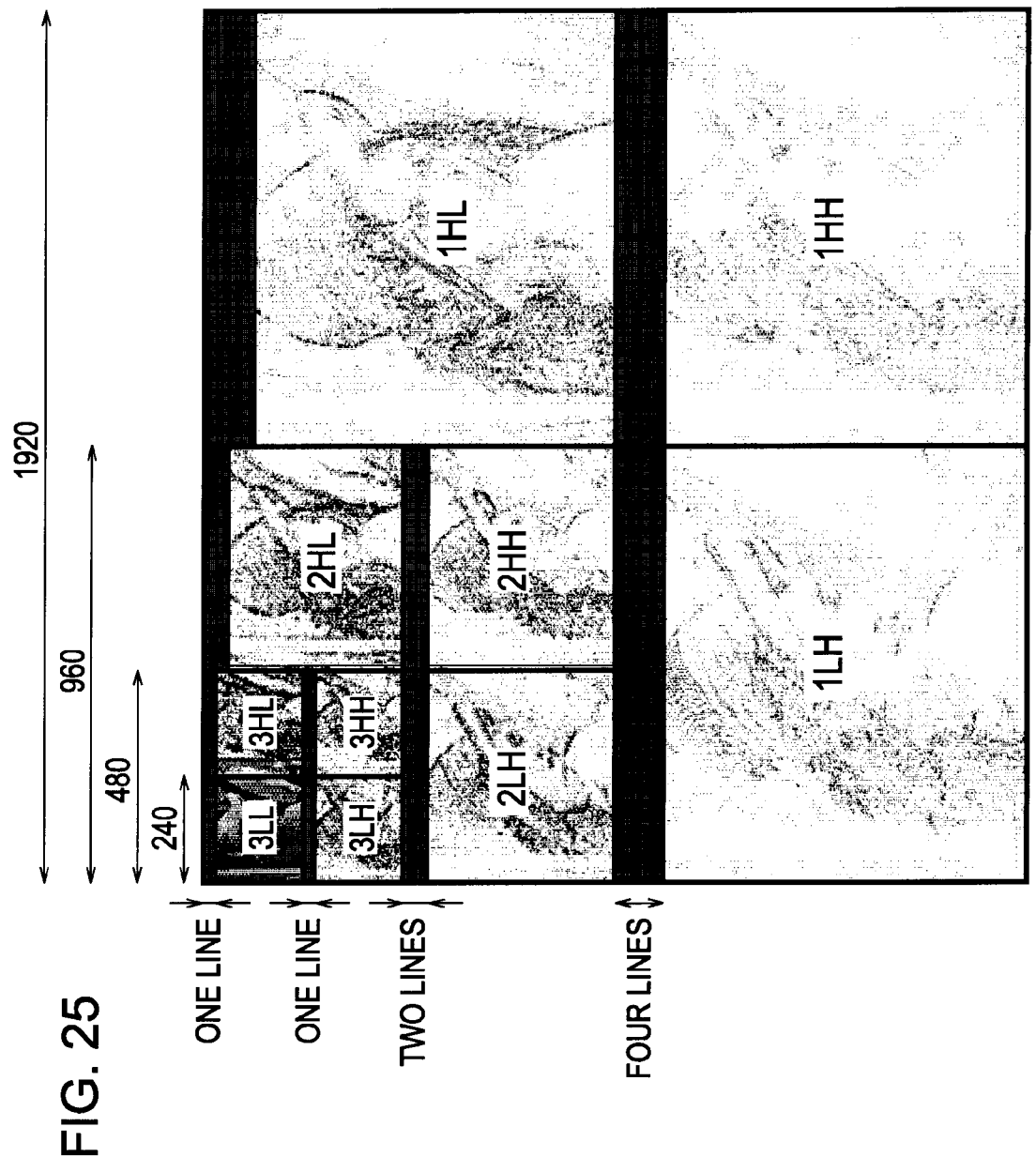
FIG. 25 is a schematic diagram for describing wavelet transformation.

Data is divided into four pieces by the analysis filtering, so the number of lines decreases by half, such as shown in FIG. 25. That is to say, like the example shown in FIG. 25, in the case of the wavelet transformation processing of the division level 3, in order to obtain one line worth of the highest order level sub-bands (3LL, 3LH, 3HL, and 3HH), eight lines worth of baseband image data is needed. Accordingly, in this case, the wavelet transformation processing is performed with eight lines or more of baseband image data as processing increment. In a case wherein the division level is four like the example shown in FIG. 24, 16 lines worth of baseband image data is needed.

Thus, a group of baseband pixel data necessary for generating one line worth of the highest order level lowband sub-band "LL" coefficient data will be referred to as a precinct (or line block). Note that a precinct sometimes indicates a group of the overall sub-bands coefficient data obtained by subjecting one precinct worth of pixel data to wavelet transformation, which is substantially the same as a group of baseband pixel data necessary for generating one line worth of the highest order level lowband sub-band "LL" coefficient data.

Note that the number of lines of one precinct may not be the same mutually between precincts within a picture.

The coefficient data obtained by being subjected to such wavelet transformation processing is subjected to, for example, entropy encoding, and converted into encoded data. This encoded data is subjected to entropy decoding at the time of using this data, whereby the original baseband image data is restored by wavelet inverse transformation processing corresponding to the above-mentioned wavelet transformation processing.

Figure 26:
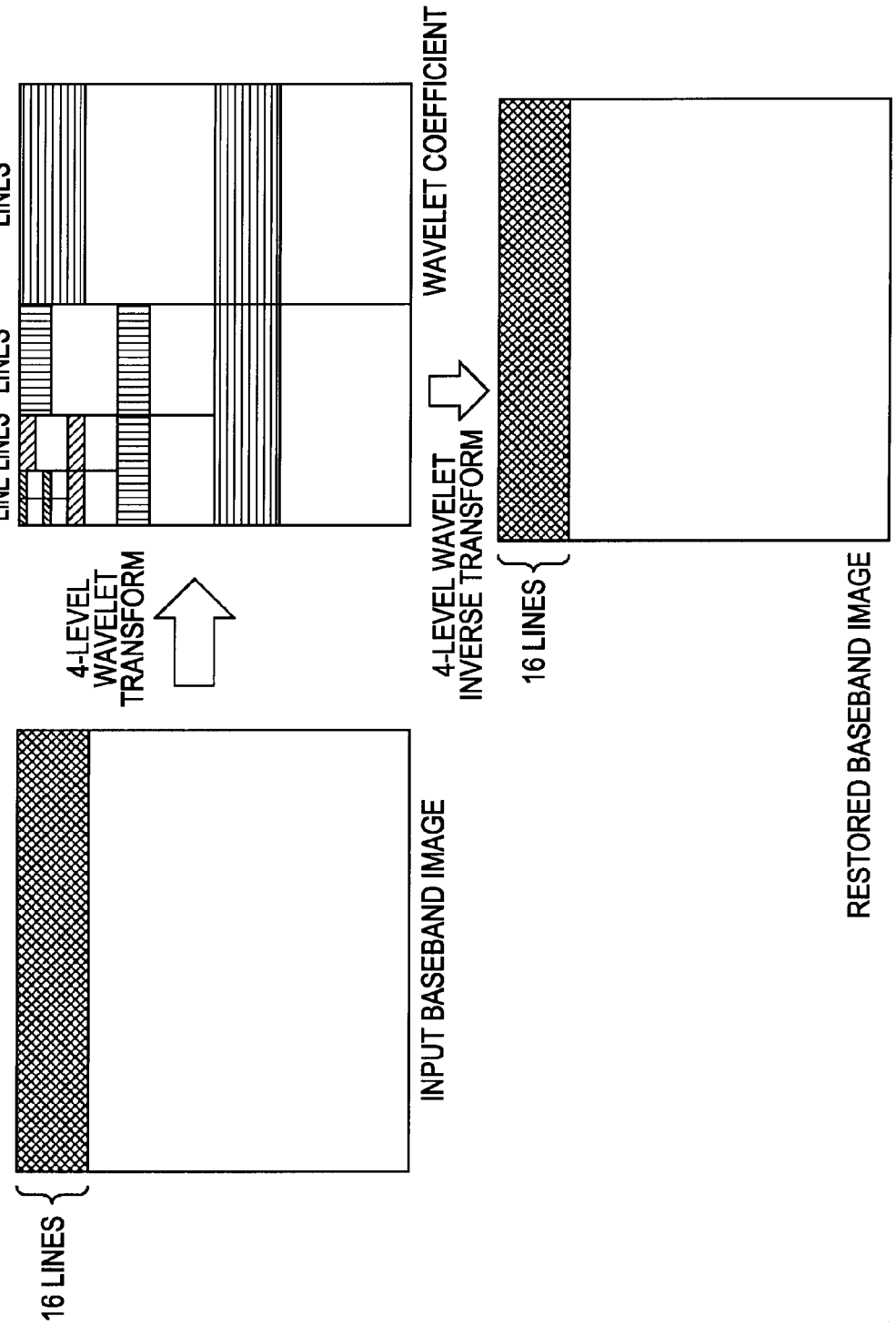
FIG. 26 is a schematic diagram for describing wavelet transformation and wavelet inverse transformation.

That is to say, as shown in FIG. 26, the wavelet inverse transformation processing is the inverse transformation processing of the wavelet transformation processing, wherein wavelet coefficients obtained by baseband image data being transformed by the wavelet transformation processing are transformed (inverse-transformed) into the original baseband image data. Accordingly, as shown in FIG. 26, in a case wherein the wavelet transformation processing of the division level 4 is performed, the wavelet inverse transformation processing is also performed at the division level 4. Also, as shown in FIG. 26, for example, in a case wherein 16 lines worth of input baseband image data is taken as one precinct, and the wavelet transformation processing is performed for each precinct thereof, the wavelet inverse transformation processing is also performed for each precinct thereof, and 16 lines worth of the baseband image data is restored from one precinct worth of coefficient data.

Description will be made below regarding a method for further reducing delay time and costs with this wavelet inverse transformation processing.

Figure 27:
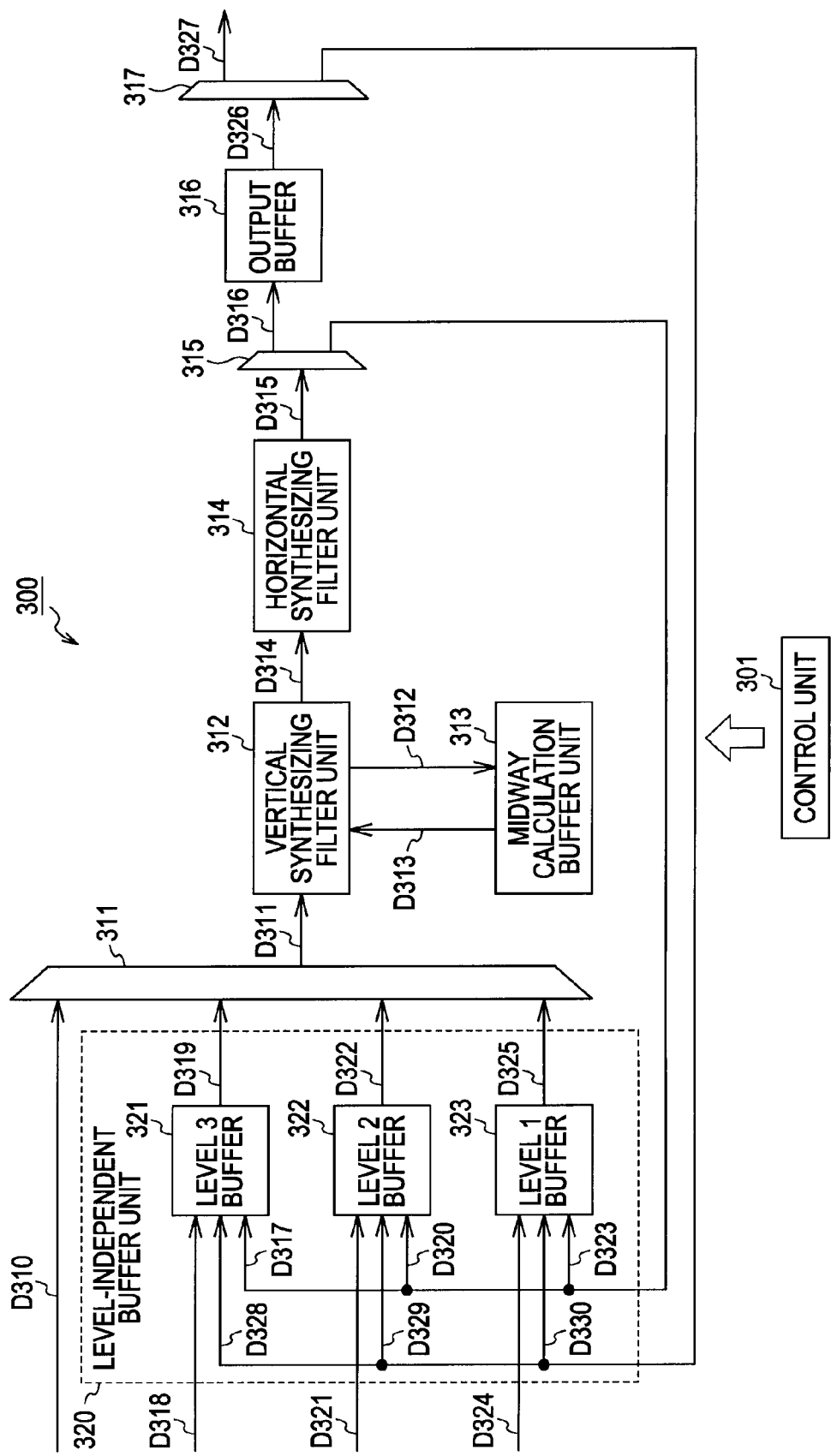
FIG. 27 is a block diagram illustrating a configuration example of a wavelet inverse transformation device to which an embodiment of the present invention has been applied.

FIG. 27 is a block diagram illustrating a configuration example of a wavelet inverse transformation device to which an embodiment of the present invention is applied. As shown in FIG. 27, the wavelet inverse transformation device 300 is a band synthesizing device for inputting the coefficient data subjected to wavelet transformation at the division level 4, and performing synthesis filtering for synthesizing that data. The wavelet inverse transformation device 300 shown in FIG. 27 includes a control unit 301, selector 311, vertical synthesizing filter unit 312, midway calculation buffer unit 313, horizontal synthesizing filter unit 314, selector 315, output buffer unit 316, selector 317, and level-independent buffer unit 320.

The control unit 301 controls the operation of each unit of the selector 311 through level-independent buffer unit 320. The selector 311 is controlled by the control unit 301 to select one of external input (D310) or the output of the buffer for each division level within the level-independent buffer units 320 (D319, D322, and D325). The vertical synthesizing filter unit 312 is controlled by the control unit 301 to obtain the coefficient data of the four sub-bands of the division level to be processed from the buffer selected by the selector 311 or external input one line at a time substantially (D311).

The vertical synthesizing filter unit 312 is controlled by the control unit 301 to subject the obtained coefficient data to synthesis filtering regarding the frequency components in the image vertical direction of the baseband image data using the midway calculation coefficients read out from the midway calculation buffer unit 313.

The vertical synthesizing filter unit 312 writes the coefficients generated by synthesis filter calculation performed as synthesis filtering in the midway calculation buffer unit 313 (D312), and simultaneously, performs the synthesis filtering by repeating the synthesis filter calculation while reading out the coefficients necessary for the next synthesis filter calculation from the midway calculation buffer unit 313 (D313).

The midway calculation buffer unit 313 holds the coefficients supplied from the vertical synthesizing filter unit 312 in internal memory, and reads out and supplies the coefficients held in the internal memory, which are requested by the vertical analysis filter unit 312. The midway calculation buffer unit 313 has the same configuration as that of the midway calculation buffer unit 117 of the wavelet transformation device 100, and operates similarly. Accordingly, the description of the configuration of the midway calculation buffer unit 117 performed with reference to the block diagram shown in FIG. 9, and the description of the buffer input/output processing performed with reference to the flowchart shown in FIG. 15 can also be applied to the midway calculation buffer unit 313.

That is to say, the midway calculation buffer unit 313 also includes a data linking unit 131, 1-port SRAM 132, and data dividing unit 133. The data linking unit 131 links supplied 16-bit data, and writes this in the 1-port SRAM 132 as 32-bit data, and the data dividing unit 133 reads out the 32-bit data stored in the 1-port SRAM, divides this into 16-bit data, and outputs these. At this time, the midway calculation buffer unit 313 repeats writing and reading out as to the 1-port SRAM alternately, thereby performing reading out and writing of data simultaneously in parallel. Thus, the delay time due to access to the midway calculation buffer unit 313 can be reduced.

The vertical synthesizing filter unit 312 holds the generated coefficients at the midway calculation buffer unit 313 each time the synthesis filtering is performed, and further, reads out the coefficients necessary for the next calculation from the midway calculation buffer unit 313. That is to say, with the synthesis filtering, access to the midway calculation buffer unit 313 is frequently performed, but as described above, the delay time due to access to the midway calculation buffer unit 313 is reduced, whereby the wavelet inverse transformation device 300 can reduce the delay time of the synthesis filtering.

According to such vertical direction synthesis filtering, the lowband components and highband components in the vertical direction are synthesized, and the lowband components and highband components in the horizontal direction are generated two lines at a time. When the synthesis filtering as to input coefficient data is completed, the vertical synthesizing unit 312 reads out the lowband components and highband components in the horizontal direction held at the midway calculation buffer unit 313 one at a time alternately in predetermined order, e.g., in order toward the right from the left of the screen for each line to supply this to the horizontal synthesizing filter unit 314 (D314).

The horizontal synthesizing unit 314 is controlled by the control unit 301 to subject the coefficient data supplied from the vertical synthesizing filter unit 312 to synthesis filtering regarding the frequency components in the image horizontal direction of baseband image data.

According to this horizontal direction synthesis filtering, two lines worth of the lowband sub-band coefficient data (or baseband image data) which is lowband component sub-band are generated in the vertical and horizontal directions of one lower level. The horizontal synthesizing filter unit 314 outputs the two lines worth of the lowband sub-band coefficient data (or baseband image data) to the selector 315 (D315).

As described above, the vertical synthesizing filter unit 312 and horizontal synthesizing filter unit 314 substantially synthesize one line worth of the coefficient data mutually at the same position, of each sub-band of the division level to be processed by the one-time vertical direction and horizontal direction synthesis filtering to generate two lines worth of lowband sub-band coefficient data of one lower level or baseband image data.

Figure 28:
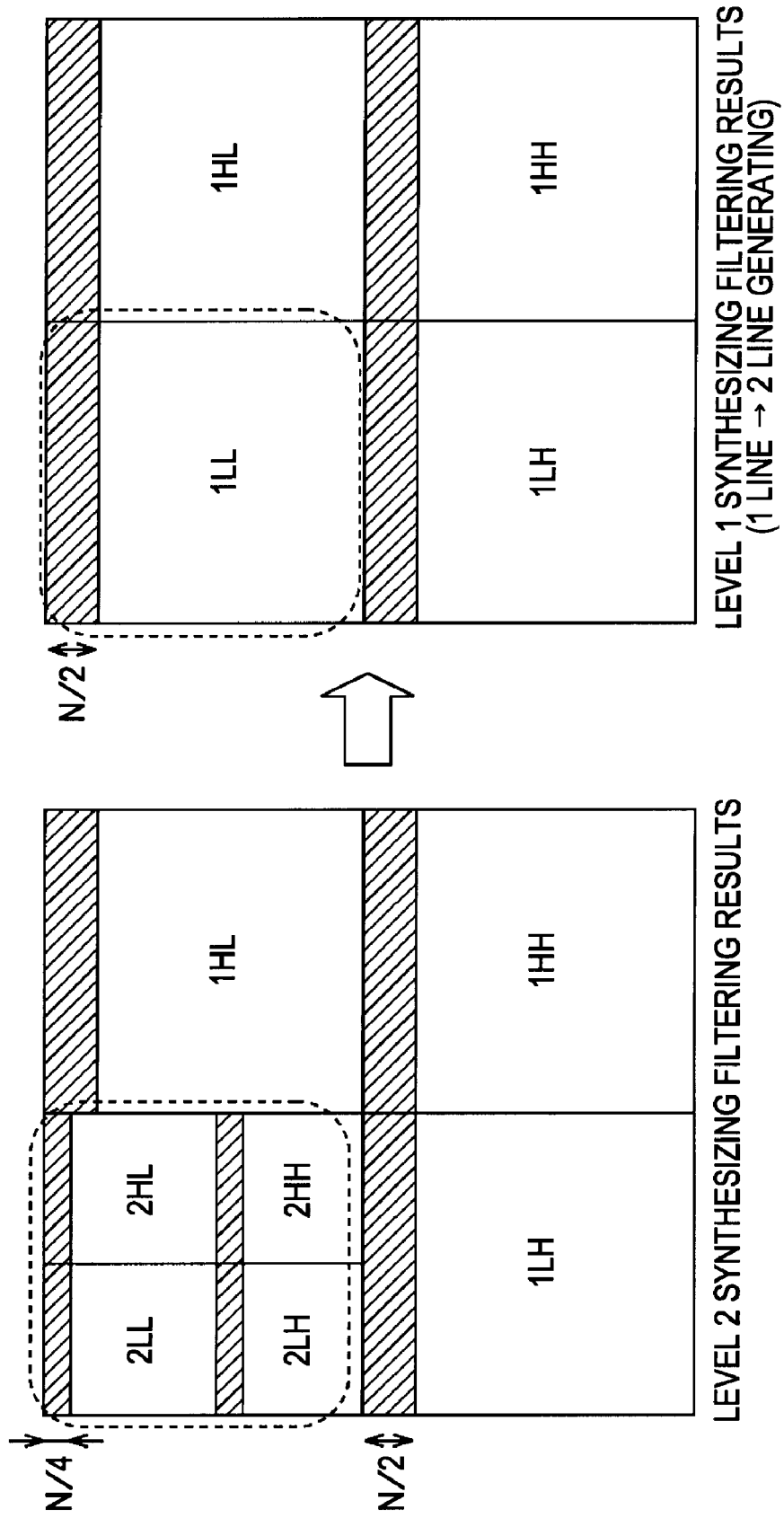
FIG. 28 is a schematic diagram for describing synthesizing filtering.

That is to say, as shown in FIG. 28, when assuming that one precinct is made up of N lines worth of image data, the vertical synthesizing filter unit 312 and horizontal synthesizing filter unit 314 substantially synthesize, for example, N/4 lines worth of the four sub-bands coefficient data of the division level 2 to generate N/2 lines worth of the lowband sub-band coefficient data of the division level 1.

The vertical synthesizing filter unit 312 and horizontal synthesizing filter unit 314 repeat such synthesis filtering while changing the division level to be processed as appropriate, thereby transforming all of the coefficient data subjected to wavelet transformation in increments of precinct into baseband image data. Subsequently, the vertical synthesizing filter unit 312 and horizontal synthesizing filter unit 314 repeat the synthesis processing regarding all precincts and all pictures in the same way. The amount of data to be processed at once is reduced by thus performing the synthesis filtering in increments of precinct as compared with a case wherein the entire image is subjected to synthesis filtering, whereby the wavelet inverse transformation device 300 can reduce the delay time due to wavelet inverse transformation. Also, as described above, performing the synthesis filtering in increments of line enables control to be performed in more detail, whereby the wavelet inverse transformation device 300 can further optimize the wavelet inverse transformation processing, and further reduce the delay time.

Now, description returns to FIG. 27, where the selector 315 is controlled by the control unit 301 to select the data output destination of the horizontal synthesizing filter unit 314, of the coefficient data generated by the synthesis filtering, supply a part of the coefficient data to the level-independent buffer units 320 to hold this, and supply another part of the coefficient data to the output buffer unit 316 to hold this. For example, the selector 315 supplies, of the two lines worth of the lowband sub-band coefficient data supplied from the horizontal synthesizing filter unit 314, one line of the lines to the output buffer unit 316 to hold this (D316), and supplies the other one line to the level-independent buffer units 320 to hold this at the buffer for the division level of the coefficient data thereof, of the level-independent buffer units 320 (D317, D320, and D323).

Note that, in a case wherein the data supplied from the horizontal synthesizing filter unit 314 is baseband image data, the selector 315 supplies two lines worth of the image data thereof to the output buffer unit 316 (D316) to hold one line of the lines, and output the other one line externally.

The output buffer unit 316 is controlled by the control unit 301 to hold the coefficient data or image data supplied from the selector 315 as necessary, read out the held data as necessary, and output this to the selector 317. For example, in a case wherein one line worth of the sub-band coefficient data is supplied from the selector 315, the output buffer unit 316 holds the coefficient data thereof. Also, for example, two lines worth of baseband image data ultimately generated by the synthesis filtering are supplied from the selector 315, the output buffer unit 316 outputs one line thereof externally (D326), and also holds the other one line until the next output timing. When holding this baseband image data, the output buffer unit 316 writes the baseband image data in the internal memory, while reading out the coefficient data held in the internal memory to output this to the selector 317 (D326).

The selector 317 is controlled by the control unit 301 to control the data output destination of the output buffer unit 316. For example, in a case wherein coefficient data is supplied from the output buffer unit 316, the selector 317 supplies the coefficient data thereof to the level-independent buffer units 320 (D328, D329, and D330) to hold this at the buffer for the division level of the coefficient data thereof, of the level-independent buffer units 320. Also, for example, in a case wherein baseband image data is supplied from the output buffer unit 316, the selector 317 outputs the baseband image data thereof externally (D327).

The level-independent buffer units 320 are controlled by the control unit 301 to hold the coefficient data supplied from the selector 315 or selector 317, and the coefficient data supplied externally, which can be subjected to the synthesis filtering again, at the buffer for division level of the coefficient data until the synthesis filtering is performed. The level-independent buffer unit 320 supplies the held coefficient data to the selector 311.

The level-independent buffer units 320 include a level 3 buffer 321, level 2 buffer 322, and level 1 buffer.

The level 3 buffer 321 is controlled by the control unit 301 to control supply of the coefficient data of the division level 3 to the selector 311 (the vertical synthesizing filter unit 312 via the selector 311). For example, the level 3 buffer 321 holds the division level 3 lowband sub-band coefficient data (3LL) supplied from the selector 315 or selector 317 (D317 and D328), or the division level 3 highband sub-bands coefficient data (3LH, 3HL, and 3HH) supplied externally (D318) at the internal memory. Subsequently, the level 3 buffer 321 multiplexes the coefficient data of each sub-band of the division level 3 held at the internal memory at predetermined timing, and supplies this to the vertical synthesizing filter unit 312 via the selector 311 (D319).

The level 2 buffer 322 is controlled by the control unit 301 to control supply of the coefficient data of the division level 2 to the selector 311 (the vertical synthesizing filter unit 312 via the selector 311). For example, the level 2 buffer 322 holds the division level 2 lowband sub-band coefficient data (2LL) supplied from the selector 315 or selector 317 (D317 and D328), or the division level 2 highband sub-bands coefficient data (2LH, 2HL, and 2HH) supplied externally (D321) at the internal memory. Subsequently, the level 2 buffer 322 multiplexes the coefficient data of each sub-band of the division level 2 held at the internal memory at predetermined timing, and supplies this to the vertical synthesizing filter unit 312 via the selector 311 (D322).

The level 1 buffer 323 is controlled by the control unit 301 to control supply of the coefficient data of the division level 1 to the selector 311 (the vertical synthesizing filter unit 312 via the selector 311). For example, the level 1 buffer 323 holds the division level 1 lowband sub-band coefficient data (1LL) supplied from the selector 315 or selector 317 (D323 and D330), or the division level 1 highband sub-bands coefficient data (1LH, 1HL, and 1HH) supplied externally (D324) at the internal memory. Subsequently, the level 1 buffer 323 multiplexes the coefficient data of each sub-band of the division level 1 held at the internal memory at predetermined timing, and supplies this to the vertical synthesizing filter unit 312 via the selector 311 (D325).

Note that the configuration of the level-independent buffer units 320 shown in FIG. 27 is an example in a case wherein with the wavelet inverse transformation device 300, division level 4 wavelet inverse transformation processing is performed. The configuration of the level-independent buffer units 320 is set according to the division level of the wavelet inverse transformation processing performed by the wavelet inverse transformation device 300 so as to hold the coefficient data of the division levels other than the highest order level mutually independently. That is to say, the level-independent buffer units 320 include dedicated buffers such as the level 3 buffer 321 through level 1 buffer 323 regarding each division level other than the highest order level.

Next, description will be made regarding a calculation method of the synthesis filtering executed by the vertical synthesizing filter unit 312 and horizontal synthesizing unit 314. In the same way as with the case of the synthesis filtering described above with reference to FIG. 5, filtering can be executed effectively, so it is desirable to employ the lifting technique in the same way with the wavelet inverse transformation synthesis filtering as well.

Figure 29:
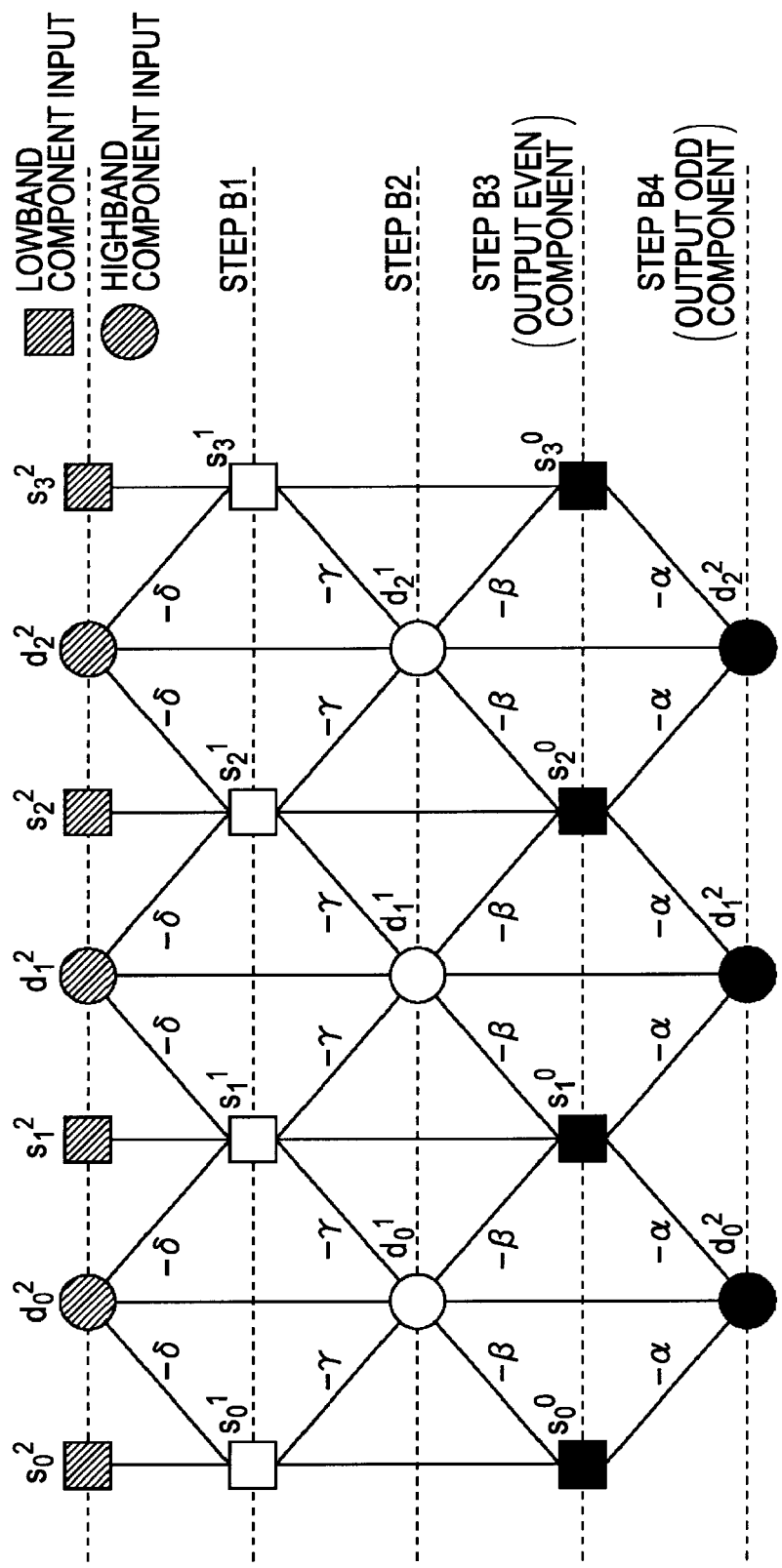
FIG. 29 is a diagram of r describing an example of a lifting scheme with a 9×7 analysis filter.

FIG. 29 illustrates a lifting scheme of a 9×7 synthesis filter used with the JPEG 2000 standard as well. Unlike common convolution computation, with a method according to the lifting technique, even-numbered components and odd-numbered components are calculated through the following four steps of steps B1 through B4.

With the example shown in FIG. 29, the first tier (highest tier) indicates coefficients generated by wavelet transformation, wherein solid circles represent highband component coefficients, and solid squares represent lowband component coefficients. The second and third tiers indicate components (coefficients) generated by the processing in steps B1 and processing in step B2, respectively. Also, the fourth tier indicates even-numbered component output generated by the processing in step B3, and the fifth tier indicates odd-numbered component output generated by the processing in step B4.

With the 9×7 synthesis filtering, even-numbered components are obtained by the processing in step B3, and odd-numbered components are obtained by the processing in step B4. The processing of step B1 through step B4 can be represented by the following Expressions (5) through (8).

$$\text{Step B1: } s_i^1 = s_i^2 - \delta(d_{i-1}^2 + d_i^2) \tag{5}$$

$$\text{Step B2: } d_i^1 = d_i^2 - \gamma(s_i^1 + s_{i+1}^1) \tag{6}$$

$$\text{Step B3: } s_i^0 = s_i^1 - \beta(d_{i-1}^1 + d_i^1) \tag{7}$$

$$\text{Step B4: } d_i^0 = d_i^1 - \alpha(s_i^0 + s_{i+1}^0) \tag{8}$$

wherein $\alpha = -1.586134342$, $\beta = -0.05298011857$, $\gamma = 0.8829110755$, and $\delta = 0.4435068520$ Thus, with the synthesis filtering applying the lifting technique, the processing of step B1 and step B2 is performed, even-numbered component coefficients are generated at step B3, following which odd-numbered component coefficients are generated at step B4. The filter bank used at this time can be realized with subtraction and shift computations alone, as can be seen from Expressions (5) through (8). Accordingly, the amount of calculations can be markedly reduced.

Figure 30:
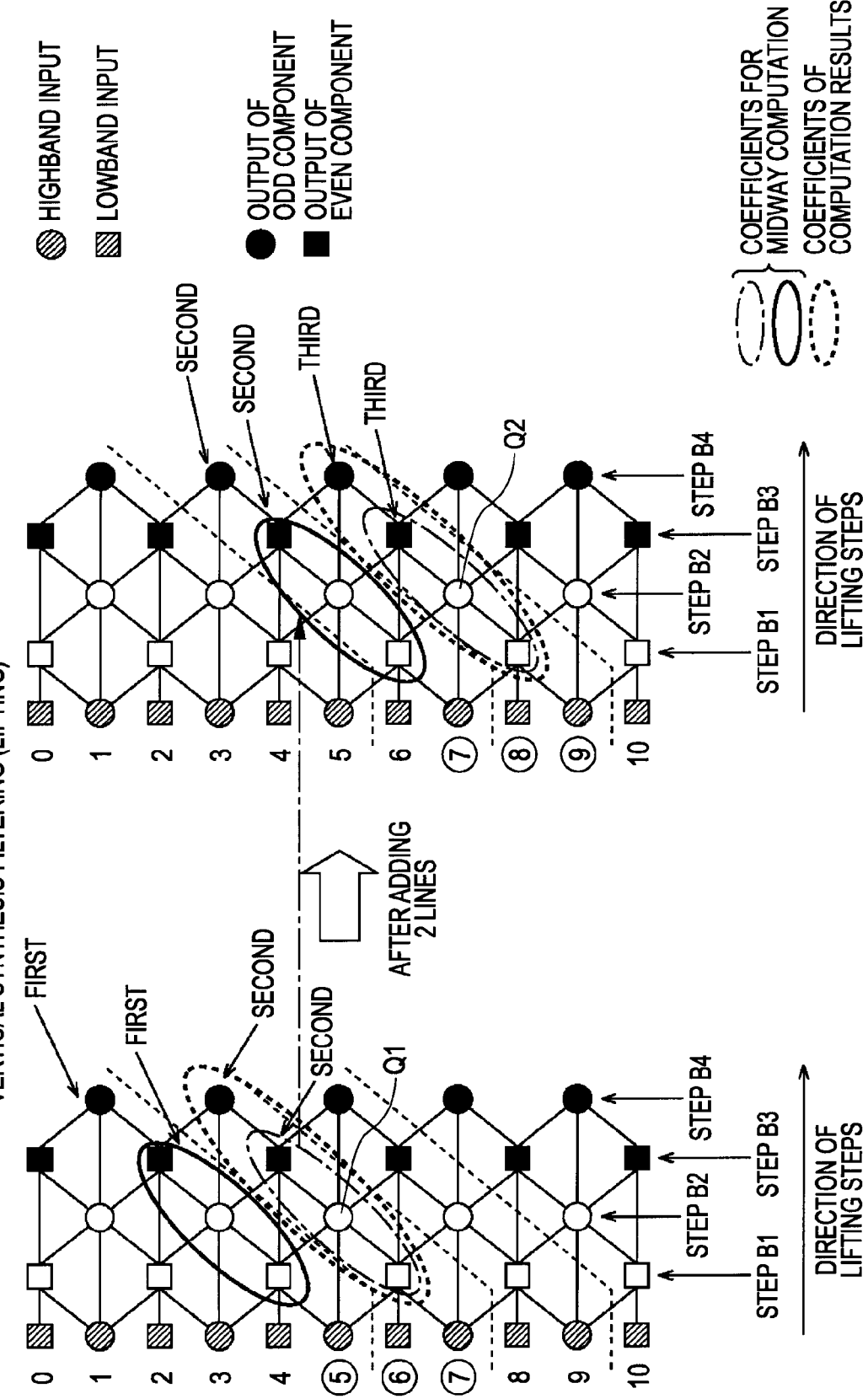
FIG. 30 is a diagram for describing an example of vertical analysis filtering.

The vertical synthesis filtering performed by the vertical synthesizing filter unit 312 will be described in detail. FIG. 30 illustrates an example of performing vertical synthesis filtering as to a coefficients group in the vertical direction, with the lifting scheme shown in FIG. 29.

The example shown in FIG. 30 shows an example of a case wherein even-numbered coefficient data (hereafter, also referred to as even-numbered coefficients) and odd-numbered coefficient data (hereafter, also referred to as odd-numbered coefficients) are generated through the processing of four steps (step B1 through step B4) described above with reference to FIG. 29 as to the vertical direction coefficient data, and the direction of lifting steps proceeds from the left to the right in the drawing.

Also, the numeral indicated at the left side of the vertical direction coefficient data represents a line number, the hatched circles and squares at the first column from the left represent highband input which is input of highband components in the screen vertical direction, and lowband input which is input of lowband components in the screen vertical direction, respectively. Further, the circles and squares at the subsequent tiers represent the highband coefficients and lowband coefficients generated in the process of lifting computation respectively, and particularly, the solid circles and solid squares represent the odd-numbered coefficients which are coefficient data of which the line numbers are odd lines, and the even-numbered coefficients which are coefficient data of which the line numbers are even lines, which are the results of lifting computation, respectively.

The following is a description of operations in order from the left. The left side in FIG. 30 illustrates an example wherein three lines of coefficients, line Nos. 4 through 6 in the vertical direction, are input, and computation with a lifting scheme in the vertical direction (i.e., horizontal lifting computation) is performed. Note that, in this case, the even-numbered coefficients at the highest tier are not coupled with odd-numbered coefficients, so description thereof will be omitted.

In order to obtain the first even-numbered coefficient in step B3 of the vertical lifting computation and obtain the first odd-numbered coefficient in step B4, there is the need to input the coefficients of the six lines of Nos. 0 through 5.

Subsequently, in order to obtain the second even-numbered coefficients and odd-numbered coefficients, there is the need for the three coefficients indicated by the heavy solid lines and the coefficients of the two lines of Nos. 6 and 7 indicated by circled numbers, and further, in order to calculate the coefficient indicated by Q1 at step B2, the coefficient of the line No. 5 indicated by a circled number is also necessary.

The three coefficients indicated by the heavy solid lines are a part of the coefficients generated in the process of the vertical lifting computation for obtaining the first even-numbered coefficient and odd-numbered coefficient (hereafter also referred to as "first vertical lifting computation").

Accordingly, in order to obtain the second even-numbered coefficient and odd-numbered coefficient, there is ultimately the need to input the coefficients of the three lines of Nos. 5 through 7. Note however, the coefficient of the line No. 5 is a coefficient to be input again, so substantially, this input becomes additional input of the coefficients of the two lines (line Nos. 6 and 7). The coefficient data of three lines in the vertical direction (substantially, coefficient data of two lines) is read out from the buffer of the level corresponding to the level-independent buffer units 320 shown in FIG. 27 for each level. That is to say, when the current wavelet transformation division level is 2, the coefficient data is read out from the level 2 buffer 322.

Further, in order to obtain the second even-numbered coefficient and odd-numbered coefficient, there is the need to input the three coefficients indicated by the heavy solid line generated in the process of the vertical lifting computation for obtaining the first even-numbered coefficient and odd-numbered coefficient. These coefficients are held at the midway calculation buffer unit 313 after the second even-numbered coefficient and odd-numbered coefficient are obtained, so are read out from the midway calculation buffer unit 313 thereof.

That is to say, the three coefficients indicated by the heavy solid line stored in the midway calculation buffer unit 313 at the first vertical lifting computation, and the coefficients of the three lines of Nos. 5 through 7 which are read out and input from the corresponding level buffer are employed to perform vertical lifting computation, thereby obtaining four coefficients (indicated by the heavy dotted line) including the second even-numbered coefficient and odd-numbered coefficient. These coefficients are stored in the midway calculation buffer unit 313, in the same way as with the case of the first vertical lifting computation. At this time, simultaneously with writing of these coefficients, the coefficients employed for the next vertical lifting computation are read out from the midway calculation buffer unit 313. In the case of the example at the left side of FIG. 30, of the coefficients stored in the midway calculation buffer unit 313, the three coefficients indicated by the single-dot broken line are coefficients necessary for obtaining the third even-numbered coefficient and odd-numbered coefficient, and accordingly are read out from the midway calculation buffer unit 313.

An example of a case wherein, following reading out of the coefficient of line No. 7, the coefficients of the two lines are to be additionally read out, i.e., the coefficients of the three lines of Nos. 7 through 9 in the vertical direction are input and vertical lifting computation is performed, is shown at the right side of FIG. 30.

In the same way as with the second case, in order to obtain the third even-numbered coefficient and odd-numbered coefficient, there is the need for the three coefficients indicated by the heavy solid lines and the coefficients of the two lines of Nos. 8 and 9 indicated by circled numbers, and further, in order to calculate the coefficient indicated by Q2 at step B2, the coefficient of the line No. 7 indicated by a circled number is also necessary.

Note that the three coefficients indicated by the heavy solid line at the right side have been stored in the midway calculation buffer unit 313 in the second horizontal lifting computation, as indicated by the single-dot broken line at the left side of the diagram.

Accordingly, four coefficients (indicated by the heavy dotted line) including the third even-numbered coefficient and odd-numbered coefficient are obtained by performing vertical lifting computation using the three coefficients indicated by the heavy solid line that have been stored at the second vertical lifting computation, and the coefficients of the three lines of Nos. 7 through 9 that have been read out and input from the corresponding level buffer. These coefficients are stored in the midway calculation buffer unit 313. At this time, simultaneously with writing of these coefficients, the coefficients necessary for the next vertical lifting computation are read out from the midway calculation buffer unit 313. In the case of the right side of FIG. 30, of the coefficients stored in the midway calculation buffer unit 313, the three coefficients indicated by the single-dot broken line are coefficients necessary for obtaining the fourth even-numbered coefficient and odd-numbered coefficient, and accordingly are read out from the midway calculation buffer unit 313.

Thus, the vertical lifting computation is performed to the far lowest line of the screen using the input coefficient data and the coefficients held at the midway calculation buffer unit 313, thereby completing vertical direction synthesis filtering.

Figure 31:
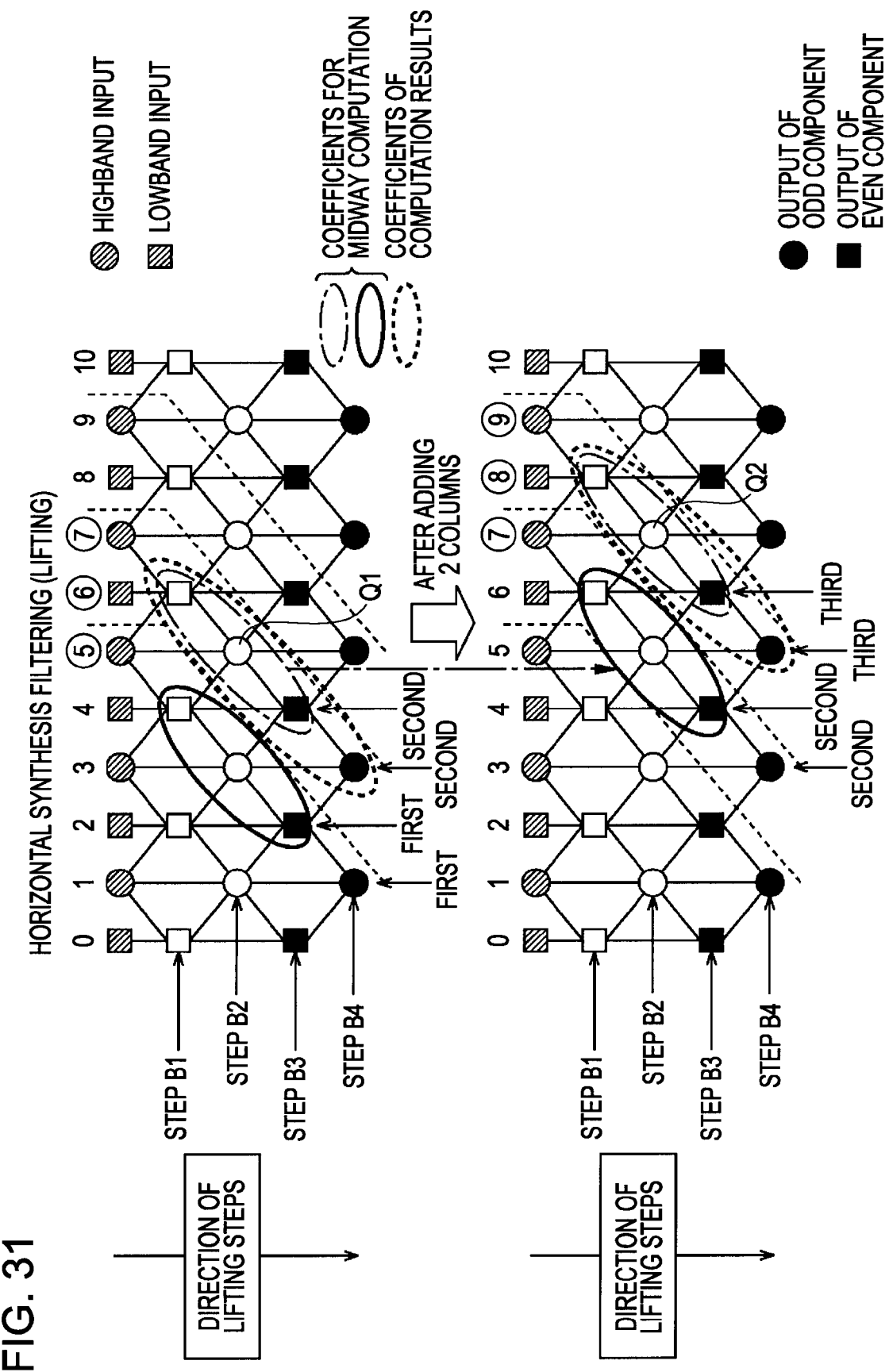
FIG. 31 is a diagram for describing an example of horizontal analysis filtering.

Next, the horizontal synthesizing filtering performed by the horizontal synthesizing filter unit 314 will be described in detail. FIG. 31 illustrates an example of arraying coefficients obtained by vertical direction synthesizing filtering in the horizontal direction, and performing horizontal synthesizing filtering with the lifting scheme shown in FIG. 29.

The example shown in FIG. 31 shows an example of the horizontal direction coefficients being subjected to the processing of the four steps (Steps B1 through B4) described above with reference to FIG. 29 whereby the odd-numbered component coefficients and the even-numbered component coefficients are generated, with the direction of lifting steps proceeding from the top to the bottom in the drawing.

Also, the numbers shown above the coefficients in the horizontal direction indicate column Nos., with the hatched circles and squares at the first tier from the top representing the highband input and lowband input, respectively, and the circles and squares at the subsequent tiers represent the highband coefficients and lowband coefficients generated in the process of lifting computation, respectively. Particularly, the solid circles and solid squares represent the odd-numbered coefficients and even-numbered coefficients which are the results of the lifting computation, respectively.

The following is a description of operations in order from the top. The upper side of FIG. 31 illustrates an example of a case wherein the coefficients of columns Nos. 5 through 7 in the horizontal direction are input, and computation with a lifting scheme in the horizontal direction (hereafter, referred to as "horizontal lifting computation") is performed. Note that in this case, the even-numbered coefficient at the far left is not paired with an odd-numbered coefficient, and accordingly description thereof will be omitted.

In order to obtain the first even-numbered coefficient in step B3 of the horizontal lifting computation and obtain the first odd-numbered coefficient in step B4, there is the need to input the coefficients of the six columns of Nos. 0 through 5.

Subsequently, in order to obtain the second even-numbered coefficient and odd-numbered coefficient, there is the need for the three coefficients indicated by the heavy solid lines and the coefficients of the two columns of Nos. 6 and 7 indicated by circled numbers, and further, in order to calculate the coefficient indicated by Q1 at step B2, the coefficient of the column No. 5 indicated by a circled number is also necessary.

The three coefficients indicated by the heavy solid lines are a part of the coefficients generated in the process of the horizontal lifting computation for obtaining the first odd-numbered coefficient and even-numbered coefficient (hereafter also referred to as "first horizontal lifting computation").

That is to say, in order to obtain the second odd-numbered coefficient and even-numbered coefficient, there is ultimately the need to input the coefficients of the three columns of Nos. 5 through 7 indicated by circled numbers, and further, latch the three coefficients indicated by the heavy solid lines that are generated in the process of the first horizontal lifting computation. Actually, with this being no more than three coefficients, a flip-flop which is often used as a latch can be built into the horizontal analyzing filter unit 314.

Accordingly, performing horizontal lifting computation using the three coefficients indicated by the heavy solid line that have been latched at the first horizontal lifting computation, and the coefficients of the three columns of Nos. 5 through 7 that have been input, generates four coefficients (indicated by the heavy dotted line) including the second odd-numbered coefficient and even-numbered coefficient at the point that the computation process thereof ends. Of these, the three coefficients indicated by the single-dot broken line are coefficients necessary for obtaining the third odd-numbered coefficient and even-numbered coefficient, and accordingly are latched at a built-in flip-flop.

An example of a case wherein, following input of the column No. 7 coefficient, the coefficients of two columns in the horizontal direction are to be additionally input, i.e., the coefficients of the three columns of Nos. 7 through 9 in the horizontal direction are input and horizontal lifting computation is performed, is shown at the lower half of FIG. 31.

In the same way as with the second case, in order to obtain the third odd-numbered coefficient and even-numbered coefficient, there is the need for the three coefficients indicated by the heavy solid lines and the coefficients of the two columns of Nos. 8 and 9 indicated by circled numbers, and further, in order to calculate the coefficient indicated by Q2 at step B2, the coefficient of the column No. 7 indicated by a circled number is also necessary.

Note that the three coefficients indicated by the heavy solid line at the lower half have been latched in the second horizontal lifting computation, as indicated by the single-dot broken line at the upper half of the diagram.

Accordingly, performing horizontal lifting computation using the three coefficients indicated by the heavy solid line that have been latched at the second horizontal lifting computation, and the coefficients of the three columns of Nos. 7 through 9 that have been newly input, generates four coefficients (indicated by the heavy dotted line) including the third odd-numbered coefficient and even-numbered coefficient. Of these, the three coefficients indicated by the single-dot broken line are coefficients necessary for obtaining the fourth odd-numbered coefficient and even-numbered coefficient, and accordingly are latched at a built-in flip-flop.

Thus, the horizontal lifting computation is performed to the far right column of the screen while sequentially inputting three columns worth of coefficients and holding the three intermediate computation coefficients, thereby completing horizontal direction analysis filtering.

Description has been made so far regarding an arrangement wherein the midway calculation buffer unit 313 is configured so as to perform writing and reading out of data simultaneously in parallel, such as shown in FIG. 9, but similarly, the output buffer unit 316 is also configured so as to perform writing and reading out of data using the 1-port SRAM.

Thus, the control unit 301 can store the baseband image data output from the horizontal synthesizing filter unit 314 in the output buffer unit 316, and simultaneously therewith, supply the coefficient data held at the output buffer unit 316 to the level-independent buffer unit 320.

Figure 32:
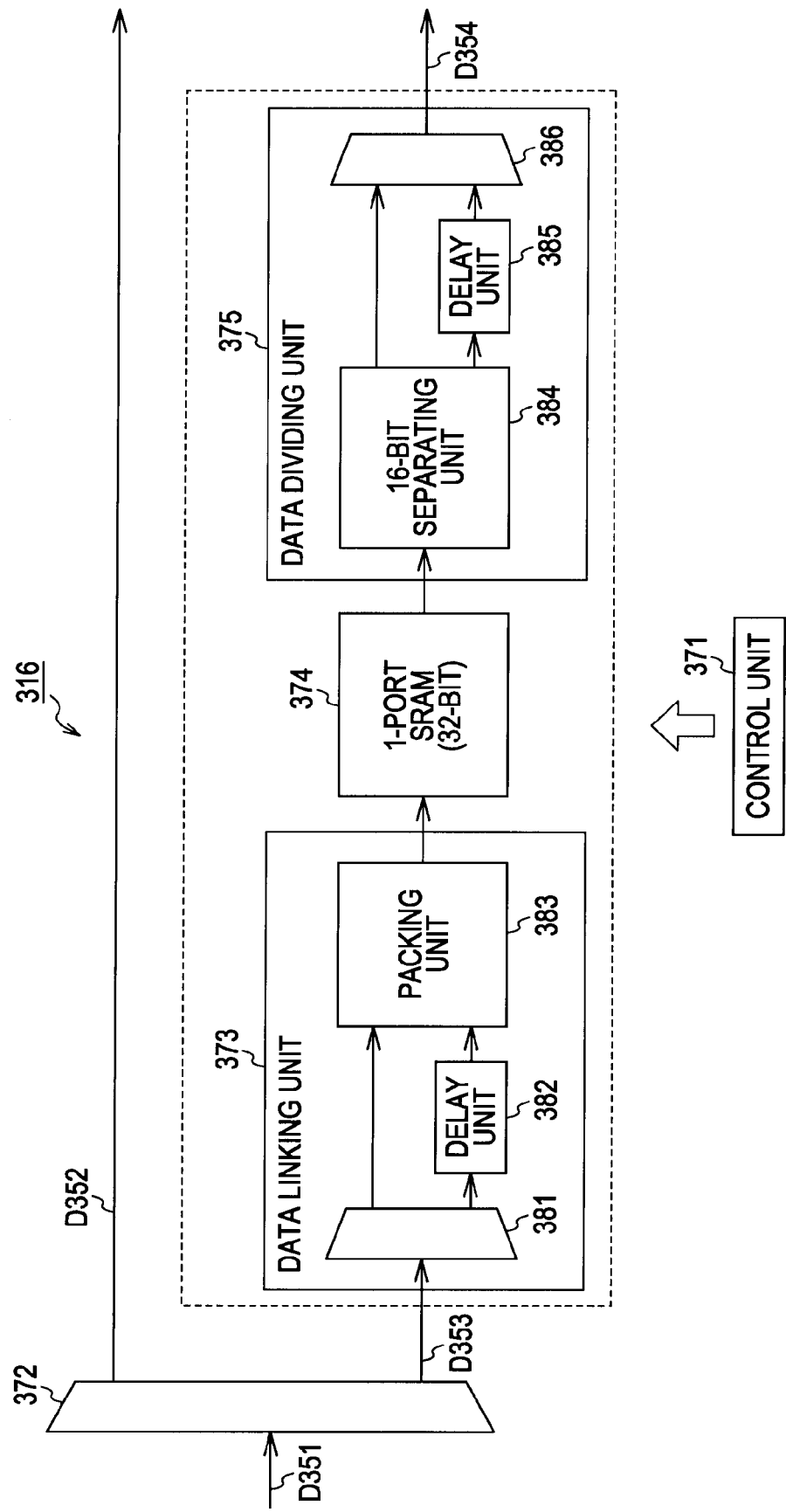
FIG. 32 is a block diagram illustrating a detailed configuration example of the output buffer unit shown in FIG. 27.

FIG. 32 is a block diagram illustrating an internal configuration example of the output buffer unit 316 shown in FIG. 5. As shown in FIG. 32, the output buffer unit 316 includes a control unit 371, selector 372, data linking unit 373, 1-port SPAM 374, and data dividing unit 375.

The control unit 371 controls the operation of each unit of the selector 372 through data dividing unit 371. The selector 372 is controlled by the control unit 371 to determine the supply destination of the data supplied from the horizontal synthesizing filter unit 314 (FIG. 27). For example, the selector 372 supplies the sub-band coefficient data supplied from the horizontal synthesizing filter unit 314 (D351) to the data linking unit 373 (D353). Also, of the two lines of baseband image data supplied from the horizontal synthesizing filter unit 314, the selector 372 supplies one to the selector 317 (FIG. 27) (D352), the other to the data linking unit 373 (D353).

The data linking unit 373 corresponds to the data linking unit 131 shown in FIG. 9, has the same configuration as the data linking unit 131, and operates in the same way. The 1-port SRAM 374 has the same configuration as that of the 1-port SRAM 132, and operates in the same way. The data dividing unit 375 corresponds to the data dividing unit 133, and has the same configuration as that of the data dividing unit 133, and operates in the same way.

Figure 33:
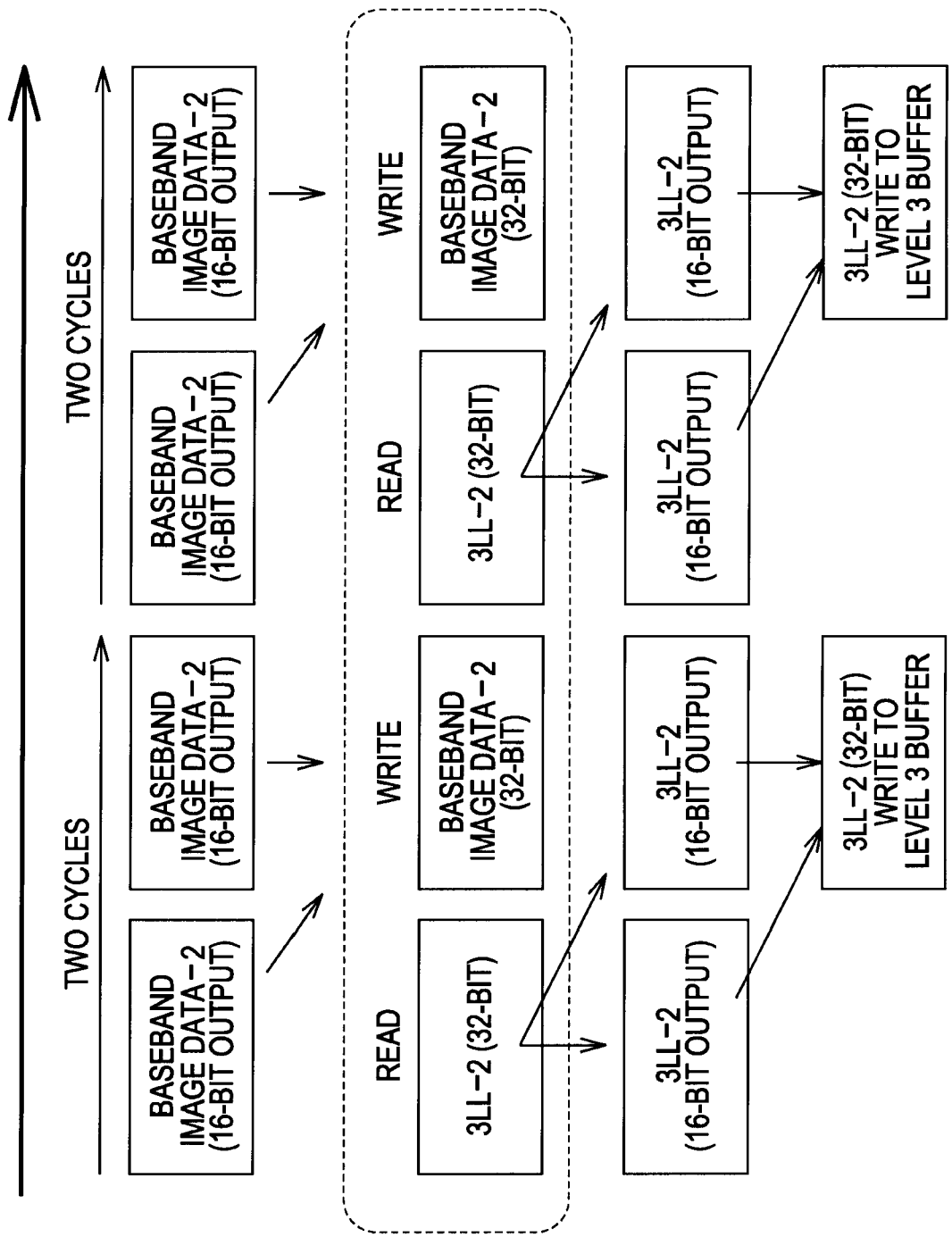
FIG. 33 is a diagram illustrating an example of the timing of data input/output with the 1-port SRAM shown in FIG. 32.

That is to say, the data linking unit 373 includes a selector 381 similar to the selector 141, a delay unit 382 similar to the delay unit 142, and a packing unit 383 similar to the packing unit 143, and as shown in FIG. 33, links two pieces of 16-bit data supplied from the selector 372 by spending two cycles to generate 32-bit data, and stores this to 1-port SRAM 374 in one cycle to hold this.

Also, the data dividing unit 375 includes a 16-bit separating unit 384 similar to the 16-bit separating unit 144, a delay unit 385 similar to the delay unit 145, and a selector 386 similar to the selector 146, and as shown in FIG. 33, reads out the 32-bit data from the 1-port SRAM, separates the 32-bit data thereof generate two pieces of 16-bit data, and outputs these externally by spending two cycles. Thus, reading out and writing of data as to the 1-port SRAM 374 of the output buffer unit 316 are, such as shown in FIG. 33, repeated alternately for every cycle, thereby reading and writing 32-bit data. Accordingly, reading out and writing are performed simultaneously in parallel.

That is to say, the portions surrounded with the dotted line in FIG. 32 are the same configurations as those of the midway calculation buffer unit 117 of the wavelet transformation device 100 shown in FIG. 9. That is to say, the portions surrounded with the dotted line are also the same configurations as those of the midway calculation buffer unit 313 of the wavelet inverse transformation device 300 shown in FIG. 27.

According to such configurations, the output buffer unit 316 stores baseband image data in the 1-port SRAM 374, and simultaneously in parallel, can read out the coefficient data stored in the 1-port SRAM 374 to supply this to the level-independent buffer units 320. Thus, with the output buffer unit 316, the delay time due to reading out and writing of data can be reduced further, and cost can be reduced. That is to say, with the wavelet inverse transformation device 300, the delay time of the wavelet inverse transformation processing can be reduced further, and also cost can be reduced.

Next each processing flow will be described. Description will be made regarding a flow example of the wavelet inverse transformation processing by the wavelet inverse transformation device 300 shown in FIG. 27 with reference to the flowchart shown in FIG. 34. When the wavelet inverse processing is started, in step S301 the control unit 301 initializes the precinct to be processed. In step S302, the control unit 301 determines whether or not the current timing is predetermined timing, and stands by until determination is made that the current timing is predetermined timing. In a case wherein determination is made in step S302 that the current timing is predetermined timing, the processing proceeds to step S303. In step S303, the vertical synthesizing filter unit 312 and horizontal synthesizing filter unit 314 execute line increment wavelet inverse transformation processing to generate one line worth of the coefficient data of one lower division level, or one line worth of baseband image data. The details of this line increment wavelet inverse transformation processing will be described later.

When the line increment wavelet inverse transformation processing is completed, the processing proceeds to step S304. In step S304, the control unit 301 determines whether or not all of the coefficient data within a precinct have been processed. In a case wherein determination is made that all of the coefficient data within a precinct have not been processed, the processing returns to step S302, where the subsequent processing is repeated. Also, in a case wherein determination is made that all of the coefficient data within a precinct have been processed, the processing proceeds to step S305.

In step S305, the control unit 301 determines whether or not all of the precincts within a picture have been processed. In a case wherein determination is made that an unprocessed precinct exists, the processing proceeds to step S306. In step S306, the control unit 301 updates the precinct to be processed to take the next precinct as the precinct to be processed. When the processing in step S306 is completed, the processing returns to step S302, where the subsequent processing is repeated.

Also, in a case wherein determination is made in step S305 that all of the precincts within a picture have been processed, the wavelet inverse transformation processing ends. Note that this wavelet inverse transformation processing is executed for each picture.

Figure 34:
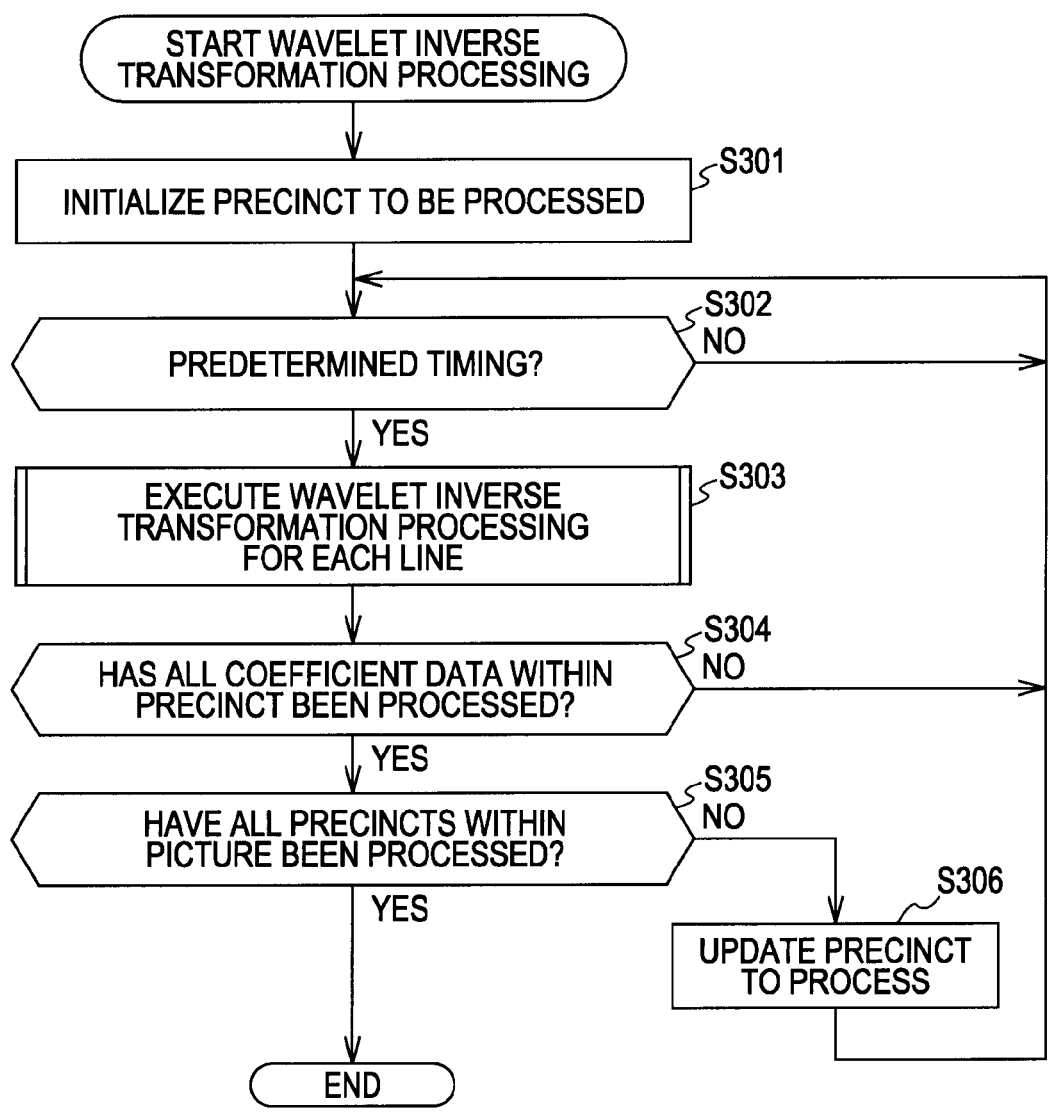
FIG. 34 is a flowchart for describing an example of the flow of wavelet inverse transformation processing.

Next, an example of the flow of line-increment wavelet inverse transformation executed in step S303 in FIG. 34 will be described with reference to the flowchart in FIGS. 35 and 36.

Upon the line-increment wavelet inverse transformation being started, in step S321, the control unit 301 determines whether or not baseband image data exists in the output buffer unit 316. As described later, two lines of baseband image data is generated each time that line-increment wavelet inverse transformation is performed. The generated baseband image data is output one line at a time, with the outer one line being accumulated in the output buffer unit 316, and being output at the next predetermined timing (the timing of determination in step S302 in FIG. 34), i.e., at the time of the next line-increment wavelet inverse transformation being executed.

That is to say, the processing in step S321 is determination regarding whether or not baseband image data has been accumulated in the output buffer unit 316.

In the event that determination is made that baseband image data has not been accumulated in the output buffer unit 316, the flow proceeds to step S322.

In step S322, the control unit 301 determines whether or not coefficient data exists in the level-independent buffer unit 320. With wavelet inverse transformation processing, in each of the repeatedly-performed synthesizing filtering processing, one line each of coefficients of four sub-bands is synthesized and two lines of lowband sub-band coefficients of one level lower order are generated, with one thereof being held in the level-independent buffer unit 320 via the output buffer unit 316. In line-increment wavelet inverse transformation processing, baseband image data is generated two lines at a time in order from the top of the picture, so in the event that coefficients are present in the level-independent buffer unit 320, those coefficients are first processed, which will be described later in detail.

In the event that determination is made that there are no coefficients in the level-independent buffer unit 320 in step S322, the flow proceeds to step S323. In step S323, the control unit 301 sets the division level to be processed to the uppermost level. Upon the processing in step S323 ending, the processing proceeds to step S331 in FIG. 36.

Figure 35:
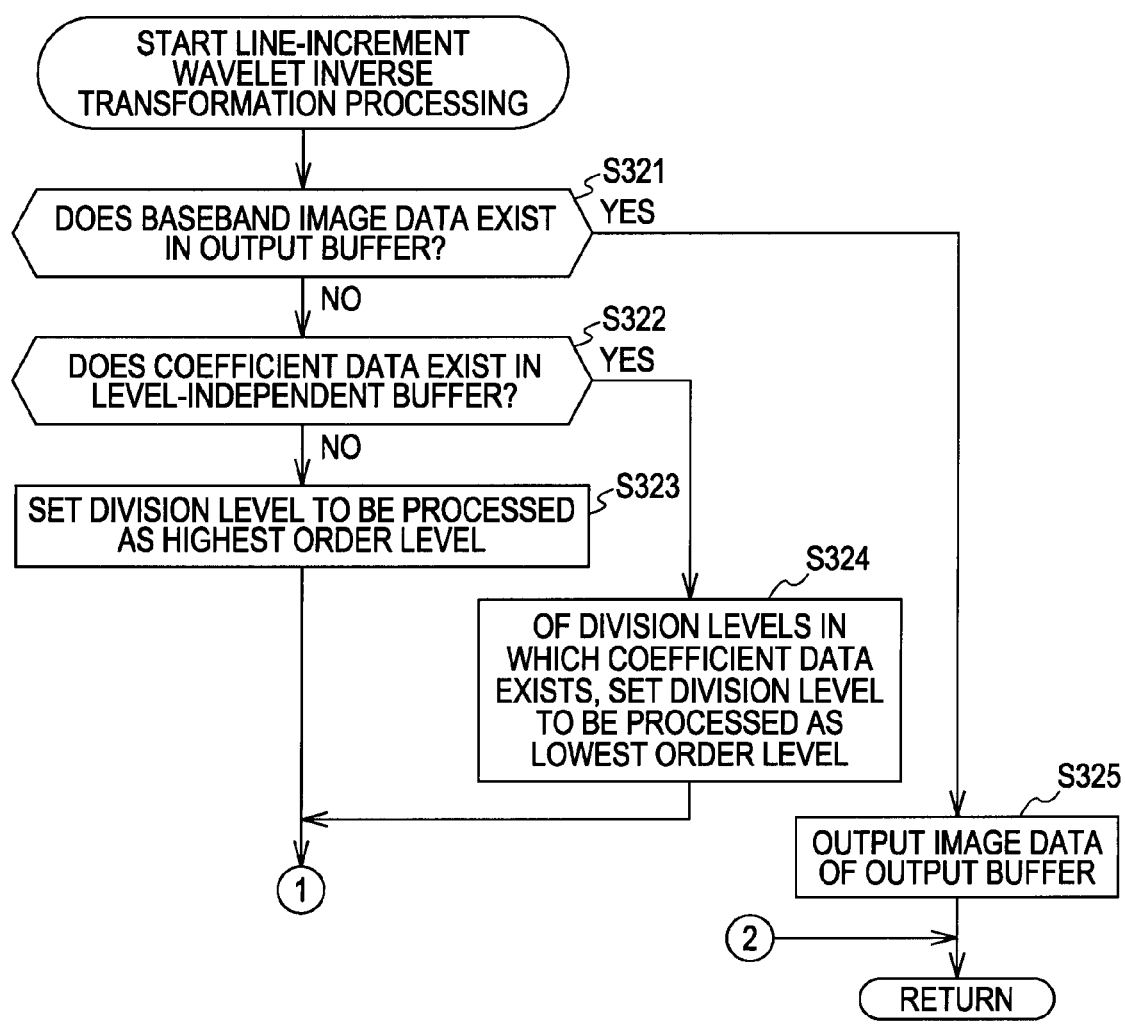
FIG. 35 is a flowchart for describing an example of the flow of line-increment wavelet inverse processing.

Also, in the event that determination is made that there are coefficients in the level-independent buffer unit 320 in step S322 in FIG. 35, the flow proceeds to step S324. In step S324, the control unit 301 sets the division level to be processed to the lowermost level. Upon the processing in step S324 ending, the processing proceeds to step S331 in FIG. 36.

Figure 36:
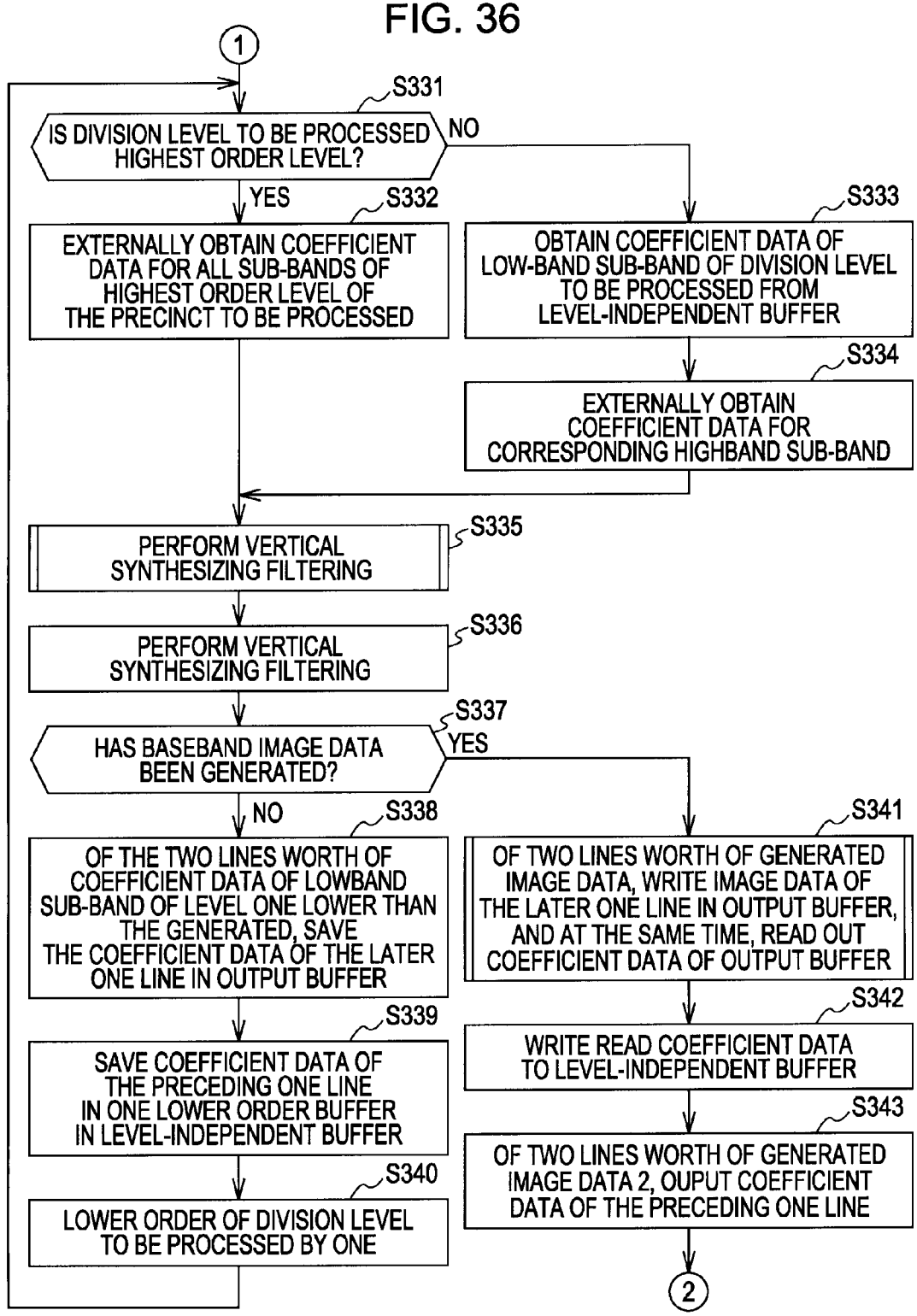
FIG. 36 is a flowchart continuing from FIG. 35, for describing an example of the flow of line-increment wavelet inverse processing.

In step S331 in FIG. 36, the control unit 301 determines whether or not the division level to be processed is the uppermost level or not. In the event that determination is made that the division level to be processed is the uppermost level, the flow proceeds to step S332. In step S332, the vertical synthesizing filter unit 312 externally obtains coefficient data for all sub-bands of the uppermost level of the precinct to be processed via the selector 311. Upon the coefficient data being obtained, the flow proceeds to step S335. Also, in the event that determination is made in step S331 that the division level to be processed is not the uppermost level, the flow proceeds to step S333. In step S333, the vertical synthesizing filter unit 312 obtains coefficient data for the lowband sub-band of the division level to be processed, via the selector 311. Also, in step S334, the vertical synthesizing filter unit 312 externally obtains coefficient data for the highband sub-bands of the division level to be processed, via the selector 311. Upon the processing of step S334 ending, the flow proceeds to step S335.

In step S335, the vertical synthesizing filter unit 312 executes vertical synthesizing filter processing (vertical synthesizing filtering). Details of vertical synthesizing filter processing will be described later. Upon the vertical synthesizing filter processing ending, the horizontal synthesizing filter unit 314 performs horizontal synthesizing filter processing (horizontal synthesizing filtering).

In step S337, the control unit 301 determines whether or not baseband image data has been generated by the horizontal synthesizing filter processing in step S336. In the event that determination is made that the generated coefficient data is midway level coefficient data, the flow proceeds to step S338. In step S338, the horizontal synthesizing filter unit 314 saves, of the two lines of lowband sub-band coefficient data of the level one below that generated, the latter one line, in the output buffer unit 316.

In step S339, the horizontal synthesizing filter unit 314 saves, of the two lines of lowband sub-band coefficients data of the level one below that generated, the first one line, in the level-independent buffer unit 320 at a level one lower in order. In step S340, the control unit 301 updates the division level to be processed, to the division level one lower in order. Upon the processing of step S340 ending, the flow returns to step S331, and subsequent processing is repeated.

That is to say, the wavelet inverse transformation device 300 repeats the processing of steps S331 through S340 until two lines of baseband image data are generated, and performs synthesizing filter processing at each level while transitioning the division level to be processed to the lower order one at a time.

Synthesizing filter processing is performed at the division level 1, and in the event that determination is made in step s337 that baseband image data has been generated, the flow proceeds to step S341. In step S341, the output buffer unit 316 obtains two lines of image data generated at the horizontal synthesizing filter unit 314, executes processing the same as with the buffer input/output processing described with reference to the flowchart in FIG. 15, and writes the latter one line into the built-in 1-port SRAM 374, while at the same time reading out the coefficient data stored in the 1-port SRAM 374.

In step S342, the output buffer unit 316 writes the coefficient data that has been read out to the buffer units of corresponding division levels in the level-independent buffer unit 320, via the selector 317. In step S343, the output buffer unit 316 externally outputs, of the two lines of image data generated at the horizontal synthesizing filter unit 314, the first line, via the selector 317. Upon the processing of step S343 ending, the line-increment wavelet inverse transformation processing ends, the flow returns to the processing in step S303 of FIG. 34, and processing from step S304 on is executed.

Also, in the event that determination is made in step S321 in FIG. 35 that one line of base band image data exists in the output buffer unit 316, the flow proceeds to step S325. The output buffer unit 316 reads out the one line of baseband image data from the built-in 1-port SRAM 374, and externally outputs this via the selector 317. Upon the image data being output, the line-increment wavelet inverse transformation processing ends, the flow returns to step S303 in FIG. 34, and processing from step S304 on is executed.

Thus, two lines at a time are generated by synthesizing filter processing, so one line is accumulated in the output buffer unit 316, and in the event that there is baseband image data in the output buffer unit 316, that image data is output; otherwise, image data is generated by the synthesizing filter processing. Accordingly, each time line-increment wavelet inverse transformation processing is performed, the wavelet inverse transformation device 300 can output one line each of baseband image data at a predetermined timing.

Figure 37:
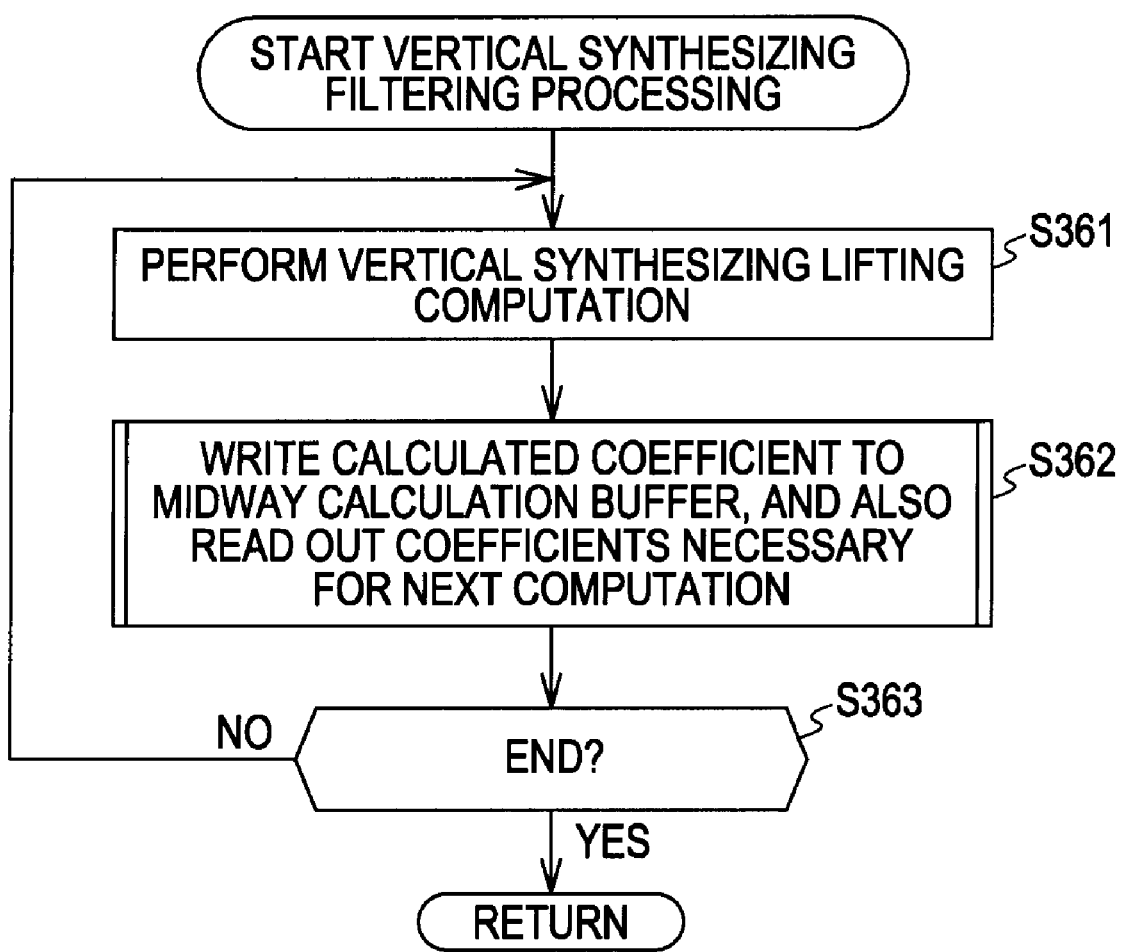
FIG. 37 is a flowchart for describing an example of the flow of vertical analysis filtering.

Next, a detailed example of vertical synthesizing filter processing executed in step S335 in FIG. 36 will be described with reference to the flowchart in FIG. 37.

Upon the vertical filter processing starting, in step S361 the vertical synthesizing filter unit 312 performs vertical direction synthesizing lifting computation (vertical synthesizing lifting computation) such as described with reference to FIGS. 29 and 30. In step S362, buffer input/output processing such as described with reference to FIG. 15 is performed, and coefficients calculated by the vertical synthesizing lifting computation in step S361 are written to the midway calculation buffer unit 313, while reading out coefficients necessary for the next computation.

Upon the buffer input/output processing ending, in step S363, the vertical synthesizing filter unit 312 determines whether or not to end the vertical synthesizing filter processing. In the event that determination is made that the vertical lifting computation has not ended regarding all of the coefficient data obtained this time, and that there are still unprocessed coefficients, the flow returns to step S361, and the subsequent processing is repeated. That is to say, repeating the processing of steps S361 and S362 performs vertical lifting computation on all coefficients that have been obtained. In the event that determination is made in step S363 to end processing, i.e., in the event that determination is made that the vertical lifting computation has ended regarding all of the coefficient data obtained this time, the vertical synthesizing filter processing ends.

Figure 38:
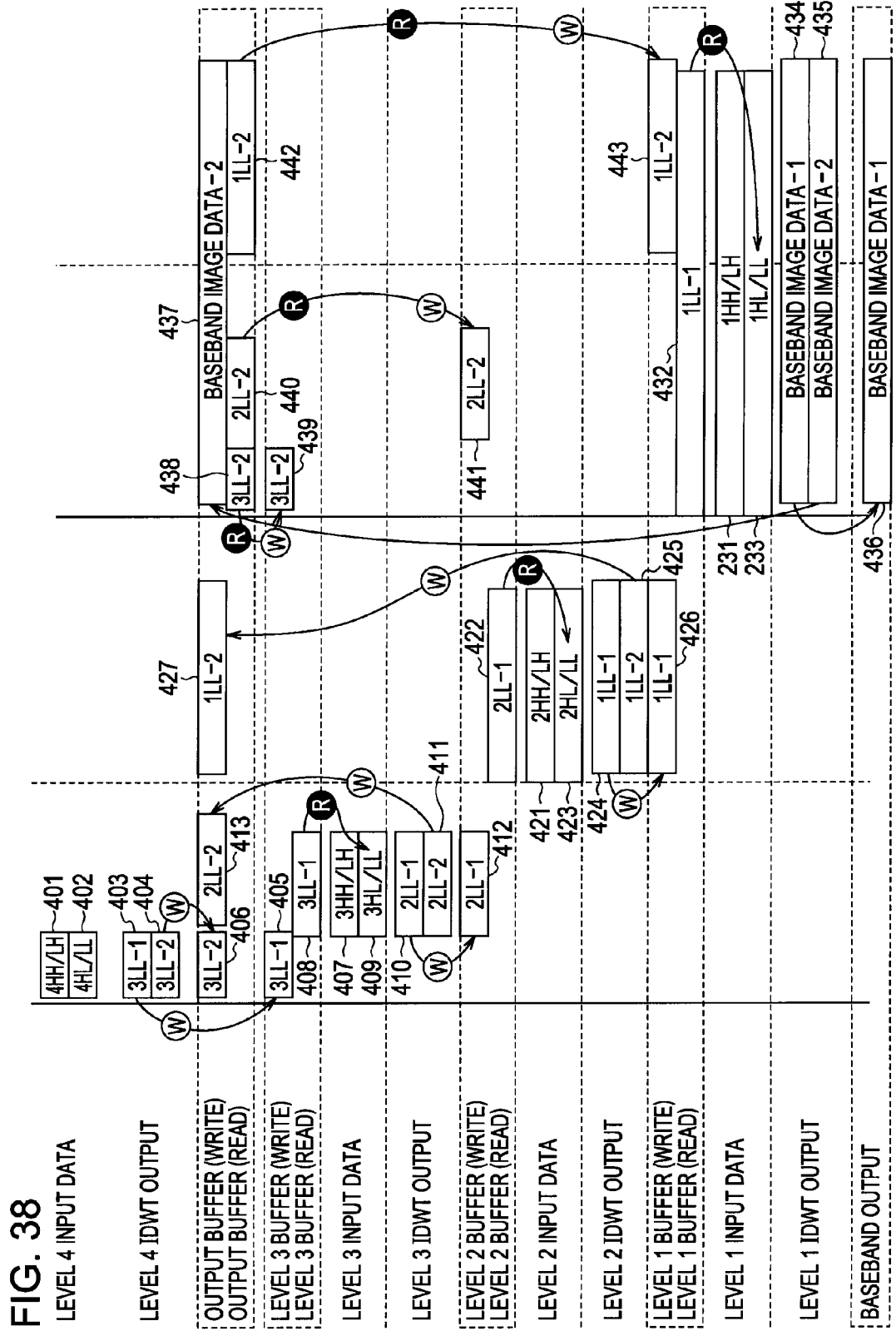
FIG. 38 is a model diagram for describing an example of the flow of line-increment wavelet inverse processing.

A specific example of the flow of such line-increment wavelet inverse transformation processing is schematically shown in FIG. 38. FIG. 38 illustrates in way in which transition of coefficient data occurs regarding the processing at each division level and the input/output at each buffer. Note that here, we will say that the division level of coefficient data is 4, i.e., that the uppermost level is 4.

As shown to the upper left in FIG. 38, at the time that the line-increment wavelet inverse transformation processing is started the division level to be processed is set to the uppermost level, so first, data 4HH/LH made up of one line of sub-band HH coefficients and one line of sub-band LH coefficients, and data 4HL/LL made up of one line of sub-band HL coefficients and one line of sub-band LL coefficients, of the division level 4, are supplied externally, i.e., from the upstream processing unit for storage unit or the like (none of these are shown in the drawings) of the wavelet inverse transformation device 300, to the vertical synthesizing filter unit 312 (data 401 and data 402). That is to say, the vertical synthesizing filter unit 312 takes input of one line each of coefficients of each of the sub-bands of division level 4.

The vertical synthesizing filter unit 312 and the horizontal synthesizing filter unit 314 perform synthesizing filter processing on these coefficients, and generate data 3LL-1 (data 403) and data 3LL-2 (data 404) which are one line of lowband sub-band coefficients of a division level one order lower. That is to say, the vertical synthesizing filter unit 312 and the horizontal synthesizing filter unit 314 generate two lines of lowband sub-band coefficients of a division level one order lower (division level 3) by synthesizing filer processing.

Of these, one, the data 3LL-1 (data 403) is supplied to the level 3 buffer unit 321 of the level-independent buffer unit 320 via the selector 315 and stored (data 405), and the other, the data 3LL-2 (data 404) is written to the output buffer unit 316 and held (data 406).

Here, the level to be processed is set to level 3, which is one order lower. The vertical synthesizing filter unit 312 externally obtains one line each of the highband sub-band coefficients of division level 3, and also reads out and obtains the data 3LL-1 held in the level 3 buffer unit 114 (data 408). That is to say, the vertical synthesizing filter unit 312 takes input of one line each of the sub-band coefficients of division level 3, such as data 3HH/LH (data 407) and data 3HL/LL (data 409). The data 3HH/LH represents one line of the sub-band HH coefficients and one line of the sub-band LH coefficients, of division level 3, and the data 3HL/LL represents one line of the sub-band HL coefficients and one line of the sub-band LL coefficients, of division level 3.

The vertical synthesizing filter unit 312 and the horizontal synthesizing filter unit 314 perform synthesizing filter processing on these coefficients, and generate data 2LL-1 (data 410) and data 2LL-2 (data 411) which are one line of lowband sub-band coefficients of a division level one order lower. That is to say, the vertical synthesizing filter unit 312 and the horizontal synthesizing filter unit 314 generate two lines of lowband sub-band coefficients of a division level one order lower (division level 2) by synthesizing filer processing.

Of these, one, the data 2LL-1 (data 410) is supplied to the level 2 buffer unit 322 of the level-independent buffer unit 320 via the selector 315 and stored (data 412), and the other, the data 2LL-2 (data 411) is written to the output buffer unit 316 and held (data 413).

Here, again, the level to be processed is set to level 2, which is one order lower. The vertical synthesizing filter unit 312 externally obtains one line each of the highband sub-band coefficients of division level 2, and also reads out and obtains the data 2LL-1 held in the level 2 buffer unit 322 (data 422). That is to say, the vertical synthesizing filter unit 312 takes input of one line each of the sub-band coefficients of division level 2, such as data 2HH/LH (data 421) and data 2HL/LL (data 423). The data 2HH/LH represents one line of the sub-band HH coefficients and one line of the sub-band LH coefficients, of division level 2, and the data 2LL represents one line of the sub-band coefficients and one line of the sub-band LL coefficients, of division level 2.

The vertical synthesizing filter unit 312 and the horizontal synthesizing filter unit 314 perform synthesizing filter processing on these coefficients, and generate data 1LL-1 (data 424) and data 1LL-2 (data 425) which are one line of lowband sub-band coefficients of a division level one order lower. That is to say, the vertical synthesizing filter unit 312 and the horizontal synthesizing filter unit 314 generate two lines of lowband sub-band coefficients of a division level one order lower (division level 1) by synthesizing filer processing.

Of these, one, the data 1LL-1 (data 424) is supplied to the level 1 buffer unit 323 of the level-independent buffer unit 320 via the selector 315 and stored (data 426), and the other, the data 1LL-2 (data 425) is written to the output buffer unit 316 and held (data 427).

Here, once again, the level to be processed is set to level 1, which is one order lower. The vertical synthesizing filter unit 312 externally obtains one line each of the highband sub-band coefficients of division level 1, and also reads out and obtains the data 1LL-1 held in the level 1 buffer unit 323 (data 432). That is to say, the vertical synthesizing filter unit 312 takes input of one line each of the sub-band coefficients of division level 1, such as data 1HH/LH (data 431) and data 1HL/LL (data 433). The data 1HH/LH represents one line of the sub-band HH coefficients and one line of the sub-band LH coefficients, of division level 1, and the data 1LL represents one line of the sub-band coefficients and one line of the sub-band LL coefficients, of division level 1.

The vertical synthesizing filter unit 312 and the horizontal synthesizing filter unit 314 perform synthesizing filter processing on these coefficients, and generate baseband image data-1 (data 434) and baseband image data-2 (data 435) representing one line of baseband image data. That is to say, the vertical synthesizing filter unit 312 and the horizontal synthesizing filter unit 314 generate two lines of baseband image data by synthesizing filer processing.

Of these, one, the baseband image data-1 (data 434) is output as it is (data 436), and the other, the baseband image data-2 (data 435) is written to the output buffer unit 316 and held (data 437). Simultaneously and in parallel with this writing, the data 3LL-2 (data 438) which is division level 3 lowband sub-band coefficients stored in the output buffer unit 316 is read out and supplied to and stored in the level 3 buffer unit 321 of the level-independent buffer unit 320 (data 439), the data 2LL-2 (data 440) which is division level 2 lowband sub-band coefficients is read out and supplied to and stored in the level 2 buffer unit 322 of the level-independent buffer unit 320 (data 441), and the data 1LL-2 (data 442) which is division level 1 lowband sub-band coefficients is read out and supplied to and stored in the level 1 buffer unit 323 of the level-independent buffer unit 320 (data 443).

Each time the line-increment wavelet inverse transformation processing described with reference to the flowchart in FIGS. 35 and 36 us performed, data is processed as shown in FIG. 38. The baseband image data-2 (data 437) stored in the output buffer unit 316 is externally output at the next line-increment wavelet inverse transformation processing. The coefficients accumulated in each buffer of the level-independent buffer unit 320 are processed in the next and subsequent times.

As described above, synthesizing filter processing at each division level generates two lines each of lower-order division level coefficients, but only one line each is processed in the synthesizing filter processing. That is to say, of the two generated lines of coefficients, only line is used for the next synthesizing filter processing, but the other line is unnecessary until the next or subsequent line-increment wavelet inverse transformation processing. That is to say, there is no need to accumulate the generated two lines in the level-independent buffer unit 320 at the same time. Accordingly, the wavelet inverse transformation device 300 mutually offsets the accumulation of the two lines of coefficients, so as to be accumulated in the level-independent buffer unit 320 one line at a time. Thus, the capacity necessary for the level-independent buffer unit 320 can be reduced.

The level-independent buffer unit 320 needs to supply the coefficients held therein to the vertical synthesizing filter unit 312 via the selector 311 frequency, so an arrangement implemented with memory which can only be accessed at low speed, such as external memory which has to go through a shared bus for data read/write, may drastically lower the processing speed of the synthesizing filter processing, increasing delay time due to wavelet inverse transformation processing. Accordingly, the level-independent buffer unit 320 preferably is realized by implementation with memory which can be accessed at high speed without going through a shared bus, and is provided within an LSI chip including the CPU where the synthesizing filter processing is performed, such as so-called cache memory.

However, increase in the memory capacity of the cache memory increases the scale of the circuit, resulting in a larger chip size for the LSI chip. That is to say, increase in cache memory capacity may lead to increased manufacturing costs of the device. This means that there is an upper limit to cache memory capacity in real-world applicability, and from the perspective of cost reduction, the smaller the capacity is, the better.

Accordingly, increased data amount stored in the level-independent buffer unit 320 may result in insufficient capacity in the event that small-capacity cache memory has been used. In this case, external memory which operates slower needs to be used as buffer memory, but as described above, this may lead to increase in delay time due to the wavelet inverse transformation processing. Also, in this case, the delay time may be further increased due to mishits occurring at the cache memory and data backup and so forth.

Accordingly, as described above, such increase in delay time and increase in manufacturing costs can be reduced by arranging for the coefficients generated by synthesizing filter processing to be accumulated in the level-independent buffer unit 320 one line each so as to reduce capacity needed for the level-independent buffer unit 320.

Also, as described above, the wavelet inverse transformation device 300 accumulates in the output buffer unit 316 the one of the two lines of coefficients generated by synthesizing filter processing that is not immediately accumulated in the level-independent buffer unit 320.

The output buffer unit 316 is originally a buffer for accumulating one line of the two lines of generated baseband image data, in order to output baseband image data one line at a time. In other words, this data is not used until the baseband image data is generated, so as described above, coefficients not immediately accumulated in the level-independent buffer unit 320 are temporarily stored in the output buffer unit 316 until synthesizing filter processing of the coefficients accumulated at the level-independent buffer unit 320 ends. That is to say, the timing of accumulation in the level-independent buffer unit 320 is offset using the output buffer unit 316.

While the output buffer unit 316, as with the level-independent buffer unit 320, is preferably realized by cache memory which can operate at high speeds, in order to reduce delay time due to wavelet inverse transformation processing, storing the coefficients using such idle time (the period during which baseband image data is not being held) enables coefficients generated by synthesizing filter processing to be accumulated in the level-independent buffer unit 320 without increasing the capacity of the cache memory (output buffer unit 316).

That is to say, the wavelet inverse transformation device 300 updates the usage efficiency of the cache memory for buffering coefficient data and image data, thereby reducing the memory capacity necessary as buffer memory for holding data in the wavelet inverse transformation processing.

While an arrangement can be conceived for backing up coefficients not accumulated in the level-independent buffer unit 320 immediately in external memory, this may lead to complicated timing control to prevent increase in delay time. Using the output buffer unit 316 as described above allows the coefficients generated by the synthesizing filter processing to be easily accumulated in the level-independent buffer unit 320, one line at a time.

Also, as described with reference to the block diagram in FIG. 32 and the flowchart in FIG. 15, the output buffer unit 316 is arranged so as to be capable of writing baseband image data and reading out coefficients, simultaneously and in parallel. Thus, increase in delay time due to moving coefficients from the output buffer unit 316 to the level-independent buffer unit 320 can be suppressed without increasing costs.

Figure 39:
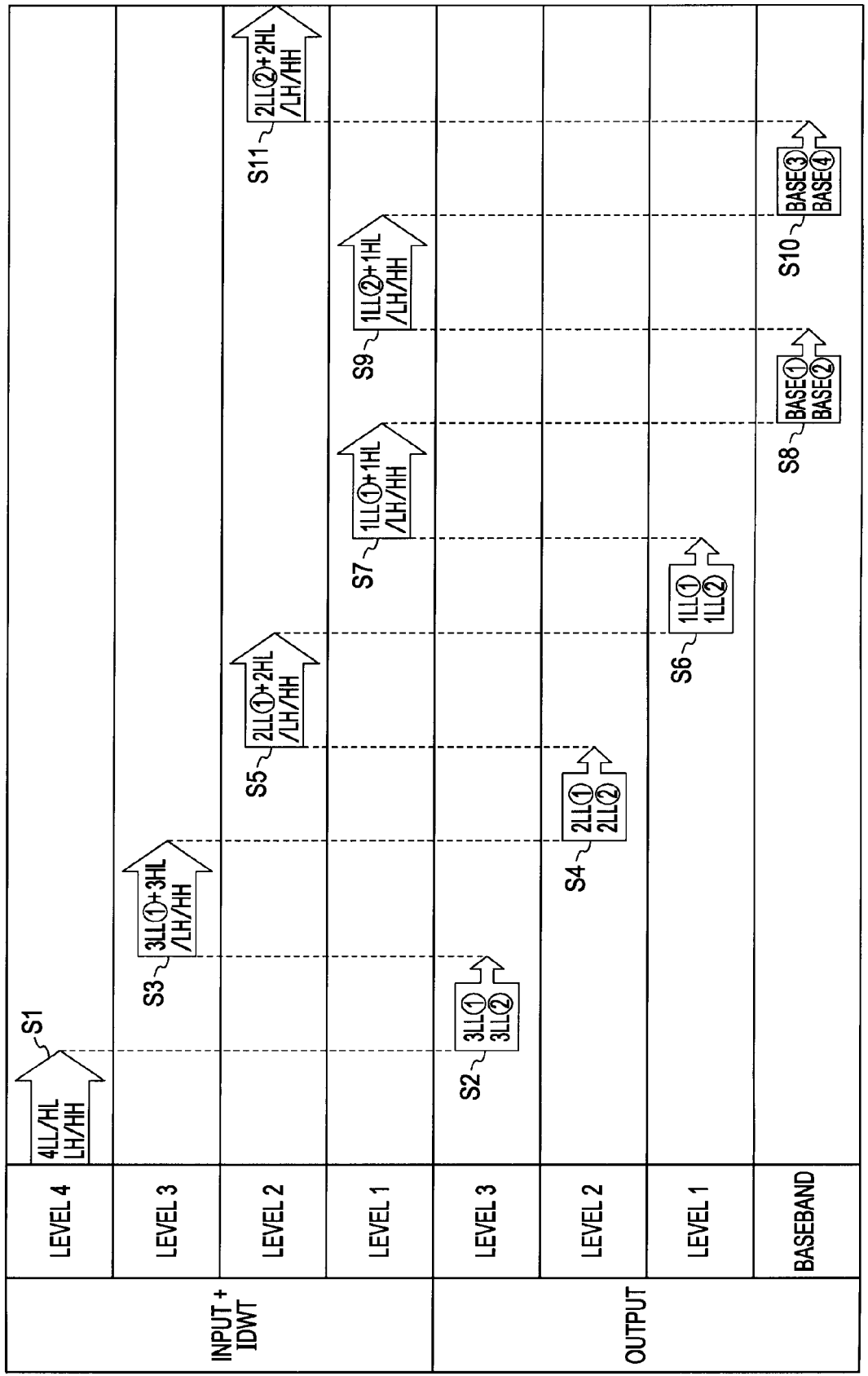
FIG. 39 is a model diagram for describing an example of the flow of line-increment wavelet inverse processing for one precinct.
Figure 40:
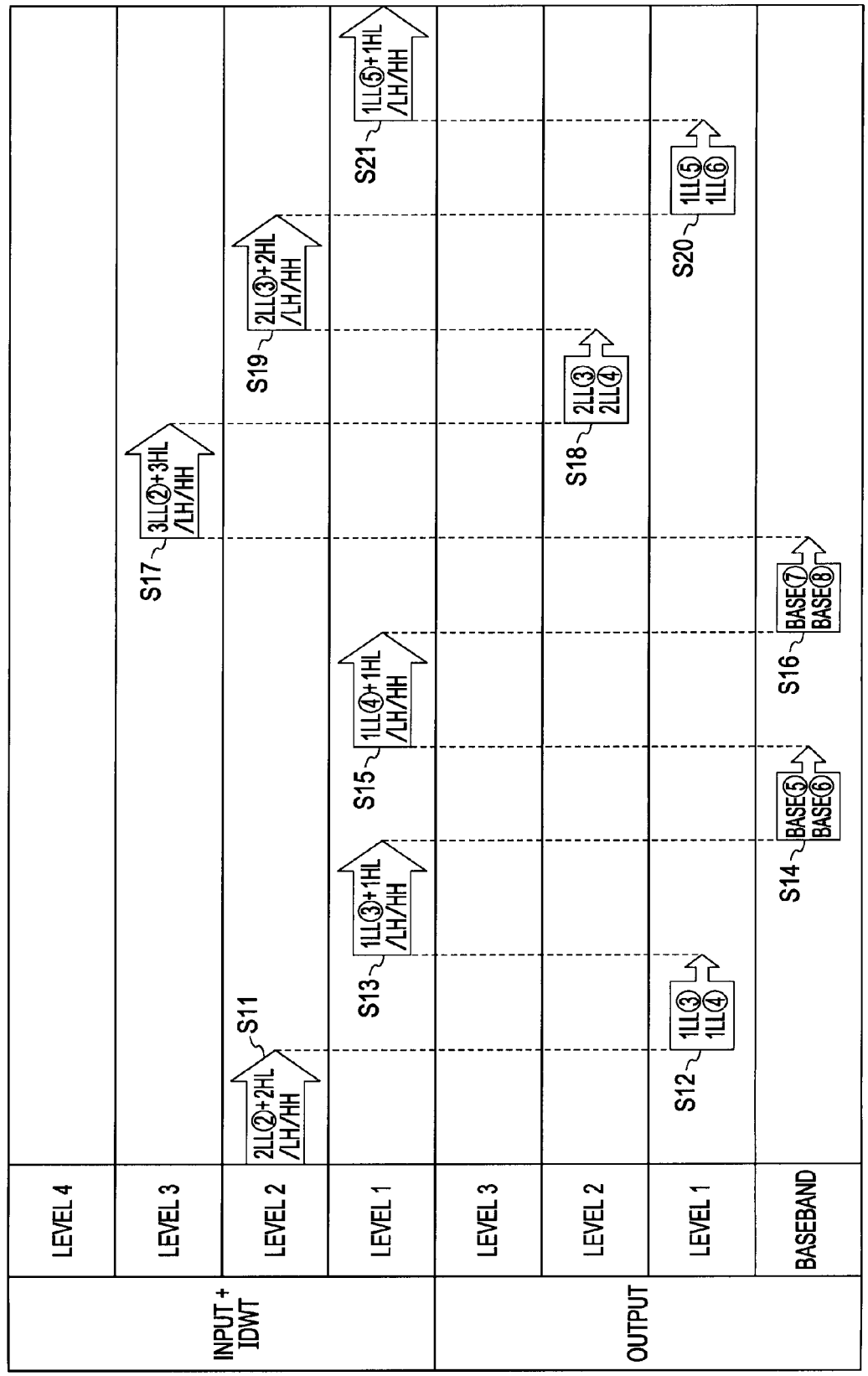
FIG. 40 is a model diagram continuing from FIG. 39, for describing an example of the flow of line-increment wavelet inverse processing for one precinct.
Figure 41:
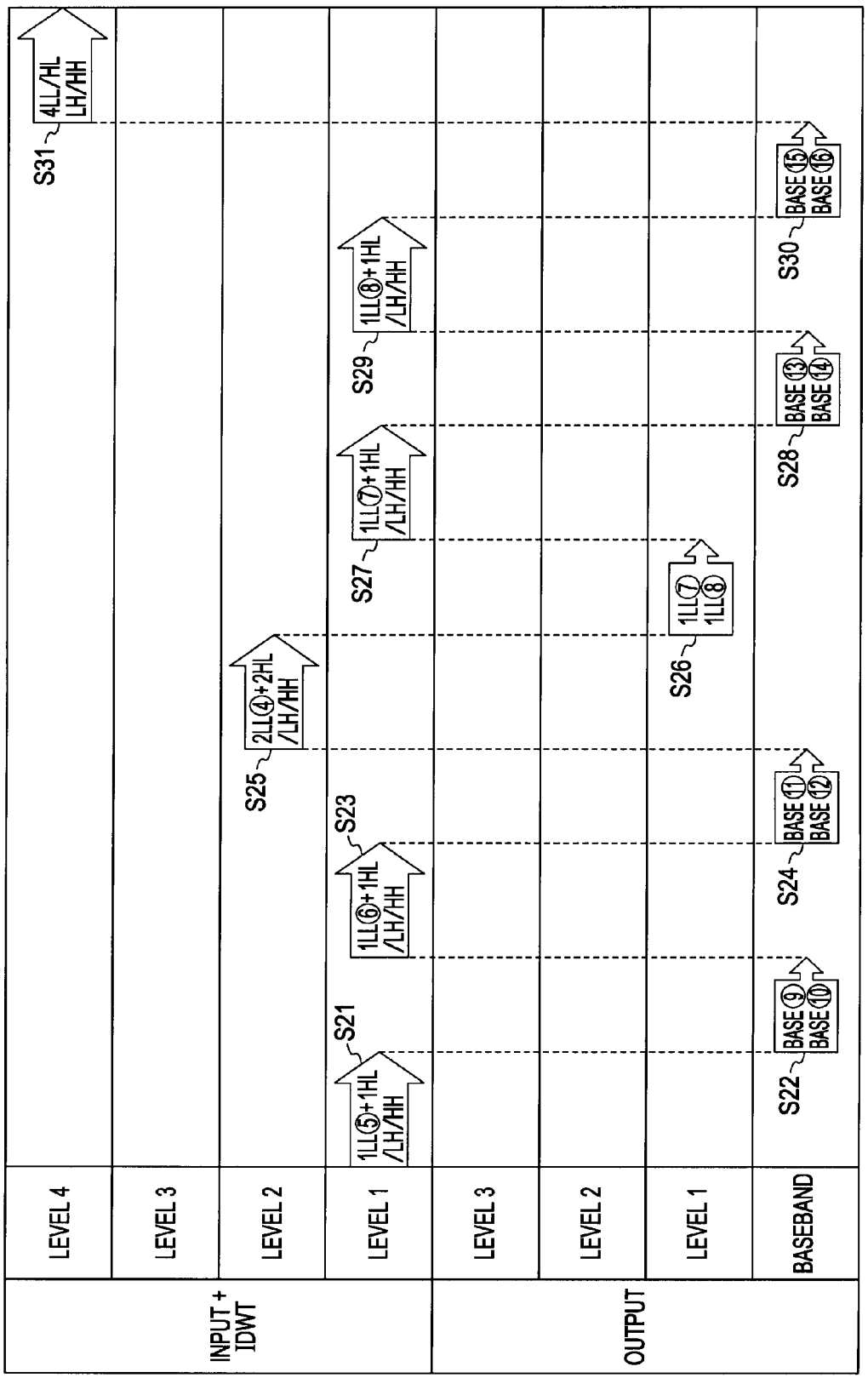
FIG. 41 is a model diagram continuing from FIG. 40, for describing an example of the flow of line-increment wavelet inverse processing for one precinct.

Next, a more specific example of the flow of wavelet inverse transformation processing for one precinct will be described with reference to FIGS. 39 through 41. In FIGS. 39 through 41, the numerals shown in circles are identification Nos. of lines within the precinct; the circles shown around the numerals in the drawings are omitted in the Present Specification. Note that the description which will be given here is one regarding wavelet inverse transformation processing performed on coefficients subjected to level 4 wavelet transformation.

As shown in FIG. 39, upon the first wavelet inverse transformation processing being started, first, one line each of the division level 4 sub-bands (4LL/HL/LH/HH) are subjected to synthesizing filter processing (arrow S1). This synthesizing filter processing generates the first line coefficients 3LL1 and second line coefficients 3LL2 for the lowband sub-band of division level 3 (arrow S2). Next, synthesizing filter processing is performed for the first line coefficients 3LL1 and one line each of newly-input division level 3 highband sub-band coefficients (3HL/LH/HH) (arrow S3), generating first line coefficients 2LL1 and second line coefficients 2LL2 for the lowband sub-band of division level 2 (arrow S4). Further, synthesizing filter processing is performed for the first line coefficients 2LL1 and one line each of newly-input division level 2 highband sub-band coefficients (2HL/LH/HH) (arrow S5), generating first line coefficients 1LL1 and second line coefficients 1LL2 for the lowband sub-band of division level 1 (arrow S6). Further, synthesizing filter processing is performed for the first line coefficients 1LL1 and one line each of newly-input division level 1 highband sub-band coefficients (1HL/LH/HH) (arrow S7), generating first line baseband image data Base 1 and second line baseband image data Base 2 for the baseband (arrow S8).

The first line of image data Base 1 is immediately externally output, and the second line of image data Base 2 is temporarily held in the output buffer unit 316 and output at the next output timing (the second line-increment wavelet inverse transformation processing).

At the time of starting the third line-increment wavelet inverse transformation processing, the second line coefficients 3LL2 of the division level 3 lowband sub-band generated in the first line-increment wavelet inverse transformation processing, the second line coefficients 2LL2 of the division level 2 lowband sub-band, and the second line coefficients 1LL2 of the division level 1 lowband sub-band, are accumulated at the level-independent buffer unit 320. Accordingly, with the third line-increment wavelet inverse transformation processing, of these, the second line coefficients 1LL2 of the division level 1 lowband sub-band are processed, being the lowest order coefficient. That is to say, synthesizing filter processing is performed for the second line coefficients 1LL2 and one line each of newly-input division level 1 highband sub-band coefficients (1HL/LH/HH) (arrow S9), generating third line baseband image data Base 3 and fourth line baseband image data Base 4 for the baseband (arrow S10).

The third line of image data Base 3 is immediately externally output, and the fourth line of image data Base 4 is temporarily held in the output buffer unit 316 and output at the next output timing (the fourth line-increment wavelet inverse transformation processing).

At the time of starting the fifth line-increment wavelet inverse transformation processing, the second line coefficients 1LL2 of the division level 1 lowband sub-band have already been processed, so the second line coefficients 3LL2 of the division level 3 lowband sub-band, and the second line coefficients 2LL2 of the division level 2 lowband sub-band, are accumulated at the level-independent buffer unit 320. Accordingly, with the fifth line-increment wavelet inverse transformation processing, of these, the second line coefficients 2LL2 of the division level 2 lowband sub-band are processed, being the lowest order coefficient. That is, synthesizing filter processing is performed for the second line coefficients 2LL2 and one line each of newly-input division level 2 highband sub-band coefficients (2HL/LH/HH) (arrow S11), generating third line coefficients 1LL3 and fourth line coefficients 1LL4 for the lowband sub-band of division level 1 (arrow S12), as shown in FIG. 40. Further, synthesizing filter processing is performed for the division level 1 third line coefficients 1LL3 and one line each of newly-input division level 1 highband sub-band coefficients (1HL/LH/HH) (arrow S13), generating fifth line baseband image data Base 5 and sixth line baseband image data Base 6 for the baseband (arrow S14).

The fifth line of image data Base 5 is immediately externally output, and the sixth line of image data Base 6 is temporarily held in the output buffer unit 316 and output at the next output timing (the sixth line-increment wavelet inverse transformation processing).

At the time of starting the seventh line-increment wavelet inverse transformation processing, the second line coefficients 3LL2 of the division level 3 lowband sub-band, generated at the first line-increment wavelet inverse transformation processing, and the fourth line coefficients 1LL4 of the division level 1 lowband sub-band, generated at the fifth line-increment wavelet inverse transformation processing, are accumulated at the level-independent buffer unit 320. Accordingly, with the seventh line-increment wavelet inverse transformation processing, of these, the fourth line coefficients 1LL4 of the division level 1 lowband sub-band are processed, being the lowest order coefficient. That is to say, synthesizing filter processing is performed for the fourth line coefficients 1LL4 and one line each of newly-input division level 1 highband sub-band coefficients (1HL/LH/HH) (arrow S15), generating seventh line baseband image data Base 7 and eighth line baseband image data Base 8 for the baseband (arrow S16).

The seventh line of image data Base 7 is immediately externally output, and the eighth line of image data Base 8 is temporarily held in the output buffer unit 316 and output at the next output timing (the eighth line-increment wavelet inverse transformation processing).

At the time of starting the ninth line-increment wavelet inverse transformation processing, only the second line coefficients 3LL2 of the division level 3 lowband sub-band generated at the first line-increment wavelet inverse transformation processing are accumulated at the level-independent buffer unit 320. Accordingly, with the ninth line-increment wavelet inverse transformation processing, the second line coefficients 3LL2 of the division level 3 lowband sub-band are processed. That is, synthesizing filter processing is performed for the second line coefficients 3LL2 and one line each of newly-input division level 3 highband sub-band coefficients (3HL/LH/HH) (arrow S17), generating third line coefficients 2LL3 and fourth line coefficients 3LL4 for the lowband sub-band of division level 1 (arrow S18). Further, synthesizing filter processing is performed for the division level 2 third line coefficients 2LL3 and one line each of newly-input division level 2 highband sub-band coefficients (2HL/LH/HH) (arrow S19), generating fifth line coefficients 1LL5 and sixth line coefficients 1LL6 for the lowband sub-band of division level 1 (arrow S20). Further, synthesizing filter processing is performed for the division level 1 fifth line coefficients 1LL5 and one line each of newly-input division level 1 highband sub-band coefficients (1HL/LH/HH) (arrow S21), generating ninth line baseband image data Base 9 and tenth line baseband image data Base 10 for the baseband (arrow S22).

The ninth line of image data Base 9 is immediately externally output, and the tenth line of image data Base 10 is temporarily held in the output buffer unit 316 and output at the next output timing (the tenth line-increment wavelet inverse transformation processing).

At the time of starting the eleventh line-increment wavelet inverse transformation processing, the fourth line coefficients 2LL4 of the division level 2 lowband sub-band generated at the ninth line-increment wavelet inverse transformation processing, and the sixth line coefficients 1LL6 of the division level 1 lowband sub-band, are accumulated at the level-independent buffer unit 320. Accordingly, with the eleventh line-increment wavelet inverse transformation processing, of these, the sixth line coefficients 1LL6 of the division level 1 lowband sub-band are processed, being the lowest order coefficient. That is to say, synthesizing filter processing is performed for the sixth line coefficients 1LL6 and one line each of newly-input division level 1 highband sub-band coefficients (1HL/LH/HH) (arrow S23), generating eleventh line baseband image data Base 11 and twelfth line baseband image data Base 12 for the baseband (arrow S24).

The eleventh line of image data Base 11 is immediately externally output, and the twelfth line of image data Base 12 is temporarily held in the output buffer unit 316 and output at the next output timing (the twelfth line-increment wavelet inverse transformation processing).

At the time of starting the thirteenth line-increment wavelet inverse transformation processing, the sixth line coefficients 1LL6 of the division level 1 lowband sub-band have been processed, so the fourth line coefficients 2LL4 of the division level 4 lowband sub-band are accumulated at the level-independent buffer unit 320. Accordingly, with the thirteenth line-increment wavelet inverse transformation processing, the fourth line coefficients 2LL4 of the division level 2 lowband sub-band are processed. That is, synthesizing filter processing is performed for the fourth line coefficients 2LL4 and one line each of newly-input division level 2 highband sub-band coefficients (2HL/LH/HH) (arrow S25), generating seventh line coefficients 1LL7 and eighth line coefficients 1LL8 for the lowband sub-band of division level 1 (arrow S26). Further, synthesizing filter processing is performed for the division level 1 seventh line coefficients 1LL7 and one line each of newly-input division level 1 highband sub-band coefficients (1HL/LH/HH) (arrow S27), generating thirteenth line baseband image data Base 13 and fourteenth line baseband image data Base 14 for the baseband (arrow S28).

The thirteenth line of image data Base 13 is immediately externally output, and the fourteenth line of image data Base 14 is temporarily held in the output buffer unit 316 and output at the next output timing (the fourteenth line-increment wavelet inverse transformation processing).

At the time of starting the fifteenth line-increment wavelet inverse transformation processing, only the eighth line coefficients 1LL8 of the division level 1 lowband sub-band generated at the thirteenth line-increment wavelet inverse transformation processing are accumulated at the level-independent buffer unit 320. Accordingly, with the fifteenth line-increment wavelet inverse transformation processing, the eighth line coefficients 1LL8 of the division level 1 lowband sub-band are processed. That is, synthesizing filter processing is performed for the eighth line coefficients 1LL8 and one line each of newly-input division level 1 highband sub-band coefficients (1HL/LH/HH) (arrow S29), generating fifteenth line baseband image data Base 15 and sixteenth line baseband image data Base 16 for the baseband (arrow S30).

The fifteenth line of image data Base 15 is immediately externally output, and the sixteenth line of image data Base 16 is temporarily held in the output buffer unit 316 and output at the next output timing (the sixteenth line-increment wavelet inverse transformation processing).

Thus, repeating the line-increment wavelet inverse transformation processing sixteen times generates and outputs one precinct worth of baseband image data (16 lines). The same processing as above is repeated for the next precinct (arrow S31).

Thus, the wavelet inverse transformation device 300 repeatedly performs line-increment wavelet inverse transformation processing, generating two lines at a time from the top of the base band image data and selecting one to process such that one line each is output, and repeating synthesizing filter processing. Accordingly, the wavelet inverse transformation device 300 can output baseband image data at every predetermined timing.

Also, the wavelet inverse transformation device 300 generates two lines each of baseband image data, and at the time thereof, executes only synthesizing filter processing necessary for generating those two lines. That is to say, the wavelet inverse transformation device 300 saves, of the two lines of coefficients generated by synthesizing filter processing, one line in the output buffer, and holds the other one line in the level-independent buffer unit 320, so as to preferentially perform synthesizing filter processing again on the one line held in the level-independent buffer unit 320, so as to generate two lines of coefficients. The wavelet inverse transformation device 300 repeats this until two lines of baseband image data are generated. Upon the baseband image data being generated and all of the coefficients held in the level-independent buffer unit 320 being processed, the wavelet inverse transformation device 300 reads out the coefficients held in the output buffer unit 316 and holds these in the level-independent buffer unit 320, and performs synthesizing filter processing preferentially from coefficients of lower order in division level. At this time as well, the wavelet inverse transformation device 300 repeats the synthesizing filter processing as described above.

Thus, the wavelet inverse transformation device 300 not only can generate two lines each of baseband image data from the top, but also alleviate load for generating each of the two lines of baseband image data, and further, reduce the data amount of data which needs to be held, such as, for example, coefficient data generated by synthesizing filter processing, baseband image data, and so forth, whereby the memory capacity necessary for the buffer can be reduced. This also allows manufacturing costs to be reduced.

Further, at the time of generating the two lines of baseband image data, the wavelet inverse transformation device 300 executes only synthesizing filter processing necessary for generating the two lines, so the interval of generating the two lines of baseband image data can be reduced. That is to say, the wavelet inverse transformation device 300 can output each line of the baseband image data at shorter intervals.

The image data which the wavelet inverse transformation device 300 processes is, for example, television signals or the like. As described above, the wavelet inverse transformation device 300 outputs baseband image data one line at a time, but matching the intervals thereof to the horizontal synchronization timing of television signals enables the wavelet inverse transformation device 300 to generate television signals in real-time (instantaneously). That is to say, in this case, the wavelet inverse transformation device 300 can perform wavelet inverse transformation of input coefficient data in real time, so that output image data can be displayed on a monitor without buffering, for example. It should be noted there that the term "real-time" as used here means that baseband image data can be output one line at a time matching the intervals thereof to the horizontal synchronization timing of television signals, and does not mean that the delay time due to wavelet inverse transformation processing is zero.

Figure 42:
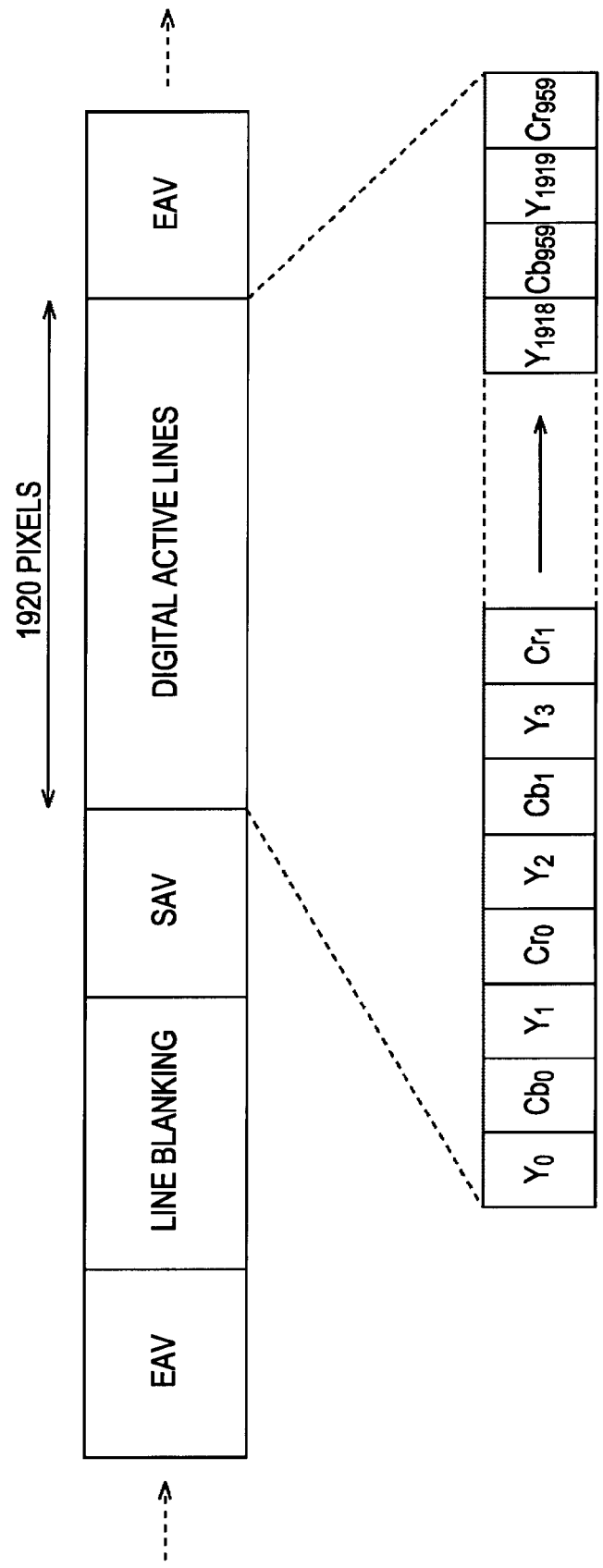
FIG. 42 is a diagram illustrating an example of a data array of luminance and color difference signals with the HDTV standard.

FIG. 42 is a schematic diagram illustrating the multiplexed data format for 10-bit samples, with the 1920×1080, YCbCr 4:2:2 format stipulated with SMPTE (Society of Motion Picture and Television Engineers) 292M HD-SDI (High Definition Serial Digital Interface) signals (1.5 Gbps). With this data format, 1920 pixels of baseband data, multiplexed into Y (luminance) and Cb, Cr (color difference), is positioned between an SAV (Start of Active Video) and an EAV (End of Active Video). A line blanking representing the horizontal blanking period is positioned between the EAV and the next SAV.

In order to generate base band image data in real-time with such a data format, the wavelet inverse transformation device 300 needs to generate the base band image data between one SAV and the next SAV. As described above, at the time of generating the two lines of baseband image data, the wavelet inverse transformation device 300 executes only synthesizing filter processing necessary for generating the two lines, so each line of the baseband image data can be output at shorter intervals, and baseband image data can be easily output one line at a time for each SAV.

Now, in actual practice, the above-described processing such as the wavelet transformation processing and wavelet inverse transformation processing is applied to image data transfer systems and recording/playback systems for example, and often are used along with other processing such as entropy encoding and entropy decoding and so forth.

Figure 43:
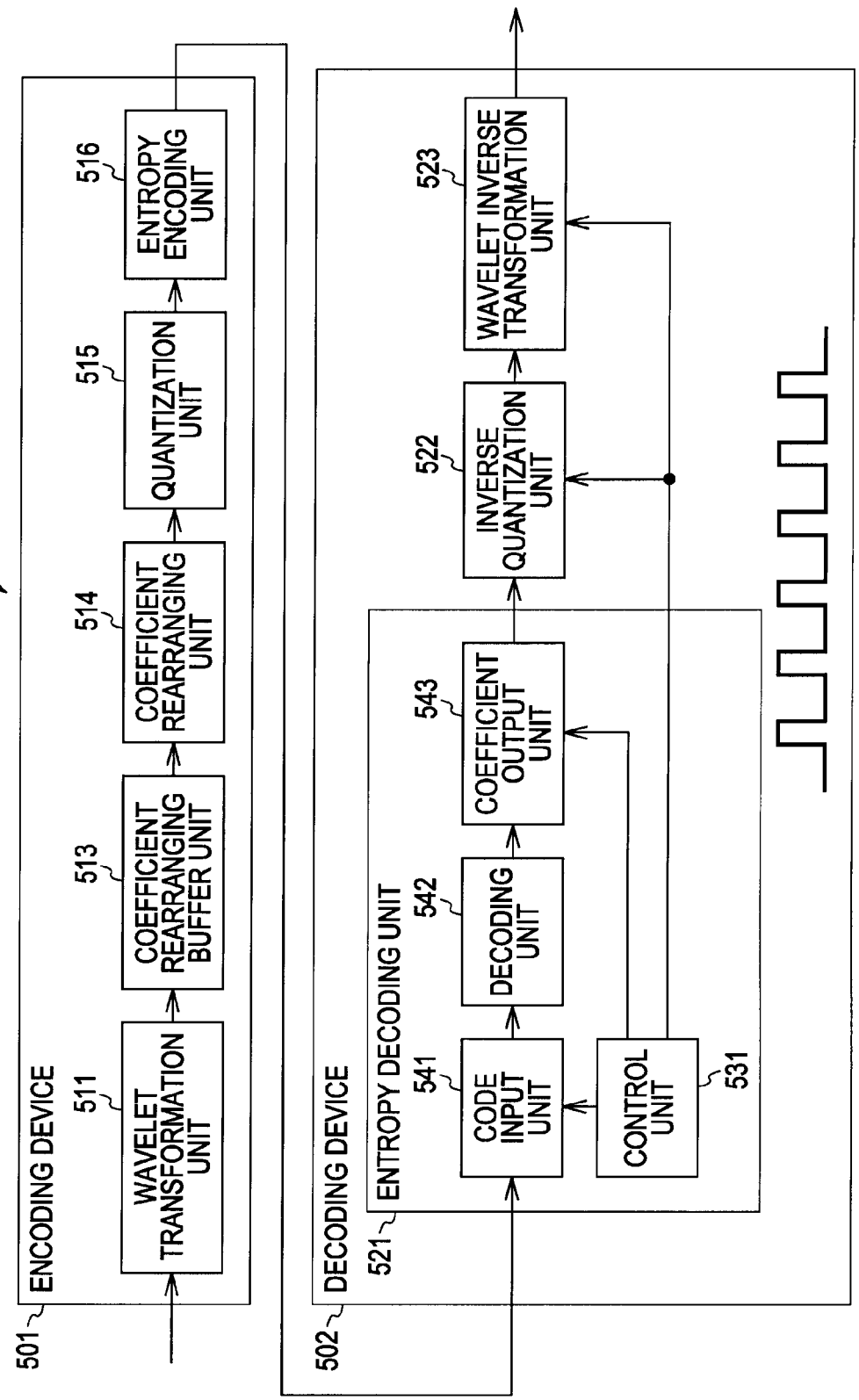
FIG. 43 is a block diagram illustrating the configuration of an example of an image transmission system to which an embodiment of the present invention has been applied.

The following is a description of an application example of the wavelet inverse transformation device 300. FIG. 43 is a block diagram illustrating a configuration of an image transmission system using the wavelet inverse transformation device 300 to which the present invention has been applied.

The image transmission system 500 shown in FIG. 43 is a system for encoding and transmitting image data of the data format shown in FIG. 42, having an encoding device 501 serving as a transmission source, and a decoding device 502 serving as a transmission destination.

The encoding device 501 subjects externally-input image data to wavelet transformation and encodes the data, and transmits the encoded data to the decoding device 502. The encoding device 501 has a wavelet transformation unit 511, coefficient rearranging buffer unit 513, coefficient rearranging unit 514, quantization unit 515, and entropy encoding unit 516.

The image data externally input to the encoding device 501 is transformed into wavelet coefficients at the wavelet transformation unit 511, and stored in the coefficient rearranging buffer unit 513. The coefficient data stored in the coefficient rearranging buffer unit 513 is sequentially read out by the coefficient rearranging unit 514 in the order in which wavelet inverse transformation processing is to be performed, quantized at the quantization unit 515, and encoded at the entropy encoding unit 516, so as to be converted into encoded data. The encoded data generated at the entropy encoding unit 516 is supplied to the decoding device 502.

The decoding device 502 decodes the encoded data transmitted from the encoding device 501, and performs wavelet inverse transformation processing, thereby restoring and outputting the baseband image data, having an entropy decoding unit 521, inverse quantization unit 522, and wavelet inverse transformation unit 523. That is to say, the encoded data supplied from the encoding device 501 is decoded at the entropy decoding unit 521, subjected to inverse quantization at the inverse quantization unit 522, and subjected to wavelet inverse transformation at the wavelet inverse transformation unit 523, so as to be transformed into baseband image data and output from the decoding device 502.

The wavelet transformation unit 511 corresponds to the wavelet transformation device 100 shown in FIG. 1 and the wavelet transformation device 200 in FIG. 16, while the wavelet inverse transformation unit 523 corresponds to the above-described wavelet inverse transformation device 300, having basically the same configuration, and performing the same processing. Accordingly, the wavelet inverse transformation unit 523 can perform wavelet inverse transformation processing so as to output image data one line at a time matching a horizontal synchronization timing.

The entropy decoding unit 521 has a control unit 531, code input unit 541, decoding unit 542, and coefficient output unit 543. The encoded data supplied to the entropy decoding unit 521 is received at the code input unit 541, and decoded at the decoding unit 542 so as to be transformed into coefficient data. The generated coefficient data is output to the inverse quantization unit 522 by the coefficient output unit 543. The control unit 531 controls the input/output at the decoding unit 542, i.e., the code input unit 541 and the coefficient output unit 543, thereby controlling the execution timing of decoding processing performed by the decoding unit 542. Also, the control unit 531 supplies clock signals indicating the horizontal synchronization timing of the image data to the inverse quantization unit 522 and wavelet inverse transformation unit 523.

The decoding unit 542, inverse quantization unit 522, and wavelet inverse transformation unit 523 execute each process under control of the control device 531, decoding, inverse-quantizing, and wavelet inverse transforming the input encoded data, so that image data is output one line at a time matching the horizontal synchronization timing.

Figure 44:
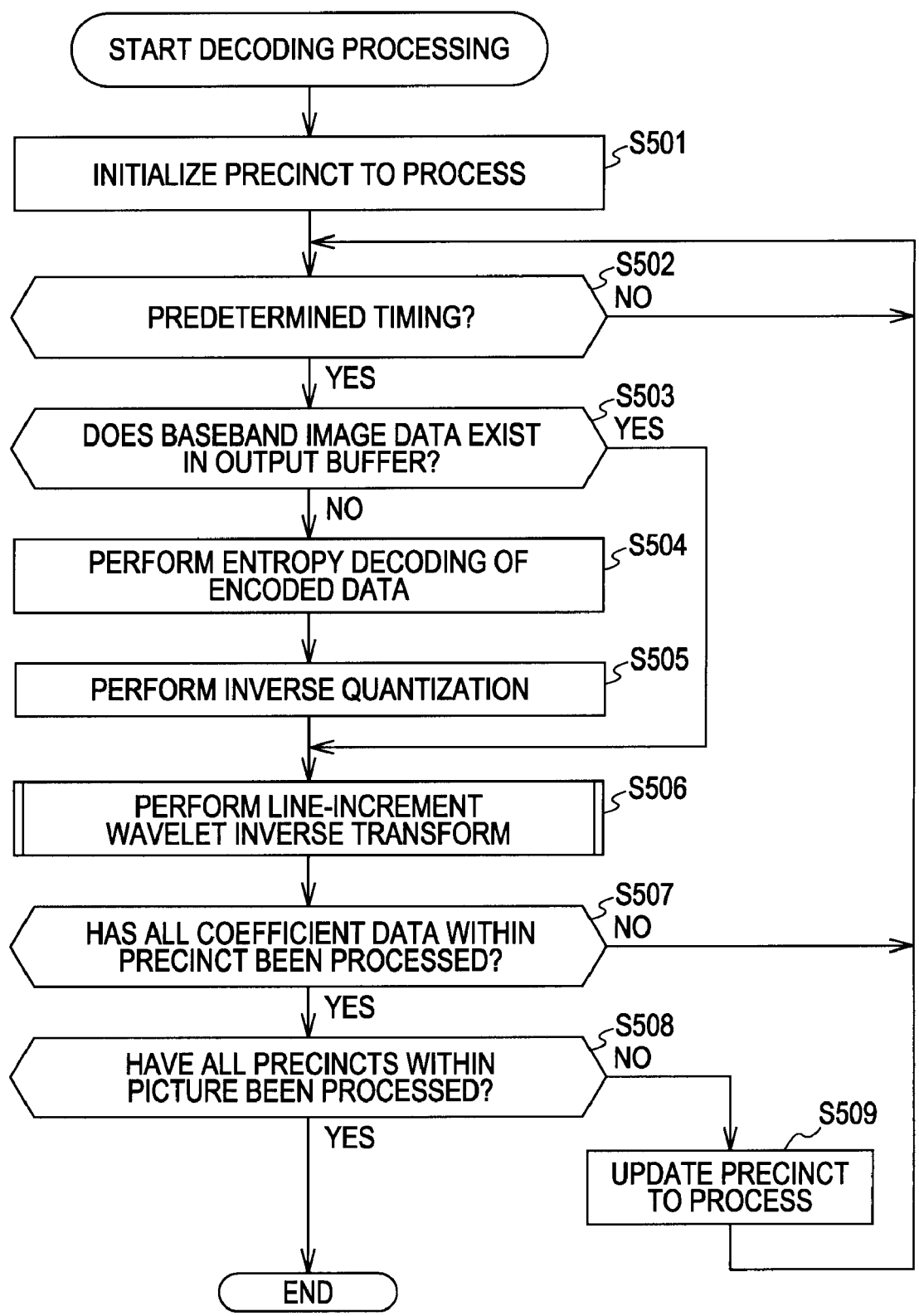
FIG. 44 is a flowchart for describing an example of the flow of decoding processing.

An example of the flow of the decoding processing executed by such a decoding device 502 will be described with reference to the flowchart shown in FIG. 44. This decoding processing is repeatedly executed for each picture.

Upon the decoding processing start, in step S501 the control unit 531 initializes the precinct to processing, and in step S502, determines whether or not the timing is a predetermined timing corresponding to the horizontal blanking timing (horizontal synchronization timing), and stands by till the predetermined timing.

In the event that determination is made in step S502 that the timing is the predetermined timing, the flow proceeds to step S503.

In step S503, determination is made regarding whether or not there is baseband image data in the output buffer unit of the wavelet inverse transformation unit 523. In the event that determination is made that there is no baseband image data at the output buffer unit, the flow proceeds to step S504. In step S504, the decoding unit 542 obtains encoded data via the code input unit 541 which is controlled by the control unit 531, and subjects the encoded data to entropy decoding so as to be transformed into coefficient data. The decoding unit 542 supplies the generated coefficient data to the inverse quantization unit 522 which is controlled by the control unit 531. In step S505, the inverse quantization unit 522 performs inverse quantization of the coefficient data, and supplies the coefficient data subjected to inverse quantization to the wavelet inverse transformation unit 523.

Upon ending of the processing in step S505, the flow proceeds to step S506. Also, in the event that determination is made in step S503 that there is baseband image data at the output buffer unit, outputting the image data in the output buffer unit is given priority, the processing in steps S504 and S505 is skipped, and the flow proceeds to step S506.

In step S506, in accordance with the control timing supplied from the control unit 531, the wavelet inverse transformation unit 523 executes the line-increment wavelet inverse transformation processing as described with reference to the flowchart in FIGS. 35 and 36, so as to generate and output two lines of baseband image data.

In step S507, the control unit 531 determines whether or not all coefficient data within the precinct has been processed, and in the event that determination is made that unprocessed data exists, the flow returns to step S502 and repeats the subsequent processing. On the other hand, in the event that determination has been made in step S507 that all coefficient data within the precinct has been processed, the flow proceeds to step S508.

In step S508, the control unit 531 determines whether or not all precincts within the picture have been processed. In the event that determination is made that there is an unprocessed precinct, the flow proceeds to step S509. In step S509, the control unit 531 updates the precinct to be processed to the next precinct, and the flow returns to step S502. In step S508, in the event that determination is made that all precincts within the picture have been processed, the control unit 531 ends decoding processing on that picture.

As described above, the decoding device 502 repeatedly executes line-increment wavelet inverse transformation processing under the control of the control unit 531 at predetermined timing, i.e., corresponding to the horizontal synchronization timing.

Thus, the decoding device 502 can output one line at a time with the horizontal synchronization timing. That is to say, the decoding device 502 can decode encoded data and restore baseband image data in real-time.

Figure 45:
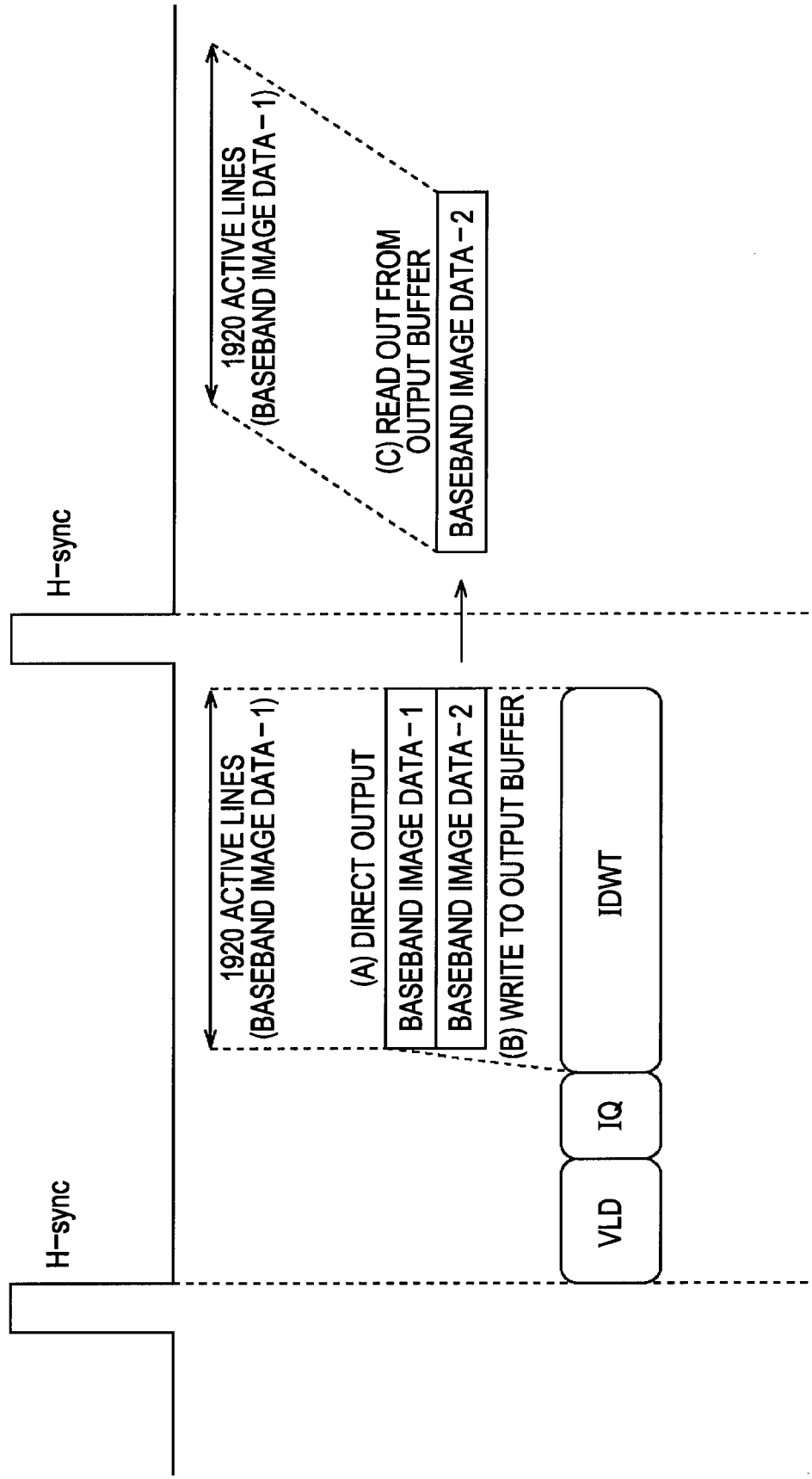
FIG. 45 is a model diagram for describing an example of processing execution timing.

FIG. 45 is a schematic diagram illustrating the way in which baseband image data is output in that case. As shown in FIG. 45, the baseband image data (baseband image data-1 and baseband image data-2) is output one line each every horizontal synchronization timing (H-Sync). Note however, as shown in FIG. 45, two lines each of the baseband image data is generated (baseband image data-1 and baseband image data-2). That is to say, of the two generated lines, one line is directly output at the horizontal synchronization timing when being generated, as with (A), and the other one line is written to the output buffer 316 as with (B) and read out and output from the output buffer 316 at the next horizontal synchronization timing as with (C).

Accordingly, as shown in FIG. 45, there is the need to match the entropy decoding processing (VLD), inverse quantization (IQ), and wavelet inverse transformation processing (IDWT) between horizontal synchronization timing periods. The wavelet inverse transformation unit 523 (wavelet inverse transformation device 300) performs synthesizing filter processing with the above-described order, thereby enabling the interval between generating of baseband image data, so real-time decoding processing at the timing such as shown in FIG. 45 can be easily achieved.

While an image data transmission system has been described above, the wavelet inverse transformation device 300 to which the present invention has been applied can be applied to other systems as well. However, it can be said that the greater the disadvantage of delay time increase is, i.e., the more reduction of delay time is demanded of the system is, the greater the advantage of application of the present invention is.

The above-described series of processing can be realized by hardware, or by software. In this case, a configuration may be made such as the personal computer shown in FIG. 46.

In FIG. 46, a CPU (Central Processing Unit) 601 executes processing of various types, following programs stored in ROM (Read Only Memory) 602 or loaded to RAM (Random Access Memory) 603 from a storage unit 613. The RAM 603 also stores as necessary any data necessary for the CPU 601 to execute the various types of processing. The CPU 601, ROM 602, and RAM 603 are mutually connected via a bus 604. The bus 604 is also connected to an input/output interface 610.

Connected to the input/output interface 610 are an input unit 611 made up of a keyboard, mouse, etc., an output unit 612 made up of a display such as a CRT (Cathode Ray Tube) or LCD (Liquid Crystal Display) or the like, and speakers or the like, a storage unit 613 made up of a hard disk or the like, and a communication unit 614 made up of a modem or the like. The communication unit 614 performs communication processing via a network, of which the Internet is representative.

A drive 615 is connected to the input/output interface 610 as necessary, with removable media 621 such as a magnetic disk, optical disc, magneto-optical disk, semiconductor memory, or the like being mounted as appropriate, with computer programs read out therefrom being installed in the storage unit 613 as necessary.

In the event of executing the above-describe series of processing by software, a program making up the software is installed from a network or a recording medium.

As shown in FIG. 46, the recording medium may be, for example, may be configured of removable media 621, such as magnetic disks (including flexible disks), optical disks (including CD-ROM (Compact Disk Read Only Memory) and DVD (Digital Versatile Disk), magneto-optical disks (including MD (Mini-Disk (a registered trademark))), or semiconductor memory or the like, which is distributed separately from the device main unit so as to distribute the program to the user, but is not restricted to such removable media 621, and may be configured of ROM 602 or the storage unit 613 in which the program has been recorded, built into the device main unit so as to distribute the program to the user in that state.

Note that with the Present Specification, steps describing the program recorded in the recording medium may of course include processing performed in time-sequence following the described order, but is not restricted to processing in time-sequence, and may include processing executed in parallel or individually. Also, in the Present Specification, the term "system" refers to the entirety of equipment configured of multiple devices. Also, a configuration described as being a single device in the above description may be divided so as to be configured of multiple devices, or conversely, a configuration described above as being multiple devices may be integrated so as to be configured as a single device. Of course, other configurations that those described above may be added to the configurations of the devices. Moreover, a part of the configuration of one device may be included in the configuration of another device as long as the configuration and operations of the overall system are substantially the same.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device configured to divide frequency components of image data into a plurality of frequency bands, comprising:
   first means for performing horizontal analysis filtering for dividing said frequency components into highband components and lowband components recursively in a horizontal direction of the image data;
   a first buffer that stores the frequency components output from the first means for performing horizontal analysis filtering;
   means for performing vertical analysis filtering on the frequency components output from the first buffer in a vertical direction of the image data;
   means for storing a portion of the filtered frequency components output from the means for performing vertical analysis filtering and for supplying, in sync with timing for supplying the frequency components stored in the first buffer, which are a computation result of said analysis filtering by said first means for performing horizontal analysis filtering, said data already held, which is data necessary for computation of next analysis filtering to said means for performing vertical analysis filtering;
   second means for performing horizontal analysis filtering for dividing frequency components output from the means for performing vertical into further highband components and lowband components; and
   a plurality of buffers, separate from the first buffer, that store an output from the second means for performing horizontal analysis filtering,
   wherein the means for performing vertical analysis filtering controls a selector connected to each of the first buffer and the plurality of buffers to read out the frequency components stored in the first buffer when a predetermined number of vertical lines have been accumulated in the first buffer and to read out data stored in at least one of the plurality of buffers when a predetermined amount of data has been accumulated in the at least one of the plurality of buffers.

2. The information processing device according to claim 1, said means for storing and supplying comprising:
   means for linking a plurality of data supplied one at a time for each cycle by said means for performing vertical analysis filtering to generate one piece of data;
   means for dividing one piece of data into a plurality of data to supply these one at a time for each said cycle to said means for performing vertical analysis filtering; and
   means for performing writing and reading of data alternately for each said cycle, writing and storing one piece of data generated by said means for linking at a writing cycle for writing said data, reading out one piece of data from stored data by one cycle at a readout cycle for reading out said data to supply this to said means for dividing to divide this into a plurality of data.

3. The information processing device according to claim 2, wherein said means for linking links said data supplied for each first data increment from said means for performing vertical analysis filtering each cycle to generate one piece of data serving as second data increment;
   and wherein said means for dividing divides said one piece of data serving as second data increment for each said first data increment to generate a plurality of data serving as first data increment, and supplies said data serving as first data increment one at a time for each cycle to said means for performing vertical analysis filtering.

4. An information processing method for an information processing device configured to divide the frequency components of image data into a plurality of frequency bands, comprising:
   performing, at a first horizontal analysis filtering unit, horizontal analysis filtering for dividing said frequency components into highband components and lowband components recursively in a horizontal direction of the image data;
storing, in a first buffer, the frequency components output from the first horizontal analysis filtering unit;
performing, at a vertical analysis filtering unit, vertical analysis filtering on the frequency components output from the first buffer in a vertical direction of the image data;
storing, in a midway buffer, a portion of the filtered frequency components output from the vertical analysis filtering unit;
supplying, from the midway buffer, in sync with timing for supplying the frequency components stored in the first buffer, which are a computation result of said analysis filtering by the first horizontal analysis filtering unit, said data already held, which is data necessary for computation of next analysis filtering by the vertical analysis filtering unit;
performing, at a second horizontal analysis filtering unit, horizontal analysis filtering for dividing frequency components output from the vertical analysis filtering unit into further highband components and lowband components;
storing, at a plurality of buffers separate from the first buffer, an output from the second horizontal analysis filtering unit; and
controlling a selector connected to each of the first buffer and the plurality of buffers to read out the frequency components stored in the first buffer when a predetermined number of vertical lines have been accumulated in the first buffer and to read out data stored in at least one of the plurality of buffers when a predetermined amount of data has been accumulated in the at least one of the plurality of buffers.

5. An information processing device configured to divide the frequency components of image data into a plurality of frequency bands, comprising:

a first horizontal analysis filtering unit configured to perform horizontal analysis filtering for dividing said frequency components into highband components and lowband components recursively in a horizontal direction of the image data;
a first buffer that stores the frequency components output from the first horizontal analysis filtering unit;
a vertical analysis filtering unit configured to perform vertical analysis filtering on the frequency components output from the first buffer in a vertical direction of the image data;
a holding unit configured to store a portion of the filtered frequency components output from the vertical analysis filtering unit and to supply, in sync with timing for supplying the frequency components stored in the first buffer, which are a computation result of said analysis filtering by said first horizontal analysis filtering unit, said data already held, which is data necessary for computation of next analysis filtering to said vertical analysis filtering unit;
a second horizontal analysis filtering unit configured to perform horizontal analysis filtering for dividing frequency components output from the vertical analysis filtering unit into further highband components and lowband components; and
a plurality of buffers, separate from the first buffer, that store an output from the second horizontal analysis filtering unit,
wherein the vertical analysis filter unit controls a selector connected to each of the first buffer and the plurality of buffers to read out the frequency components stored in the first buffer when a predetermined number of vertical lines have been accumulated in the first buffer and to read out data stored in at least one of the plurality of buffers when a predetermined amount of data has been accumulated in the at least one of the plurality of buffers.

* * * * *